United States Patent
Solari

(10) Patent No.: US 9,208,430 B2
(45) Date of Patent: Dec. 8, 2015

(54) COMPUTER-IMPLEMENTED SIMULATED INTELLIGENCE CAPABILITIES BY NEUROANATOMICALLY-BASED SYSTEM ARCHITECTURE

(71) Applicant: Simigence, Inc., Solana Beach, CA (US)

(72) Inventor: Soren V. Solari, Solana Beach, CA (US)

(73) Assignee: SIMIGENCE, INC., Solana Beach, CA (US)

(*) Notice: Subject to any disclaimer, the term of this patent is extended or adjusted under 35 U.S.C. 154(b) by 183 days.

(21) Appl. No.: 13/712,654

(22) Filed: Dec. 12, 2012

(65) Prior Publication Data

US 2014/0067740 A1 Mar. 6, 2014

Related U.S. Application Data

(60) Provisional application No. 61/570,040, filed on Dec. 13, 2011.

(51) Int. Cl.
   *G06N 3/04* (2006.01)
   *G06N 3/00* (2006.01)

(52) U.S. Cl.
   CPC . *G06N 3/04* (2013.01); *G06N 3/008* (2013.01)

(58) Field of Classification Search
   None
   See application file for complete search history.

(56) References Cited

U.S. PATENT DOCUMENTS

| | | | |
|---|---|---|---|
| 5,410,716 A * | 4/1995 | Mitterauer | 700/246 |
| 7,467,115 B2 * | 12/2008 | Edelman et al. | 706/15 |
| 7,606,777 B2 * | 10/2009 | Serre et al. | 706/20 |
| 7,613,675 B2 | 11/2009 | Hawkins et al. | |
| 7,627,540 B2 | 12/2009 | Snook et al. | |
| 2007/0106479 A1 * | 5/2007 | Geerts et al. | 702/19 |
| 2009/0182697 A1 | 7/2009 | Massaquoi | |
| 2011/0125483 A1 | 5/2011 | Manuel-Devadoss | |
| 2011/0231353 A1 | 9/2011 | Wang et al. | |
| 2013/0073498 A1 * | 3/2013 | Izhikevich et al. | 706/27 |

OTHER PUBLICATIONS

Taber et al., Windows to the Brain: Introduction to Neuroanatomy, Jul. 2011, pp. 1-12.*
The Human Brain—Atlas of the Human Brain—Nomenclature, pp. 1-13, excerpt from website: http://www.thehumanbrain.info/.*
Alexander et al. Parallel organization of functionally segregated circuits linking basal ganglia and cortex. Annu Rev Neurosci. 9:357-381. 1986.
Amaral et al. Subcortical afferents to the hippocampal formation in the monkey. J Comp Neurol.189(4):573-591. 1980.

(Continued)

*Primary Examiner* — Alan Chen
(74) *Attorney, Agent, or Firm* — Wilson, Sonsini, Goodrich & Rosati

(57) ABSTRACT

Computer-implemented systems for simulated intelligence information processing comprising: a digital processing device comprising an operating system configured to perform executable instructions and a memory; a computer program including instructions executable by the digital processing device to create a hierarchical software architecture comprising: a software module a functional interpretation of the prosencephalon, or parts thereof; a software module a functional interpretation of the mesencephalon, or parts thereof; and a software module a functional interpretation of the rhombencephalon, or parts thereof; wherein the software architecture simulates vertebrate, mammalian, primate, or human neuroanatomy. In some embodiments, the systems create simulated intelligence.

36 Claims, 12 Drawing Sheets

(56) References Cited

OTHER PUBLICATIONS

Amaral et al. The three-dimensional organization of the hippocampal formation: a review of anatomical data. Neuroscience. 31(3):571-591. 1989.
Apicella. Leading tonically active neurons of the striatum from reward detection to context recognition. Trends Neurosci. 30(6):299-306. 2007.
Arbuthnott et al. Distribution and synaptic contacts of the cortical terminals arising from neurons in the rat ventromedial thalamic nucleus. Neuroscience. 38(1)47-60. 1990.
Arikuni et al. The organization of prefrontocaudate projections and their laminar origin in the macaque monkey: a retrograde study using hrp-gel. J Comp Neurol. 244(4):492-510. 1986.
Asanuma et al. The thalamic relations of the caudal inferior parietal lobule and the lateral prefrontal cortex in monkeys: divergent cortical projections from cell clusters in the medial pulvinar nucleus. J Comp Neurol. 241(3):357-81. 1985.
Asanuma. Gabaergic and pallidal terminals in the thalamic reticular nucleus of squirrel monkeys. Exp Brain Res. 101(3):439-451. 1994.
Baddeley. The concept of working memory: a view of its current state and probable future development. Cognition. 10(1-3):17-23. 1981.
Baleydier et al. Network organization of the connectivity between parietal area 7. posterior cingulate cortex and medial pulvinar nucleus: a double fluorescent tracer study in monkey. Exp Brain Res. 66(2):385-93. 1987.
Barbas et al. Cortical structure predicts the pattern of corticocortical connections. Cereb Cortex. 7(7):635-646. 1997.
Barbas et al. Parallel organization of contralateral and ipsilateral prefrontal cortical projections in the rhesus monkey. BMC Neurosci. 6(1):32. 2005.
Barbas et al. Relationship of prefrontal connections to inhibitory systems in superior temporal areas in the rhesus monkey. Cereb Cortex. 15(9):1356-70. 2005.
Barbas. Pattern in the laminar origin of corticocortical connections. J Comp Neurol. 252(3):415-22. 1986.
Benke et al. Basal ganglia lesions and the theory of frontosubcortical loops: neuropsychological findings in two patients with left caudate lesions. Neurocase. 9(1):70-85. 2003.
Bigl et al. Cholinergic projections from the basal forebrain to frontal, parietal, temporal, occipital, and cingulate cortices: a combined fluorescent tracer and acetylcholinesterase analysis. Brain Research Bulletin. 8(6):727-749. 1982.
Borgmann et al. Lack of cortico-striatal projections from the primary auditory cortex in the squirrel monkey. Brain Res. 836(1-2):225-8. 1999.
Bottjer. Timing and prediction the code from basal ganglia to thalamus. Neuron. 46(1):4-7. 2005.
Braak et al. The pyramidal cells of betz within the cingulate and precentral gigantopyramidal field in the human brain, a golgi and pigmentarchitectonic study. Cell Tissue Res. 172(1):103-19. 1976.
Bravo et al. Pyramidal neurons of the rat cerebral cortex, immunoreactive to nicotinic acetylcholine receptors project mainly to subcortical targets. Journal of Comparative Neurology. 320(1):62-8. 1992.
Briggs et al. Laminar patterns of local excitatory input to layer 5 neurons in macaque primary visual cortex. Cereb Cortex. 15(5):479-88. 2005.
Briggs et al. Layer-specific input to distinct cell types in layer 6 of monkey primary visual cortex. J Neurosci. 21(10):3600-3608. 2001.
Brodal et al. Organization of the pontine nuclei. Neurosci Res. 13(2):83-118. 1992.
Brodal. The corticopontine projection in the rhesus monkey, origin and principles of organization. Brain. 101(2):251-83. 1978.
Bromberg-Martin et al. Dopamine in motivational control: rewarding, aversive, and alerting. Neuron. 68(5):815-834. 2010.
Brunel et al. Effects of neuromodulation in a cortical network model of object working memory dominated by recurrent inhibition. J Comput Neurosci. 11(1):63-85. 2001.
Brysch et al. The second. intralaminar thalamo-cortical projection system. Anat Embryol (Berl). 169(2):111-118. 1984.
Brysch et al. The topology of the thalamo-cortical projections in the marmoset monkey (callithrix jacchus). Exp Brain Res. 81(1):1-17. 1990.
Burwell. The parahippocampal region: corticocortico connectivity. Annals of the New York Academy of Sciences. 911:25-42. 2000.
Buxhoeveden et al. The minicolumn hypothesis in neuroscience. Brain. 125(5):935-951. 2002.
Callaway. Local circuits in primary visual cortex of the macaque monkey. Annual Review of Neuroscience. 21:47-74. 1998.
Canolty et al. High gamma power is phase-locked to theta oscillations in human neocortex. Science. 313(5793):1626-1628. 2006.
Catani et al. The rises and falls of disconnection syndromes. Brain. 128:2224-2239. 2005.
Catsman-Berrevoets et al. Differential laminar distribution of corticothalamic neurons projecting to the VL and the center median. An HRP study in the cynomolgus monkey. Brain Res. 154(2):359-365. 1978.
Charara et al. Brainstem dopaminergic, cholinergic and serotoninergic afferents to the pallidum in the squirrel monkey. Brain Res. 640(1-2):155-170. 1994.
Compte et al. Synaptic mechanisms and network dynamics underlying spatial working memory in a cortical network model. Cereb Cortex. 10(9):910-23. 2000.
Conde et al. Local circuit neurons immunoreactive for calretinin, calbindin D-28k or parvalbumin in monkey prefrontal cortex: distribution and morphology. J Comp Neurol. 341(1):95-116. 1994.
Conner et al. Lesions of the basal forebrain cholinergic system impair task acquisition and abolish cortical plasticity associated with motor skill learning. Neuron. 38(5):819-29. 2003.
Crick et al. What is the function of the claustrum?. Philos Trans R Soc Lond B Biol Sci. 360(1458):1271-1279. 2005.
Damasio et al. The anatomical basis of conduction aphasia. Brain. 103(2):337-350. 1980.
de Lima et al. Morphology of the cells within the inferior temporal gyrus that project to the prefrontal cortex in the macaque monkey. J Comp Neurol. 296(1):159-72. 1990.
Defelipe et al. Distribution and patterns of connectivity of interneurons containing calbindin, calretinin, and parvalbumin in visual areas of the occipital and temporal lobes of the macaque monkey. J Comp Neurol. 412(3):515-526. 1999.
DeFelipe et al. Long-range focal collateralization of axons arising from corticocortical cells in monkey sensory-motor cortex. J Neurosci. 6(12):3749-66. 1986.
DeFelipe. Types of neurons. synaptic connections and chemical characteristics of cells immunoreactive for calbindin-d28k, parvalbumin and calretinin in the neocortex. J Chem Neuroanat. 14(1):1-19. 1997.
Doya. What are the computations of the cerebellum, the basal ganglia and the cerebral cortex?. Neural Networks. 12:961-974. 1999.
Durstewitz et al. Neurocomputational models of working memory. Nat Neurosci. 3(Suppl):1184-1191. 2000.
Edelstein et al. The claustrum: a historical review of its anatomy. physiology. cytochemistry and functional significance. Cell Mol Biol (Noisy-le-grand). 50(6):675-702. 2004.
Edwards et al. High gamma activity in response to deviant auditory stimuli recorded directly from human cortex. J Neurophysiol. vol. 94. No. 6. pp. 4269-4280. 2005.
Eichenbaum. A cortical-hippocampal system for declarative memory. Nature Reviews. Neuroscience. 1(1):41-50. 2000.
Eickhoff et al. Analysis of neurotransmitter receptor distribution patterns in the cerebral cortex. Neuroimage. 34(4):1317-1330. 2007.
Felleman et al. Distributed hierarchical processing in the primate cerebral cortex. Cereb Cortex. 1(1):1-47. 1991.
Foster et al. Laminar organization of efferent cells in the parietal cortex of the Virginia opossum. Exp Brain Res. 43(3-4):330-336. 1981.
Francois et al. Distribution and morphology of nigral axons projecting to the thalamus in primates. J Comp Neurol. 447(3):249-260. 2002.
Fujita et al. Intrinsic connections in the macaque inferior temporal cortex. J Comp Neurol. 368(4):467-486. 1996.

(56) References Cited

OTHER PUBLICATIONS

Fujiyama et al. Exclusive and common targets of neostriatofugal projections of rat striosome neurons: a single neuron-tracing study using a viral vector. Eur J Neurosci. 33(4):668-77. 2011.
Fuller et al. Reassessment of the structural basis of the ascending arousal system. J Comp Neurol. 519(5):933-956. 2011.
Fulton. Cerebral cortex: Architecture. intracortical connections. motor projections. Physiology of the nervous system (J. Fulton. ed.). Outlines of Physiology Series. New York: Oxford University Press. 2nd ed. ed.. pp. 274-301. 1943.
Gabbott et al. Local circuit neurons in the medial prefrontal cortex (areas 24a.b.c. 25 and 32) in the monkey: I. cell morphology and morphometrics. J Comp Neurol. 364(4):567-608. 1996.
Gandia et al. Afferent projections to the reticular thalamic nucleus from the globus pallidus and the substantia nigra in the rat. Brain Res Bull. 32(4):351-8. 1993.
Gerfen et al. Modulation of striatal projection systems by dopamine. Annu Rev Neurosci. 2010 Pages needed.
Gerfen. The neostriatal mosaic: compartmentalization of corticostriatal input and striatonigral output systems. Nature. 311(5985):461-464. 1984.
Gerfen. The neostriatal mosaic: striatal patch-matrix organization is related to cortical lamination. Science. 246(4928):385-388. 1989.
Geschwind. Disconnexion syndromes in animals and man. i. Brain. 88(2):237-294. 1965.
Geschwind. Disconnexion syndromes in animals and man. ii. Brain. 88(3):585-644. 1965.
Ghosh et al. Morphology of pyramidal neurones in monkey motor cortex and the synaptic actions of their intracortical axon collaterals. J Physiol. 400:593-615. 1988.
Gibson et al. Two networks of electrically coupled inhibitory neurons in neocortex. Nature. 402(6757):75-79. 1999.
Giguere et al. Mediodorsal nucleus: areal. laminar. And tangential distribution of afferents and efferents in the frontal lobe of rhesus monkeys. J Comp Neurol. 277(2):195-213. 1988.
Glickstein et al. Corticopontine projection in the macaque: the distribution of labelled cortical cells after large injections of horseradish peroxidase in the pontine nuclei. J Comp Neurol. 235(3):343-59. 1985.
Goldman-Rakic et al. The primate mediodorsal (md) nucleus and its projection to the frontal lobe. J Comp Neurol. 242(4):535-560. 1985.
Goldman-Rakic. Regional and cellular fractionation of working memory. Proc Natl Acad Sci USA. 93(24):13473-13480. 1996.
Gould. How widespread is adult neurogenesis in mammals?. Nat Rev Neurosci. 8(6):481-488. 2007.
Grafton et al. Localization of grasp representations in humans by positron emission tomography. Experimental Brain Research. 112(1):__. 1996.
Grenier et al. Leading role of thalamic over cortical neurons during postinhibitory rebound excitation. Proc Natl Acad Sci USA. 95(23):13929-13934. 1998.
Haber et al. Topographic organization of the ventral striatal efferent projections in the rhesus monkey: an anterograde tracing study. J Comp Neurol. 293(2):282-298. 1990.
Haber. The primate basal ganglia: parallel and integrative networks. J Chem Neuroanat. 26(4):317-330. 2003.
Hackett et al. Architectonic identification of the core region in auditory cortex of macaques, chimpanzees, and humans. Journal of Comparative Neurology. 441(3):197-222. 2001.
Hamani et al. The motor thalamus in neurosurgery. Neurosurgery. 58(1):146-158. 2006.
Hanbery et al. Independence of diffuse thalamo-cortical projection system shown by specific nuclear destructions. J Neurophysiol. 16(3):252-271. 1953.
Hanbery et al. The non-specific thalamocortical projection system. J Neurosurg. 11(1):24-25. 1954.
Hardman et al. Comparison of the basal ganglia in rats, marmosets, macaques, baboons, and humans: volume and neuronal number for the output, internal relay, and striatal modulating nuclei. J Comp Neurol. 445(3):238-55. 2002.
Hazrati et al. Contralateral pallidothalamic and pallidotegmental projections in primates: an anterograde and retrograde labeling study. Brain Res. 567(2):212-23. 1991.
Hazrati et al. Projection from the external pallidum to the reticular thalamic nucleus in the squirrel monkey. Brain Res. 550(1):142-146. 1991.
Heindel et al. Neuropsychological evidence for multiple implicit memory systems: a comparison of Alzheimer's, Huntington's, and Parkinson's disease patients. Journal of Neuroscience. 9(2):582-587. 1989.
Herkenham. Laminar organization of thalamic projections to the rat neocortex. Science. 207(4430):532-535. 1980.
Herkenham. The afferent and efferent connections of the ventromedial thalamic nucleus in the rat. J Comp Neurol. 183(3):487-517. 1979.
Herrero et al. Functional anatomy of thalamus and basal ganglia. Childs Nerv Syst. 18(8):386-404. 2002.
Hestrin et al. Electrical synapses define networks of neocortical gabaergic neurons. Trends in Neurosciences. 28(6):304-309. 2005.
Hohl-Abrahao et al. Topographical mapping of the thalamocortical projections in rodents and comparison with that in primates. Exp Brain Res. 87(2):283-294. 1991.
Insausti et al. The entorhinal cortex of the monkey: Iii. subcortical afferents. J Comp Neurol. 264(3):396-408. 1987.
Jones et al. Areal differences in the laminar distribution of thalamic afferents in cortical fields of the insular. parietal and temporal regions of primates. J Comp Neurol. 168(2):197-247. 1976.
Jones et al. Cells of origin and terminal distribution of corticostriatal fibers arising in the sensory-motor cortex of monkeys. J Comp Neurol. 173(1):53-80. 1977.
Jones et al. Size, laminar and columnar distribution of efferent cells in the sensory-motor cortex of monkeys. J Comp Neurol. 175(4):391-438. 1977.
Jones. Some aspects of the organization of the thalamic reticular complex. J Comp Neurol. 162(3):285-308. 1975.
Jones. Viewpoint: the core and matrix of thalamic organization. Neuroscience. 85(2):331-45. 1998.
Kakei et al. Thalamic terminal morphology and distribution of single corticothalamic axons originating from layers 5 and 6 of the cat motor cortex. J Comp Neurol. 437(2):170-85. 2001.
Kaneko et al. Predominant information transfer from layer III pyramidal neurons to corticospinal neurons. J Comp Neurol. 423(1):52-65. 2000.
Katz. Local circuitry of identified projection neurons in cat visual cortex brain slices. J Neurosci. 7(4):1223-1249. 1987.
Kawaguchi et al. Striatal interneurons: chemical, physiological and morphological characterization. Trends Neurosci. 18(12):527-35. 1995.
Kelly et al. Cerebellar loops with motor cortex and prefrontal cortex of a nonhuman primate. J Neurosci. 23(23):8432-8444. 2003.
Kievit et al. Organization of the thalamo-cortical connexions to the frontal lobe in the rhesus monkey. Exp Brain Res. 29(3-4):299-322. 1977.
Kimura et al. Impulse propagation along thalamocortical fibers can be detected magnetically outside the human brain. J Neurosci. 28(47):12535-12538. 2008.
Kimura et al. Myelination and isochronicity in neural networks. Front Neuroanat. 3:12. 2009.
Knight. Neuroscience. Neural networks debunk phrenology. Science. 316(5831):1578-1579. 2007.
Kobayashi et al. Macaque monkey retrosplenial cortex: II. Cortical afferents. J Comp Neurol. 466(1):48-79. 2003.
Kobayashi et al. Macaque monkey retrosplenial cortex: III. Cortical efferents. J Comp Neurol. 502(5):810-33. 2007.
Kotter. Online retrieval, processing, and visualization of primate connectivity data from the cocomac database. Neuroinformatics. 2(2):127-44. 2004.
Kreczmanski et al. Volume, neuron density and total neuron number in five subcortical regions in schizophrenia. Brain. 130(Pt 3):678-92. 2007.
Kritzer et al. Intrinsic circuit organization of the major layers and sublayers of the dorsolateral prefrontal cortex in the rhesus monkey. J Comp Neurol. 359(1):131-143. 1995.

(56) References Cited

OTHER PUBLICATIONS

Kunishio et al. Primate cingulostriatal projection: limbic striatal versus sensorimotor striatal input. J Comp Neurol. 350(3):337-56. 1994.
Langer et al. Distinct nigrostriatal projection systems innervate striosomes and matrix in the primate striatum. Brain Res. 498(2):344-50. 1989.
Lauterbach. The neuropsychiatry of Parkinson's disease. Minerva Med. 96(3):155-73. 2005.
Lavenex et al. Perirhinal and parahippocampal cortices of the macaque monkey: projections to the neocortex. Journal of Comparative Neurology. 447(4):394-420. 2002.
Lee et al. Basal ganglia control of substantia nigra dopaminergic neurons. J Neural Transm Suppl. 1(73):71-90. 2009.
Leichnetz et al. Cortical projections to the paramedian tegmental and basilar pons in the monkey. J Comp Neurol. 228(3):388-408. 1984.
Lemon et al. Comparing the function of the corticospinal system in different species: organizational differences for motor specialization?. Muscle Nerve. 32(3):261-79. 2005.
Letinic et al. Origin of gabaergic neurons in the human neocortex. Nature. 417(6889):645-649. 2002.
LeVay et al. The visual claustrum of the cat. I. Structure and connections. J Neurosci. 1(9):956-980. 1981.
LeVay. Synaptic organization of claustral and geniculate afferents to the visual cortex of the cat. J Neurosci. 6(12):3564-3575. 1986.
Levesque et al. Axonal arborizations of corticostriatal and corticothalamic fibers arising from the second somatosensory area in the rat. Cereb Cortex. 6(6):759-770. 1996.
Levesque et al. GABAergic interneurons in human subthalamic nucleus. Mov Disord. 20(5):574-584. 2005.
Levesque et al. The striatofugal fiber system in primates: a reevaluation of its organization based on single-axon tracing studies. Proc Natl Acad Sci USA. 102(33):11888-11893. 2005.
Levitt et al. Topography of pyramidal neuron intrinsic connections in macaque monkey prefrontal cortex (areas 9 and 46). J Comp Neurol. 338(3):360-376. 1993.
Lund et al. Anatomical organization of primate visual cortex area vii. J Comp Neurol. 202(1):19-45. 1981.
Lund et al. Comparison of intrinsic connectivity in different areas of macaque monkey cerebral cortex. Cereb Cortex. 3(2):148-162. 1993.
Lund et al. Local circuit neurons of developing and mature macaque pre-frontal cortex: Golgi and immunocytochemical characteristics. J Comp Neurol. 328(2):282-312. 1993.
Macchi et al. Toward an agreement on terminology of nuclear and subnuclear divisions of the motor thalamus. J Neurosurg. 86(4):670-685. 1997.
Maniadakis et al. Distributed brain modelling by means of hierarchical collaborative coevolution. Proc of IEEE Congress on Evolutionary Computation. Sep. 2005; 3:2699-2706.
Marcus et al. Informatics and data mining tools and strategies for the human connectome project. Front Neuroinform. 5:4. 2011.
Markram. The blue brain project. Nat Rev Neurosci. Feb. 2006 ; 7(2):153-160.
Matsuda et al. Single nigrostriatal dopaminergic neurons form widely spread and highly dense axonal arborizations in the neostriatum. J Neurosci. 29(2):444-453. 2009.
McFarland et al. Organization of thalamostriatal terminals from the ventral motor nuclei in the macaque. J Comp Neurol. 429(2):321-336. 2001.
McFarland et al. Thalamic relay nuclei of the basal ganglia form both reciprocal and nonreciprocal cortical connections, linking multiple frontal cortical areas. J Neurosci. 22(18):8117-8132. 2002.
Medalla et al. Diversity of laminar connections linking periarcuate and lateral intraparietal areas depends on cortical structure. Eur J Neurosci. 23(1):161-179. 2006.
Melchitzky et al. Synaptic targets of the intrinsic axon collaterals of supragranular pyramidal neurons in monkey prefrontal cortex. J Comp Neurol. 430(2):209-221. 2001.
Meyer et al. The spiny stellate neurons in layer iv of the human auditory cortex. A golgi study. Neuroscience. 33(3):489-498. 1989.
Milner. The medial temporal-lobe amnesic syndrome. Psychiatr Clin North Am. 28(3):599-611. 2005.
Mitchell et al. Corticocortical and thalamocortical projections to layer i of the frontal neocortex in rats. Brain Res. 921(1-2):68-77. 2001.
Molnar et al. Comparative aspects of cerebral cortical development. Eur J Neurosci. 23(4):921-934. 2006.
Molnar et al. Towards the classification of subpopulations of layer v pyramidal projection neurons. Neurosci Res. 55(2):105-115. 2006.
Monsell. Components of working memory underlying verbal skills: a distributed capacities view. International Symposium on Attention and Performance X (B. H. And B. D. eds.). Hillsdale. NJ: Erlbaum. 1984; 10:327-350.
Morishima et al. Recurrent connection patterns of corticostriatal pyramidal cells in frontal cortex. J Neurosci. 26(16):4394-4405. 2006.
Mountcastle. Introduction. Cerebral cortex. 13:2-4. 2003.
Murphy et al. Development of human visual cortex: a balance between excitatory and inhibitory plasticity mechanisms. Dev Psychobiol. 46(3):209-221. 2005.
Nakano et al. An autoradiographic study of cortical projections from motor thalamic nuclei in the macaque monkey. Neuroscience Research. 13(2):119-137. 1992.
Nambu et al. Excitatory cortical inputs to pallidal neurons via the subthalamic nucleus in the monkey. J Neurophysiol. 84(1):289-300. 2000.
Northcutt et al. The emergence and evolution of mammalian neocortex. Trends Neurosci. 18(9):373-379 1995.
O'Neill et al. Play it again: reactivation of waking experience and memory. Trends Neurosci. 33(5):220-229. 2010.
Oorschot. Total number of neurons in the neostriatal. pallidal. subthalamic. and substantia nigral nuclei of the rat basal ganglia: a stereological study using the cavalieri and optical disector methods. J Comp Neurol. 366(4):580-599. 1996.
Pare et al. Projections of brainstem core cholinergic and non-cholinergic neurons of cat to intralaminar and reticular thalamic nuclei. Neuroscience. 25(1):69-86. 1988.
Parent et al. Distinct afferents to internal and external pallidal segments in the squirrel monkey. Neurosci Lett. 96(2):140-144. 1989.
Parent et al. Single-axon tracing and three-dimensional reconstruction of centre median-parafascicular thalamic neurons in primates. J Comp Neurol. 481(1):127-144. 2005.
Parent et al. Single-axon tracing study of corticostriatal projections arising from primary motor cortex in primates. J Comp Neurol. 496(2):202-13. 2006.
Parent et al. The pallidofugal motor fiber system in primates. Parkinsonism Relat Disord. 10(4):203-211. 2004.
Parent et al. Two types of projection neurons in the internal pallidum of primates: single-axon tracing and three-dimensional reconstruction. J Comp Neurol. 439(2):162-175. 2001.
PCT/US2012/069286 International search report and written opinion dated Apr. 1, 2013.
PCT/US2012/069286 International Preliminary Report on Patentability dated Jun. 26, 2014.
Pearson et al. The organization of the connections between the cortex and the claustrum in the monkey. Brain Res. 234(2):435-441. 1982.
Peters et al. The organization of pyramidal cells in area 18 of the rhesus monkey. Cereb Cortex. 7(5):405-421. 1997.
Price et al. The development of cortical connections. Eur J Neurosci. 23(4):910-20. 2006.
Pucak et al. Patterns of intrinsic and associational circuitry in monkey prefrontal cortex. J Comp Neurol. 376(4):614-630. 1996.
Rakic. A small step for the cell, a giant leap for mankind: a hypothesis of neocortical expansion during evolution. Trends Neurosci. 18(9):383-388. 1995.
Ramnani. The primate cortico-cerebellar system: anatomy and function. Nat Rev Neurosci. 7(7):511-22. 2006.
Rempel-Clower et al. The laminar pattern of connections between prefrontal and anterior temporal cortices in the rhesus monkey is related to cortical structure and function. Cereb Cortex. 10(9):851-865. 2000.
Rockland et al. Collateralized divergent feedback connections that target multiple cortical areas. J Comp Neurol. 373(4):529-548. 1996.

(56) References Cited

OTHER PUBLICATIONS

Rockland et al. Single axon analysis of pulvinocortical connections to several visual areas in the macaque. J Comp Neurol. 406(2):221-250. 1999.
Rockland et al. Some thoughts on cortical minicolumns. Exp Brain Res. 158(3):265-377. 2004.
Rockland. Configuration. in serial reconstruction. of individual axons projecting from area v2 to v4 in the macaque monkey. Cereb Cortex. 2(5):353-374. 1992.
Romanski et al. Topographic organization of medial pulvinar connections with the prefrontal cortex in the rhesus monkey. J Comp Neurol. 379(3):313-332. 1997.
Rouiller et al. The dual pattern of corticothalamic projection of the primary auditory cortex in macaque monkey. Neurosci Lett. 358(1):49-52. 2004.
Sadikot et al. Efferent connections of the centromedian and parafascicular thalamic nuclei in the squirrel monkey: A PHA-L study of subcortical projections. J Comp Neurol. 315(2):137-159. 1992.
Sadikot et al. Efferent connections of the centromedian and parafascicular thalamic nuclei in the squirrel monkey: a light and electron microscopic study of the thalamostriatal projection in relation to striatal heterogeneity. J Comp Neurol. 320(2):228-242. 1992.
Sakai et al. Comparison of cerebellothalamic and pallidothalamic projections in the monkey (macaca fuscata): a double anterograde labeling study. J Comp Neurol. 368(2):215-28. 1996.
Sato et al. Single-axon tracing study of neurons of the external segment of the globus pallidus in primate. J Comp Neurol. 417(1):17-31. 2000.
Satoh et al. Distribution of central cholinergic neurons in the baboon (papio papio). i. general morphology. Journal of Comparative Neurology. 236(2):197-214. 1985.
Scheibel et al. The organization of the nucleus reticularis thalami: a Golgi study. Brain Res. 1(1):43-62. 1966.
Schmahmann et al. Cerebral white matter: neuroanatomy. clinical neurology. and neurobehavioral correlates. Ann N Y Acad Sci. 1142:266-309. 2008.
Schmahmann et al. Prefrontal cortex projections to the basilar pons in rhesus monkey: implications for the cerebellar contribution to higher function. Neurosci Lett. 199(3):175-178. 1995.
Sidibe et al. Efferent connections of the internal globus pallidus in the squirrel monkey: I. topography and synaptic organization of the pallidothalamic projection. J Comp Neurol. 382(3):323-347. 1997.
Sidibe et al. Nigral and pallidal inputs to functionally segregated thalamostriatal neurons in the centromedian/parafascicular intralaminar nuclear complex in monkey. J Comp Neurol. 447(3):286-99. 2002.
Smith et al. Microcircuitry of the direct and indirect pathways of the basal ganglia. Neuroscience. 86(2):353-387. 1998.
Smith et al. The thalamostriatal system: a highly specific network of the basal ganglia circuitry. Trends Neurosci. 27(9):520-527. 2004.
Solari et al. (2011) Cognitive consilience: primate non-primary neuroanatomical circuits underlying cognition. Front Neuroanat. vol. 5:Art 65 pp. 1-23.
Solari. A unified anatomical theory and computational model of cognitive information processing in the mammalian brain and the introduction of DNA reco codes. PhD thesis. University of California. San Diego. 2009.
Soloway et al. Dendritic morphology of callosal and ipsilateral projection neurons in monkey prefrontal cortex. Neuroscience. 109(3):461-71. 2002.
Squire et al. Retrograde amnesia and memory consolidation: a neurobiological perspective. Curr Opin Neurobiol. 5(2):169-177. 1995.
Squire et al. Structure and function of declarative and nondeclarative memory systems. Proc Natl Acad Sci USA. 93(24):13515-13522. 1996.
Squire. Memory systems of the brain: a brief history and current perspective. Neurobiology of Learning and Memory. 82:171-177. 2004.

Stanfield. The development of the corticospinal projection. Prog Neurobiol. 38(2):169-202. 1992.
Steriade et al. Projections of cholinergic and non-cholinergic neurons of the brainstem core to relay and associational thalamic nuclei in the cat and macaque monkey. Neuroscience. 25(1):47-67. 1988.
Steriade. Grouping of brain rhythms in corticothalamic systems. Neuroscience. 137(4):1087-1106. 2006.
Surmeier et al. D1 and D2 dopamine-receptor modulation of striatal glutamatergic signaling in striatal medium spiny neurons. Trends Neurosci. 30(5):228-235. 2007.
Szentagothai. The 'module-concept' in cerebral cortex architecture. Brain Res. 95(23):475-496. 1975.
Tanaka. Columns for complex visual object features in the inferotemporal cortex: Clustering of cells with similar but slightly different stimulus selectivities. Cerebral Cortex. 13(1):90-99. 2003.
Tande et al. Parafascicular nucleus projection to the extrastriatal basal ganglia in monkeys. Neuroreport. 17(3):277-280. 2006.
Tanigawa et al. Distribution, morphology, and gammaaminobutyric acid immunoreactivity of horizontally projecting neurons in the macaque inferior temporal cortex. J Comp Neurol. 401(1):129-143. 1998.
Tanne-Gariepy et al. Projections of the claustrum to the primary motor, premotor, and prefrontal cortices in the macaque monkey. J Comp Neurol. 454(2):140-157. 2002.
Tardif et al. Laminar specificity of intrinsic connections in Broca's area. Cerebral Cortex. 17(12):2949-2960. 2007.
Teyler et al. The hippocampal indexing theory and episodic memory: updating the index. Hippocampus. 17(12):1158-1169. 2007.
Thomson et al. Postsynaptic pyramidal target selection by descending layer iii pyramidal axons: dual intracellular recordings and biocytin filling in slices of rat neocortex. Neuroscience. 84(3):669-683. 1998.
Thomson et al. Synaptic interactions in neocortical local circuits: dual intracellular recordings in vitro. Cereb Cortex. 7(6):510-522. 1997.
Toro et al. Brain size and folding of the human cerebral cortex. Cereb Cortex. 18(10):2352-2357. 2008.
Triarhou. A proposed number system for the 107 cortical areas of economo and koskinas, and brodmann area correlations. Stereotact Funct Neurosurg. 85(5):204-215. 2007.
Trojanowski et al. Areal and laminar distribution of some pulvinar cortical efferents in rhesus monkey. J Comp Neurol. 169(3):371-92. 1976.
Trojanowski et al. The morphology and laminar distribution of corticopulvinar neurons in the rhesus monkey. Exp Brain Res. 28(1-2):51-62. 1977.
Tsao et al. A cortical region consisting entirely of face-selective cells. Science. 311(5761):670-674. 2006.
Van Essen. Corticocortical and thalamocortical information flow in the primate visual system. Progress in Brain Research. 149:173-183. 2005.
Velayos et al. Topographical organization of the projections from the reticular thalamic nucleus to the intralaminar and medial thalamic nuclei in the cat. J Comp Neurol. 279(3):457-469. 1989.
Verzeano et al. Nature of recruiting response. J Neurophysiol. 16(2):183-195. 1953.
Vogt et al. Cingulate cortex of the rhesus monkey: I. cytoarchitecture and thalamic afferents. J Comp Neurol. 262(2):256-270. 1987.
Voogd. The human cerebellum. J Chem Neuroanat. 26(4):243-252. 2003.
Voytko et al. Cholinergic immunoreactive fibers in monkey anterior temporal cortex. Cereb Cortex. 2(1):48-55. 1992.
Walker. A cytoarchitectural study of the prefrontal area of the macaque monkey. J Comp Neurol. 73(1):59-86. 1940.
Walker. Huntington's disease. Lancet. 369(9557):218-128. 2007.
Witter et al. Functional organization of the extrinsic and intrinsic circuitry of the parahippocampal region. Progress in Neurobiology. 33:161-253. 1989.
Wolf et al. Evaluating the affective component of the cerebellar cognitive affective syndrome. J Neuropsychiatry Clin Neurosci. 21(3):245-253. 2009.

(56) References Cited

OTHER PUBLICATIONS

Yeterian et al. Laminar origin of striatal and thalamic projections of the prefrontal cortex in rhesus monkeys. Exp Brain Res. 99(3):383-398. 1994.
Yoshimura et al. Excitatory cortical neurons form fine-scale functional networks. Nature. 433:868-873. 2005.
Zaitsev et al. Interneuron diversity in layers 2-3 of monkey prefrontal cortex. Cereb Cortex. 19(7):1597-1615. 2009.
Zaitsev et al. Localization of calcium-binding proteins in physiologically and morphologically characterized interneurons of monkey dorsolateral prefrontal cortex. Cereb Cortex. 15(8):1178-1186. 2005.
Zhou et al. An ultra-short dopamine pathway regulates basal ganglia output. J Neurosci. 29(33):10424-10435. 2009.
Zikopoulos et al. Prefrontal projections to the thalamic reticular nucleus form a unique circuit for attentional mechanisms. J Neurosci. 26(28):7348-7361. 2006.

* cited by examiner

COMPUTER-IMPLEMENTED SIMULATED INTELLIGENCE CAPABILITIES BY NEUROANATOMICALLY-BASED SYSTEM ARCHITECTURE

CROSS REFERENCE TO RELATED APPLICATIONS

This application claims the benefit of U.S. Application Ser. No. 61/570,040, filed Dec. 13, 2011, which is hereby incorporated by reference in its entirety.

BACKGROUND OF THE INVENTION

The desire to create Artificial Intelligence (AI) has existed for over 60 years. The goal of AI is to deliver human-like information processing capabilities in a computer in an artificial way. Specifically, attempts to create AI have involved programming a computer in an arbitrary manner selected by an engineer to attempt to accomplish specific processing tasks.

SUMMARY OF THE INVENTION

Despite enduring efforts, computers have not been able to mimic even basic tasks that humans perform at very early ages like speech understanding, vision understanding, multi-modal sensory integration, and dynamic cognitive information processing, among many possible examples. A notable fact that can potentially explain the failures over the last 60+ years is that existing AI approaches have not implemented computer solutions that simulate the systems level architecture of the mammalian brain. To date, the ultimate goal of AI engineers has not been to accurately simulate human information processing in the same way the human brain processes information.

Disclosed herein, in some embodiments, is a simulated intelligence approach that simulates the system level neuroanatomical architecture of the mammalian brain in an accurate way. The only way to accurately replicate the function of the vertebrate, mammalian brain, including the human brain, with simulated intelligence is to simulate the function of its neuroanatomy. Any other approach may produce AI, but will not perform simulated intelligence. Many systems such as "neural networks" utilize "neuronal" processing elements and thus claim a biological basis; however, the organization of the network (e.g., connectivity) at any level cannot be correlated with circuits in the mammalian brain. The establishment of a computer-implemented systems level architecture that can be correlated with the mammalian brain has yet to be established and is the non-trivial critical design feature to establishing simulated intelligence.

The mammalian brain has evolved over millions of years into its present form. The primate and human brain evolved from the basic mammalian neuroanatomical architectural blueprint. The existing architecture of the human brain endows all the information processing capabilities demonstrated by humans. In order to endow computers with similar information processing capabilities, we have developed a Neuroanatomically Based System (NABS) architecture in a computer that replicates the neuroanatomical architectural blueprint found in the vertebrate and mammalian brain. This architecture is disclosed herein as computer-implemented, systems level neuroanatomical architecture to perform computer-based information processing and behavioral tasks that only humans and other biological systems can do today. We define hierarchical system modules and their connectivity that are essential to accurately replicating mammalian brain function in a computer. The basic architecture is sensory/information domain agnostic, meaning that it performs identical information processing operations on any appropriately pre-processed information. For example, the disclosed architecture, like the human brain, processes speech, vision, behavioral planning, language, and the like with the same modular neuroanatomical components.

Similar to a human, the systems disclosed, in some embodiments, undergo a series of "developmental" stages within which they learn internal perceptions and behavioral perception actions. Different modules generally perform distinct types of learning (unsupervised, semi-supervised, supervised, adaptive, and reinforcement) although the interactions between modules over time dictate that overlap in learning methods occurs. At the completion of developmental training, the system is in an "adult" stage, whereby tasks can be assigned to the system.

Accordingly, in one aspect, disclosed herein are computer-implemented systems for simulated intelligence information processing comprising: a digital processing device comprising an operating system configured to perform executable instructions and a memory; a computer program including instructions executable by the digital processing device to create a hierarchical software architecture for creation of applications that simulate a brain, the architecture comprising: a module for providing a functional interpretation of the prosencephalon; a module for providing a functional interpretation of the mesencephalon; and a module for providing a functional interpretation of the rhombencephalon; wherein said hierarchical software architecture simulates the cognitive information processing of vertebrate, mammalian, primate, or human neuroanatomy. In some embodiments, the module for providing a functional interpretation of the prosencephalon comprises functional interpretations of the telencephalon and diencephalon. In some embodiments, the module for providing a functional interpretation of the mesencephalon comprises functional interpretations of inferior and superior colliculi and dopamine generating structures Snc and VTA. In some embodiments, the module for providing a functional interpretation of the rhombencephalon comprises functional interpretations of the metencephalon and myelencephalon. In further embodiments, the module for providing a functional interpretation of the metencephalon comprises functional interpretations of the pons, cerebellum, and dcn. In further embodiments, the module for providing a functional interpretation of the telencephalon comprises functional interpretations of the pallium and subpallium. In further embodiments, the module for providing a functional interpretation of the diencephalon comprises functional interpretations of the thalamus, hypothalamus, and stn. In still further embodiments, the module for providing a functional interpretation of the thalamus comprises functional interpretations of the Ts, Ti, TL1, and TRN. In some embodiments, the module for providing a functional interpretation of the pallium comprises functional interpretations of the isocortex, allocortex and, claustro/amygdaloid structure. In further embodiments, the module for providing a functional interpretation of the subpallium comprises functional interpretations of GABA structures and Ach structures. In further embodiments, the module for providing a functional interpretation of the GABA structures comprises functional interpretations of cortical interneurons, the striatum, the Gpi/Snr, and pallidum. In some embodiments, the module for providing a functional interpretation of the Ach comprises functional interpretations of Pach, BF, and Sach. In some embodiments, the module for providing a functional interpretation of the isocortex comprises functional interpretations of koniocortex, agranular cortex, and isocortex proper. In some embodiments, the module for providing a functional interpretation of the striatum comprises striatum matrix SmD1, striatum matrix SmD2, and striatum patch Sp. In some embodiments, the module for providing a functional interpretation of the isocortex comprises functional interpretations of C2, C3, C3a, C4, C5s, C5p, C56, C6m, and C6t. In some embodiments, the module for providing a functional interpretation of the cortical interneurons comprises CR, CH, DB, M, BK. In some embodiments, the module for providing a functional interpretation of the claustro/amygdaloid structure comprises the claustrum and amygdala. In some embodiments, the module for providing a functional interpretation of the allocortex comprises a functional interpretation of the perirhinal/parahippocampal cortex, and the hippocampus. In further embodiments, the module for providing a functional interpretation of the perirhinal/parahippocampal cortex comprises functional interpretations of PH23 and PH56. In further embodiments, the module for providing a functional interpretation of the hippocampus comprises functional interpretations of the dentate, CA3, CA1, and subiculum. In some embodiments, the functional interpretation of the prosencephalon comprises: a topographic and hierarchically organized and connected set of one or more perception state modules and one or more perception action modules; wherein each perception state module is capable of learning temporally and topographically invariant perception states, selecting perception states based on the activity of other perceptual states and perceptual actions transmitted through connections in the brain; wherein each perception action module is capable of learning temporally and topographically ordered perception actions, selecting perception actions based on the activity of other perceptual states and perceptual actions transmitted through connections in the brain; wherein zero or more perceptual state modules are connected to each other; wherein one or more perceptual state modules are connected to one or more perceptual action modules; wherein one or more perceptual state modules are connected to sensors for externally driven input perceptual states; and wherein one or more perceptual action modules are connected to actuators for externally generated output perceptual actions. In some embodiments, the functional interpretation of the mesencephalon comprises: at least one module for providing reward reinforcement learning signals for the entire brain; and at least one module for providing attention and arousal control signals for the entire brain. In some embodiments, the functional interpretation of the rhombencephalon comprises: at least one module for providing a behavioral model of perception state sequences and perception action sequences; and at least one module for providing a stabilizing dynamical controller for controlling the temporally ordered selection of perceptual states and perceptual actions. In some embodiments, the hierarchical software architecture comprises: at least one module for providing short-term memory; at least one module for providing long-term memory; at least one module for providing perception state representation, selection, and working memory; at least one module for providing perception action selection; at least one module for providing perception action output; and at least one module for providing perception state and action control. In further embodiments, the at least one module for providing short-term memory comprises a functional interpretation of allocortex wherein temporally recent weighted associations are stored between active perception states having high co-occurrence or significance as deemed by feedback from other telencephalon substructures. In further embodiments, the at least one module for providing long-term memory comprises a functional interpretation of isocortex wherein semi-permanent weighted associations are stored between perception states previously stored in short-term memory. In further embodiments, the at least one module for providing perception state representation, selection, and working memory comprises a functional interpretation of telencephalon wherein temporally and topographically invariant representations of perception states are learned. In further embodiments, the at least one module for providing perception state representation, selection, and working memory comprises a functional interpretation of telencephalon wherein temporally and topographically ordered representations of perception actions are learned. In further embodiments, the at least one module for providing perception state representation, selection, and working memory comprises a functional interpretation of prosencephalon wherein perception states are maintained as graded activations for working memory enabling graded information communication to connected perception states and perception actions. In further embodiments, the at least one module for providing perception state representation, selection, and working memory comprises a functional interpretation of isocortex modules wherein perception states are selected based on control input and context from other selected perception states in the pallium. In further embodiments, the at least one module for providing perception action selection comprises a functional interpretation of subpallium wherein temporal sequences of perception action selection patterns are learned, stored and re-activated in connection to mesencephalon reinforcement learning. In further embodiments, the at least one module for providing perception action output comprises a functional interpretation of isocortex C5p wherein topographically ordered behavioral action outputs are learned and stored. In further embodiments, the at least one module for providing perception state and action control comprises a functional interpretation of the rhombencephalon wherein control signals are generated to regulate the state of information processing in the perception state, representation and working memory module. In further embodiments, the at least one module for providing perception state and action control comprises a functional interpretation of the subpallium and diencephalon wherein control signals are generated to regulate the state of information processing in the perception state, representation and working memory module. In some embodiments, the applications are adapted for use in general information processing. In some embodiments, the applications are adapted for use in sensory perception. In further embodiments, the applications are adapted for use in one or more of: sound processing, speech processing, vision processing, language processing, text processing, chemical signature processing, tactile sensor processing, accelerometer measurement processing, and topographically organized multi-modal sensor processing. In some embodiments, the applications are adapted for use in behavioral action generation. In further embodiments, the applications are adapted for use in one or more of speech generation, sound generation, image generation, text generation, language generation, language translation, information content management, healthcare decision generation, navigation, and data driven decision generation.

In another aspect, disclosed herein are non-transitory computer readable media encoded with a computer program including instructions executable by a digital processing device to create a neuroanatomically based software architecture for creation of applications that simulate vertebrate cognitive information processing, the architecture comprising: one module configured to implement the functional interpretation of the highest level brain neuroanatomical structure; and at least one module configured to implement the functional interpretation of structures within the brain and the connections between said structures; provided that the architecture includes the ability to simulate said functional interpretations of structures and connections; wherein the simulation performs information processing correlating with the cognitive information processing performed by vertebrate, mammalian, primate, or human neuroanatomy. In some embodiments, the functional interpretation of neuroanatomical structures within the brain is comprised of a hierarchical set of one or more functional interpretations of neuroanatomical structures. In some embodiments, the software architecture is generated by a recursive algorithm comprised of a definition of neuroanatomical structures and their hierarchical relationship, a definition of connections between said neuroanatomical structures at each hierarchical level, a definition of the functional interpretation of said neuroanatomical structures and connections, and the ability to connect said structures with said connections in a recursive manner. In some embodiments, each module is implemented as: one or more neural structure classes, wherein a neural type class is the lowest level neural structure class and defines the dynamic transformation of input information to output information through the lowest level structure; one or more neural layer classes within which neural structure classes are instantiated; one or more projection classes defining topological connectivity between neural structures in a source neural layer and neural target layer; one or more synapse classes defining the functional transfer of information from a source structure to a target structure; two or more instantiated neural layers containing one or more instantiated structures in each layer; one or more instantiated projections between layers; one or more instantiated synapses between neural types in source and target layers; and zero or more neural module classes consisting of layers, structures, projections and synapses. In some embodiments, the applications are adapted for use in general information processing. In some embodiments, the applications are adapted for use in sensory perception. In further embodiments, the applications are adapted for use in one or more of: sound processing, speech processing, vision processing, language processing, text processing, chemical signature processing, tactile sensor processing, accelerometer measurement processing, and topographically organized multi-modal sensor processing. In some embodiments, the applications are adapted for use in behavioral action generation. In further embodiments, the applications are adapted for use in one or more of speech generation, sound generation, image generation, text generation, language generation, language translation, information content management, healthcare decision generation, navigation, and data driven decision generation. In some embodiments, the applications are implemented as a web application. In some embodiments, the applications are implemented as a mobile application. In some embodiments, the digital processing device is selected from: a server, a desktop computer, a portable computer, a smartphone, an appliance, and a vehicle.

DETAILED DESCRIPTION OF THE INVENTION

Figure 1:
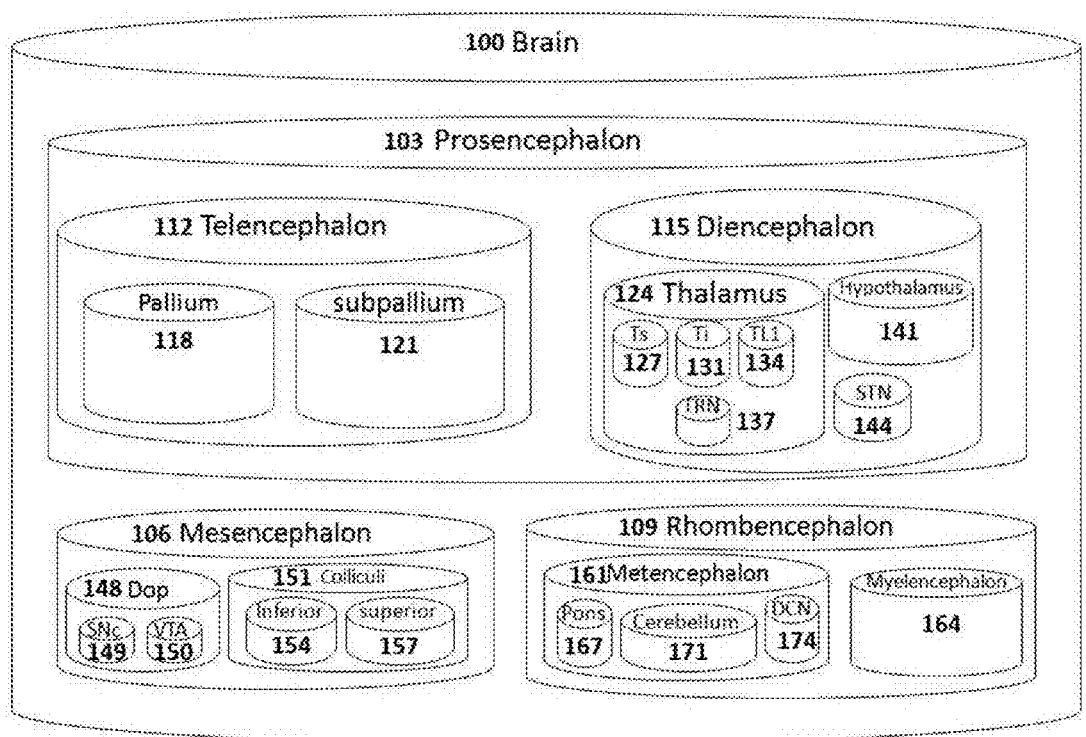
FIG. 1 shows a non-limiting example of a computer implementation of a brain 100; in this case, a brain 100 composed of the developmental structures prosencephalon 103, mesencephalon 106, and rhombencephalon 109 and possessing a hierarchical organization.

Described herein, in various embodiments, are systems, platforms, applications, and methods for creating software architectures that simulate vertebrate, mammalian, primate, or human neuroanatomy in order to replicate corresponding cognitive information processing.

Various Definitions

As used herein, "cognition" or "cognitive information processing" or "cognitive" refers to the information processing performed by a biological or computer system that utilizes sensors to both measure internal properties of the system and to measure external properties of the physical world outside the system, in order to alter the internal state of the system for the purpose of changing the current or future state of internal actuators that will act on the internal state of the system and external actuators that will act on the external world in order to achieve desired goals.

As used herein a "brain" refers to a biological or computer system that comprises functional interpretations of the prosencephalon, mesencephalon, and rhombencephalon.

As used herein, "simulated intelligence" refers to a computer system that simulates the cognitive information processing performed by a brain by implementing functional interpretations of systems level neuroanatomical architecture of that brain and in so doing replicates the intelligence that can be attributed to that brain.

As used herein, "sensory model" refers to a stored dynamical model of the internal and external sensory data that a structure in the brain has had exposure to, has learned from, and has stored.

As used herein, "behavior model" refers to a stored dynamical model of the internal and external behaviors that a structure in the brain is capable of producing.

As used herein, "perception state" refers to the part of a sensory model or behavioral model that represents a dynamical state of the model, wherein the dynamical state can communicate information to any connected perception state or perception action.

As used herein, "perception action" or "action state" refers to the part of a sensory model or behavioral model that represents a dynamical output of the model that can be influenced by connections to one or more perception states in the model.

As used herein, "perceptions" refer to collections of one or more perception states and perception actions in a brain.

As used herein, "structure", "neural structure" or "software structure" refers to a software module that has an internal architecture composed of one or more internal substructures with zero or more internal connections that provides a functional interpretation of a biological neuroanatomical structure by processing input delivered by other structures into output that can be delivered as input to other structures, wherein the simulation of said processing correlates to the processing performed by the biological neuroanatomical structure.

As used herein, "layer" or "neural layer" refers to an N-dimensional space with a defined topology within a brain that is composed of one or more structures or layers and wherein structures or layers hold some position in that topology.

As used herein, "projection" refers to the topologically defined connectivity rules that may change over time under which structures in a source layer are connected to structures in a target layer by those rules.

As used herein, "synapse" refers to a dynamical model for communication of information from a source structure to a target structure, wherein the synapse comprises a modifiable weight and a defined dynamical effect on the target structure.

As used herein, "connection" or "neuroanatomical connection" refers to a projection and synapse.

As used herein, a "circuit" refers to a software module that implements connections between structures and simulates the information processing carried out by the structures and interaction of information through connections between those structures, wherein said module once implemented can then be defined as a structure and utilized as such.

As used herein, "architecture" or "neuroanatomical architecture" refers to the definition, organization, and system capable of forming and implementing the functional interpretation of structures, connections between structures, and circuits within a brain.

As used herein, "developmental function" refers to the information processing operations, and changes that those information processing operations may undergo over time within a structure in order to generate and or simulate the functional interpretation of substructures and circuits that make up said structure.

As used herein, "developmental structure" or "development structure" refers to a structure that additionally has a developmental function.

Neuroanatomy

Relevant aspects of primate neuroanatomy are described in: Solari SVH and Stoner R (2011) Cognitive consilience: primate non-primary neuroanatomical circuits underlying cognition. Front. Neuroanat. 5:65, which is hereby incorporated by reference in its entirety.

1 Primate Non-Primary Homotypical Architecture

If we are to replicate mammalian (e.g., primate, human) cognitive information processing through simulated intelligence with NABS, our understanding must be based on the correct neuroanatomy. Brains follow general principles of development dictated by evolved gene expression patterns[1, 2]; however, for any "rule" or general principle of organization, there can be found an exception to the rule. The described functional circuits are an attempt to elucidate the blueprint of the homotypical neuroanatomical architecture underlying cognition. When we refer to the blueprint of a homotypical architecture, we imply that the underlying neuronal organization and projection rules are the same across different regions of analogous nuclei. If a neuron type X sends its most dense projections to a target location Z and sends collateral projections to location Y, we would consider X→Z the first-order neuroanatomical architecture. In order to create a compact yet comprehensive picture, we focus on the homotypical first-order architecture of the cerebral cortex, thalamus, basal ganglia and their interconnections. This first-order architecture creates a factually consistent starting point upon which to build.

If we assume that neuroanatomical organization defines function, then a homotypical architecture supports the conjecture that different locations of the same neuronal group, although processing different information modalities, processes the information in the similar manner. Our viewpoint is that the cerebral cortex, thalamus, and basal ganglia only perform a limited few cognitive information processing functions. Within a homotypical architecture, each functional circuit determines how information is processed while the differences between the afferent input of two analogous pathways define what information is processed.

2 Neuroanatomical Circuits

Six functional circuits are disclosed herein. The six circuits described are long-term perceptual memory, short-term perceptual memory, perception representation selection and working memory/information processing, behavioral action selection, behavioral action output, cognitive control. The six circuits are created through the developmental evolution of the prosencephalon, mesencephalon, and rhombencephalon. For clarity, each circuit is described in terms of readily distinguishable neuronal subgroups including the cerebral isocortex, parahippocampal gyrus and hippocampus, thalamus, basal ganglia, metencephalon, and basal forebrain.

For clarity, each major neuronal group is placed into only one primary circuit for discussion. However, in a functioning brain, circuits interact and a single neuronal group participates in multiple circuits.

2.1 Consolidated Long-Term Perceptual Memory Circuit

The identification of declarative memory is adopted from Squire as referring to "the capacity for conscious recollection about facts and events" [3]. We define long-term memory as that which is stored semi-permanently in the isocortex. Lesions of the isocortex or of white matter fiber tracts produce a wide variety of stereotypical cognitive deficits[4, 5]. Two distinct long-term memory deficits arise when comparing cortical grey matter lesions to corticocortical white matter lesions, although human lesions are rarely isolated[6, 7]. Localized grey matter lesions result in a reduced capacity to recall and process domain specific information, often manifesting as a form of agnosia (i.e. loss of the ability to recognize). For example, the inability of humans to recognize faces with lesions to the fusiform face area or recognize motion with lesions to cortical area MT. White matter lesions result in subtly different deficits representative of a disconnection of information shared between separate cortical areas. For example, lesions to the arcuate fasciculus disconnect Wernicke's area (speech comprehension) from Broca's area (speech production) and result in deficits in speech repetition [8]. In essence, although speech comprehension and production both independently remain intact, the associations between them have been severed. These two distinct forms of long-term memory exist within the interconnectivity of the cerebral cortex.

2.1.1 Cerebral Cortex

The human cerebral cortex is a 2.5 mm thick sheet of tissue approximately 2400 cm$^2$ (four 8.5×11 pieces of paper) in size folded up around the entire brain[9]. The cerebral cortex consists of a homo-typical six layer pattern of neuron density distribution[10, 11]. The cerebral cortex develops inside out, with neurons in the innermost layer (L6) migrating into place first and neurons in successive outer layers migrating into place later[12]. Cortical laminar differentiation lies along a very clear spectrum with input sensory cortex being the most laminated/granular and output motor cortex being the least laminated/granular[10]. The lamination gradient represents a major clue in functional organization. The cerebral cortex can be grouped into the isocortex (neocortex), allocortex (paleocortex), periallocortex, and koniocortex (primary vision, auditory, somatosensory, and granulous retrosplenial cortex) based on laminar differentiation and developmental origin. The koniocortices are based on the same underlying anatomical principles of six layers and have evolved additional structure for their more specific sensory roles[13]. The patterns of laminar differentiation have been used to parse the entire cerebral cortex into distinct areas often called Brodmann's areas[14, 15]. A large amount of experimental evidence on the cerebral cortex, from lesion studies to electrophysiology to FMRI, point to localized cortical information processing modules on the order of a few square millimeters[16, 17]. Each area appears to process a distinct type of information reflecting the external and internal perceptions/behaviors of the individual, such as visual objects, language, executive plans, or movements[4, 18, 19, 20]. The what of cortical information processing is thus highly localized and modular. The neuroanatomical organization underlying these what regions follows a very homotypical blueprint, which drives a functional perspective that how information is processed throughout the cerebral cortex is the same.

2.1.2 Intracortical Perception Representation Selection and Working Memory/Information Processing Subcircuit Intracortical projections are horizontal corticocortical projections traveling within the grey matter of the cerebral cortex [21]. Although all pyramidal neurons have connections within the cerebral cortex, the prominent source of distant intracortical projections arise mainly from pyramidal neurons within layers 2 and 3, and a sub-set of neurons in layers 5 and 6. The intracortical terminations of C3a and C3b pyramidal neurons are not distributed uniformly, but form patchy or stripe-like patterns of termination which comprise areas up to 20 mm$^2$ in the monkey[22, 23, 24, 25]. Neurons in each layer appear to project horizontally, then the stripe-like terminations (spaced a few 100 μm apart) arise out of vertical collaterals. The laminar specificity and development of these corticocortical striped projections is largely activity dependent [26]. In the monkey, 50% of pyramidal neuron synaptic contacts, within its local stripe (roughly its dendritic tree size), are onto GABAergic inhibitory neurons, while more than 90% of synaptic contacts outside a pyramidal neurons local stripe are onto other pyramidal neurons[27]. The intracortical organization is suggestive that a functional module (~10's mm$^2$) in the isocortex is much larger than the traditional cortical minicolumn (~100's μm$^2$)[28, 29, 30].

Figure 8:
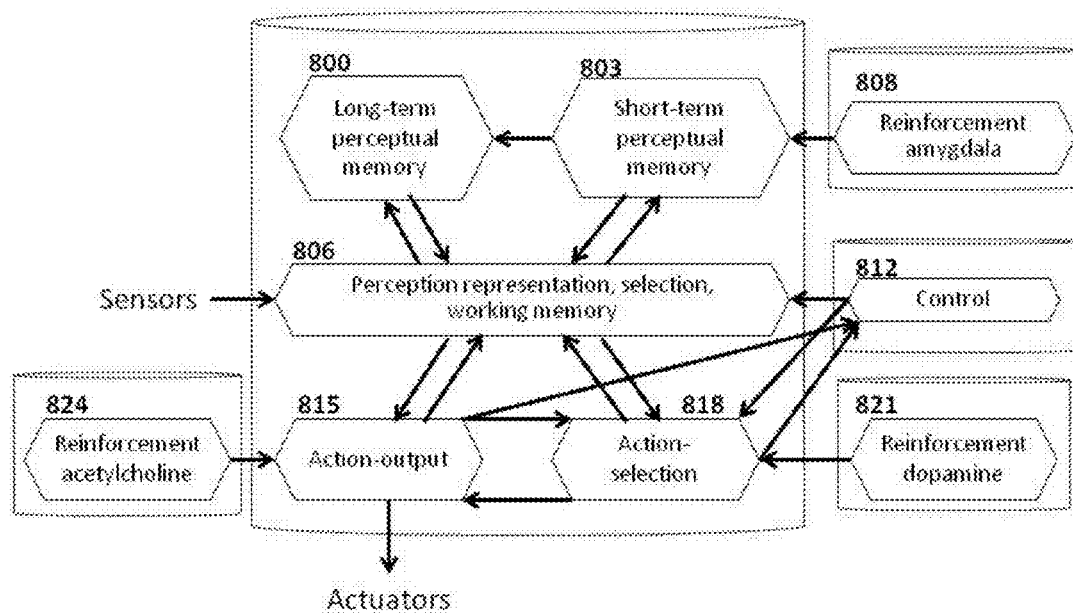
FIG. 8 shows a non-limiting example of an implementation of a NABS architecture; in this case an architecture wherein structures perform high-level functions described by the function of circuits shown as perception representation and selection 806, short-term memory 803, long-term memory 800, action selection 818, action output 815, control 812, and their connections with related reinforcement structures, sensors, and actuators.

Perception Representation Selection and Working Memory/Information Processing Functional Interpretation: The intracortical subcircuit neuroanatomical architecture facilitates the formation and storage of temporally and topographically invariant perceptual states for perception representation selection and working memory as shown in FIG. 8 806.

2.1.3 Intercortical Long-Term Memory Subcircuit

Intercortical circuits involve the large white matter corticocortical fiber tracts of the brain [31]. Fiber tracts connect multiple distant cortical areas and subcortical nuclei with a great deal of specificity. The topology of corticocortical projections are the primary focus of the Human Connectome Project and CoCoMac[32, 33]. Contralateral corticocortical projections tend to connect the same spatial regions on opposite sides of the brain, while ipsilateral connections often connect distant areas on the same side[34]. Different populations of pyramidal neurons tend to project contralaterally (lower layer 3b) as opposed to ipsilaterally (upper layer 3a and layers 5/6)[35].

We introduce a data-driven prediction for laminar proj between any two cortical areas in the human brain. Today, no safe experimental technique is capable of verifying laminar projections in the human. Yet by connecting and integrating previously unconnected research we arrive at very precise hypothesis with significant functional consequences in the human brain.

The cytoarchitectonics of the human cerebral cortex, as determined by von Economo, show the laminar pattern of a given area of cortex can generally fit within one of five fundamental types of cortical structure[10, 36]. The pattern of projections between two cortical areas, as determined by Barbas in the monkey, shows a pattern of neuron layer origin and layer termination based on the difference between the two types of cortices[37, 38, 39, 40, 41, 42, 43]. When von Economo and Barbas' research is aligned, as they are for the first time here, we arrive at rough laminar projection predictions between cortical areas in the human brain.

If a projection originates in a more granular (e.g., type 4) cortical area and terminates in a less granular (e.g., type 3) cortical area, the cells of origin are predominantly in layer 3, while synaptic terminals are in layer 4 with collaterals in layers 5,6 (feedforward projection). The majority of projections in the cerebral cortex are feedforward and originate in layers 2/3. If the projection is reversed, projection neurons reside mostly in layer 5, some in 6, and project to layers 1 and 2 with collaterals in layer 3 (feedback projection). In visual areas, this pattern of projections has been correlated with the functional hierarchy of the cortical area[44]. The neuroanatomical architecture of a given cortical region appears to be the predictor of its functional relationship to other cortical areas.

Long-Term Memory Functional Interpretation:

The intercortical subcircuit neuroanatomical architecture facilitates the connections and associations between perception representations for long-term perceptual memory storage as shown in FIG. 8 800.

2.1.4 Cortical Pyramidal Layer 4 Cortically Projecting—C4

Layer 4 is referred to as the inner granular layer, not for any particular cell type, but due to the visual appearance of small neurons stained in Nissl preparations. Layer 4, of all cortices, appears to be an input for feedforward type projections. In isocortex, layer 4 is the primary target of ipsilateral corticocortical feedforward cortical projections[34, 46, 42, 41, 44]. Since primary sensory koniocortex is the anatomically closest cortex to raw sensory input, other cortical areas cannot provide feedforward input. Instead, in koniocortices, the specific thalamus provides the feedforward projection into layer 4. In primary motor cortex layer 4 is essentially non-existent, highlighting the diminished need for feedforward input to cortical areas involved in output behavior. The cortical pyramidal neurons in layer 4, C4, typically have a descending and an ascending axon that arborize locally (<1 mm)[21]. The ascending axon reaches all supragranular layers upwards of layer 2. Descending axons do not prominently exit the cortex as with most other pyramidal cells.

Only in primary sensory areas, and especially in primary visual cortex, does layer 4 contain spiny stellate cells[47]. In all other parts of cortex, spiny stellate cells are non-existent or very rare, and instead small pyramidal cells along with interneurons compose the majority of cells in L4. Quoting Lund 'There are no spiny stellate neurons in V2 in contrast to area V1 where they are the main neuron types of lamina 4[48].

Functional Interpretation: The neuroanatomical architecture of C4 facilitates the hierarchical feedforward input from long-term perceptual memory and sensors for perception representation formation selection and working memory as shown in FIG. 8 between 800 and 806.

2.1.5 Cortical Pyramidal Layer 2 Cortically Projecting—C2

Layer 2 is referred to as the outer granular layer because of its similar granular structure as layer 4. The C2 neurons are small pyramidal neurons with local horizontal projections mostly to layer 2 and to layer 3[34, 49, 35]. Layer 2 is a primary target of ipsilateral feedback type cortical projections. The granular similarity of layer 2 to layer 4 implies a similar input architecture for feedback projections. C2 receives feedback input and propagates information horizontally and down to C3a and C3b, with upper layer 5 being the focus of infragranular projections[21].

Functional Interpretation: The neuroanatomical architecture of C2 facilitates the hierarchical feedback input from long-term perceptual memory for perception representation formation selection and working memory as shown in FIG. 8 between 800 and 806.

2.1.6 Cortical Pyramidal Layer 3a Cortically Projecting—C3a

C3a pyramidal neurons, of typical pyramidal shape, are distinguishable from layer 2 in isocortex because of their increased size and sparsity. In layer 3a the distance of intracortical horizontal projections increase into stripe like patches[24, 27, 50]. C3a cells often have long horizontal projections in lower layer 3b[21]. C3a cells are the dominant source of intercortical projections to layer 4 of ipsilateral cortices[34, 46, 42, 41].

Functional Interpretation: The neuroanatomical architecture of C3a facilitates the hierarchical feedforward output from perception representation formation selection and working memory as shown in FIG. 8 between 800 and 806.

2.1.7 Cortical Pyramidal Layer 5/6 Cortically Projecting—C56

Neurons in the lower layers of the cerebral cortex are the most diverse, but are differentiable based on the targets of their projections. We use the term C56 to group the cortical neurons in the infragranular layers of the isocortex that dominantly project corticocortically[35, 25, 49]. The C56 neurons often have a spindle shape and appear to lack major dendritic tufts above layer 5a[25]. The intracortical supragranular projections appear more extensive in layers 2 and 3a[22], with distant horizontal projections in layers 5/6[51]. The C56 group are the dominant source of intercortical projections to layer 1 and 2 of ipsilateral cortices[52, 34, 42].

Functional Interpretation: The neuroanatomical architecture of C5/6 facilitates the hierarchical feedback output from perception representation formation selection and working memory as shown in FIG. 8 between 800 and 806.

2.1.8 Cortical Interneurons

Cortical interneurons utilize gamma-Aminobutyric acid (GABA) as an inhibitory neurotransmitter and have axonal arbors that do not exit to the white matter. The increase in cortical interneuron number and complexity of organization has long been cited by neuroanatomists as a standard feature of phylogenetic evolution, humans having the greatest number and complexity[53]. Interneuron organization is complex, requiring attempts to standardize terminology[54]. Interneurons are usually first characterized by their morphology, axonal arborization and specificity of projections. Second, interneurons are often further differentiated by calcium binding protein staining (parvulbumin, calbindin and calretinin) and their physiological firing properties. In the human, interneurons arise developmentally from two unique genetic expression patterns corresponding to the dorsal forebrain, a cerebral cortex precursor, and the ventral forebrain, a thalamic precursor[55]. Dendritic and axonal arborization of all inhibitory neurons are less than a few 100 μm in the monkey [56] Inhibitory interneurons are the only known cortical neurons to form gap junctions and typically form gap junctions between the same type of interneuron[57, 58]. Gap junctions have the property of spreading inhibition and synchronizing firing. In general, inhibitory GABAergic neurons are biased toward the upper layers of cortex. For conceptual simplicity, the dominant classes of interneurons are summarized in six neuroanatomical groupings:

- Basket cells (BK) form the majority of interneurons, named for the basket like shape of synapses they form around the soma of pyramidal neurons[53]. Basket cells are typically fast spiking, parvalbumin staining, soma targeting, and have their highest densities between middle layer 3 and upper layer 5[59, 56]. Basket cells are often further differentiated by the size and or curvature of their often long (~100 s μm) horizontal axonal arborization[60, 50].
- Chandelier cells (CH) are a class of axoaxonic parvalbumin inhibitory neurons which provide exclusive terminations on the initial axon segment of pyramidal neurons found mostly between layers 3 and 5[61, 62, 56]. Named for the vertical chandelier look alike synaptic boutons.
- Neurogliaform cells are small, express calbindin, and are found throughout all layers, but biased toward superficial layers with a tight dense plexus of axons[63, 59, 56].
- Martinotti cells (M) express calbindin and are unique in that they send a vertically projecting axon that arborizes horizontally in layer 1 [61, 60].

Double bouquet cells (DB) express calretinin and have vertically projecting dendrites and axons that span across layers that are direct sources of inter-layer feed-forward or feed-back projections[56, 61, 60]. Bi-tufted neurons have similar dendritic and axonal organization.

Cajal-Retzious cells (CR) are horizontally projecting interneurons found exclusively in layer 1 of the cerebral cortex and are the only cells found in layer 1 [53, 61, 63].

Functional Interpretation: The neuroanatomical architecture of interneurons facilitates the synchronization of information processing in perception representaiton and implements the local selection of information processing as shown in FIG. 8 806.

2.1.9 Functional Perspective on Long-Term Perceptual Memory

Our neuroanatomical perspective is that long-term memory has two distinct components, namely perceptions and associations that correlate with psychological deficits related to grey matter (intracortical) vs. white matter (intercortical) lesions respectively. Perceptions are a form of encoding of information, while associations form relational interactions between perceptions.

Perceptions would be the result of the self-organization of different cell assemblies within a cortical module likely during prolonged (years in humans vs. weeks in animals) developmental critical periods[64]. In 1949, Hebb postulated that groups of neurons would form these single perceptual representations called cell assemblies[65]. Some 56 years later, creative experiments are proving that true showing cell assembly formation in L2/3 of rat visual cortex[66]. The developmental temporal regulation of NMDA and GABA synaptic receptors appears to control plasticity and the formation of perceptual cell assembly representations in critical periods[64]. The long-term stability of these cell assemblies could be a direct result of the elimination of this plasticity, through for example the dramatic decrease in NMDA receptors. The spatial extent and laminar location of these cell assemblies would be defined by intracortical projections. Intracortical projections suggest that cell assemblies within a cortical module should form primarily between neurons in similar layers C3 to C3, C56 to C56[21]. Our locally distributed viewpoint of perceptions is consistent with electrophysiology evidence in the monkey[18, 67], but in direct competition with other distributed views of perceptual organization [68].

The localized nature of inhibition in the cerebral cortex and the prominently local connections of excitatory pyramidal neurons onto inhibitory neurons creates an architecture sufficient for local cell assembly activity based competition. Cortical laminar organization should further aid in both the development and information processing regulation of input/output cell assembly functions.

Once perceptions stabilize within cortical modules, intercortical synaptic associations between those perceptions can form throughout life. The stability of an association would be determined by the direct corticocortical synaptic connections between the two perceptions. Presumably, if a direct corticocortical association is stable (say with fewer NMDA receptors) it would be very difficult or impossible to remove naturally. For example, the word "Brad" might exist as a stable representation in Wernicke's area, while the visual perception of facial features may exist in the fusiform face area. The simultaneous perceptions of "Brad" and "the face of Brad" could happen at any time in a person's life and may or may not be important to associate. As a consequence, the ability to temporarily store short-term associations for later consolidation to corticocortical long-term memory is necessary for the selection of stable associations. Short-term memory would presumably require an independent neuroanatomical architecture.

2.2 Short-Term Perceptual Memory Circuit

Psychological access to declarative memory occurs on different time-scales. Neuroanatomical evidence suggests the short-term memory system operates independently of the long-term memory system. Short-term declarative memory is defined as the declarative memory which requires the parahippocampal gyrus (periallocortex) and hippocampal (allocortex) formations for recollection[3]. In humans, short term memory takes weeks to years to consolidate from the periallocortex to the isocortex, wherein declarative memory is consolidated long-term[69]. The localization of short-term memory to the hippocampal regions was demonstrated in patient H.M. who had no short-term memory, but retained long-term consolidated memory and behavioral/procedural memory. Due to surgical lesions, H.M. was essentially left with no allocortex or periallocortex[70]. We can conclude that the periallocortical and hippocampal circuits are necessary neuroanatomical structures through which short-term memory is formed and later consolidated into corticocortical long-term memory[71, 3, 72].

2.2.1 Parahippocampal Gyrus/Periallocortex—PH

The parahippocampal gyrus, also called periallocortex because of its transitional laminar structure between isocortex and allocortex, consists of the entorhinal and perirhinal cortices. A reciprocal topographic connectivity exists between association isocortices and periallocortices that are well mapped, but the actual specificity of laminar projections remains vague at best[73, 74, 75]. The periallocortex contains intralayer connectivity similar to regular isocortex with less laminar differentiation. The periallocortex is the neuronal interface between the isocortex and the hippocampus, since the isocortex does not typically project directly to the hippocampus. The afferent input and efferent output of the periallocortex can grossly be split into upper (PH23) and lower (PH56) layers respectively based on its projections with the isocortex and allocortex. To a lesser degree, the periallocortex receives subcortical input from the amygdala, claustrum, basal forebrain, thalamus, hypothalamus, and brainstem[76].

PH23 is used to describe the upper layers in the periallocortex that receive afferent projections from the isocortex (typically C3b)[75]. Input to PH23 is topographically organized and dominated by multimodal association isocortex[73]. PH23 sends efferent projections to the hippocampus.

PH56 is used to describe the lower layers in the periallocortex that send efferent projections to the isocortex with origin/target laminar distributions similar to intercortical association projections[75]. PH56 generally projects back topographically in a reciprocal manner to multimodal association isocortex[74]. PH56 receives afferent projections from the hippocampus.

The aggregate evidence suggests that C3b (and some C56) cells project to PH23 and receive reciprocal projections back from the PH56 regions to which they projected, but far more detailed studies are necessary.

Functional Interpretation: The neuroanatomical architecture of the periallocortex facilitates the temporary storage of associations between perception representations during consolidation of short-term memory associations into long-term memory associations as shown in FIG. 8 between 800, 803 and 806

2.2.2 Cortical Pyramidal Layer 3b Cortically Projecting—C3b

Lower layer 3b in the isocortex is centrally located to be the hub of perceptual information processing in the cerebral cortex. The large pyramidal neurons located in the lower part of layer 3, just above the granular layer 4 could be included in multiple circuits including long-term memory, working memory/information processing, and behavior output. The C3b cells have the classic pyramidal neuron shape and are usually the second largest pyramidal neuron group next to C5p[77, 34, 39]. The C3b intracortical projections involve some of the longest (many millimeters) grey matter projections in the cerebral cortex[21, 78, 24]. The horizontal projections form stripe-like vertical patches and have all the same qualities described in the C3a group.

In the isocortex, different populations of pyramidal neurons tend to project contralaterally as opposed to ipsilaterally. The contralateral projections arise mostly from C3b cells and target the spatially analogous region of cortex on the other side of the brain, while ipsilateral projections mainly arise from C3a and C56[35]. The same C3b and C56 cells appear to be the dominant source of isocortex→periallocortex projections[73, 75], responsible for communicating representations in the isocortex to the hippocampus for association.

The C3b cells appear to preferentially stain for acetylcholine with C5p cells[79, 80], and have been shown to have preferential connections with C5p cells[81, 82]. In the agranular primary motor cortex, all layers visually look like a combination of C3b and C5p cells of various sizes.

Historical Note: In 1949, Lorente de No referred to the large cells above the granular layer as "star pyramids" and called the location "layer 4a"[11]. Today, the same cells are typically referred to as large pyramidal neurons in layer 3b. The usage of the terms "star" and "layer 4" to describe these cells appears to have caused subtle confusion throughout the years, including the target layer of specific thalamocortical projections. The confusion arises due to the modern descriptions of "stellate" cells in "layer 4" or "4β" of primary visual cortex.

Functional Interpretation: The neuroanatomical architecture of C3b facilitates the hierarchical feedforward input from the temporally and topologically invariant perception representation for association in short-term perceptual memory as shown in FIG. 8 between 806 and 803

2.2.3 Hippocampus/Allocortex

The hippocampus proper, called allocortex due to its lack of lamination and different appearance from isocortex, is a full circuit in and of itself[83]. The hippocampus is functionally dominated by the dentate gyms (DG), CA3 fields, CA1 fields, and subiculum (Sb). A simplified feedforward picture shows the projection circuit loop as: isocortex→PH23→Dentate Gyrus→CA3→CA1→Subiculum→PH56→isocortex. Multiple feedback connections exist within this path[83]. The DG and olfactory bulb/subventricular zone are the only widely accepted brain structures consistently shown to contain adult neurogenesis (the new production of neurons) in the non-damaged primate brain[84]. The hippocampus essentially receives all the same subcortical input as parahippocampal cortex described above[85].

Functional Interpretation: The neuroanatomical architecture of the hippocampus facilitates the formation and storage of short-term perceptual memory associations biased by the amygdala reinforcement as shown in FIG. 8 between 806, 803 and 808.

2.2.4 Perspective on Short-Term Declarative Memory

Our neuroanatomical perspective on the perihippocampal cortex and hippocampus are that they function to temporarily store short-term associations between isocortical perceptions that can later be consolidated into direct corticocortical long-term memory associations. The subcortical input to the peri-/allocortex being part of the emotional system would imply that the creation of associations is largely influenced by emotional significance. The functional flow of short-term memory information would appear to involve:

Association (cortical area A and B)-active C3b perceptions in area A and B→activation PH23 A and B→binding in hippocampus. Additionally, PH23 A and B→PH56 A and B activations Recall-active C3b perception in area A→PH23 area A→unbinding in hippocampus→PH56 area B→active C3b perception area B Alternate recall-active C3b perceptions in area A→PH23 area A→PH56 area B active C3b perception area B The idea of stable perceptions in the isocortex being associated in the hippocampus is consistent with the hippocampal indexing theory of episodic memory[86]. The consolidation of indirect hippocampal short-term memory associations into direct corticocortical long-term memory associations involves the re-activation of short-term memory associations during sleep[87].

Historical Note: A curious, rarely talked about cortical region next to the periallocortex and allocortex is the granulous retrosplenial (Rsc) cortex [von Economo area LE; Brodmann area 29]. The Rsc has laminar differentiation representative of primary sensory koniocortex and significant reciprocal projections with allo-/peri-allocortex and prefrontal cortex[88, 89]. Thus, Rsc could potentially be viewed as "primary memory cortex".

2.3 Perception Representation, Selection and Working Memory Circuit

The definition of working memory is adopted from Monsell as "no more (or less) than a heterogeneous array of independent temporary storage capacities intrinsic to various subsystems specialized for processing in specific domains" [90]. Working memory operates on the time scale at which attention can be maintained, seconds to minutes[91, 90]. Experiments typically require participants to hold digits, numbers or words in memory for future recall and measure the number of elements capably held in working memory (usually between 4-7 items). Monsell's definition is consistent with a localized neuroanatomical information processing architecture. We use the term information processing to describe the dynamic activation of perceptions described by Monsell's "independent . . . subsystems . . . processing in specific domains".

Exactly how information is processed in the brain is still an open question. However, information processing in the brain has been correlated with various brain wave oscillations[92]. Synchronized information processing across distributed regions of primate cortex has been correlated with low gamma (25-60 Hz)[93]. Cortical electrophysiology recordings of humans undergoing neurosurgery also include distinct localized high gamma (80-160 Hz) frequencies during speech tasks[94, 95].

States of being awake or asleep are definitive indicators of information processing in the brain, and interactions in the thalamus are highly correlated in the transition from sleep to wakefulness, and for correlations between gamma and slower oscillations[96].

The interactions between the thalamus and cerebral cortex are therefore essential in gaining understanding into working memory and information processing.

2.3.1 Thalamus

The thalamus has a uniform organization and highly stereotyped reciprocal projections with the cerebral cortex. For the interested reader, the thalamic bible written by the late Ted Jones is unparalleled in its descriptive depth of the thalamus [97]. The thalamus is composed of multiple nuclei that can be identified histologically and by the source/target of their afferent/efferent projections[98]. The general organization of the thalamus leads us to divide the thalamus into three homotypical types: specific (Ts), intralaminar (Ti), and layer 1 projecting (TL1). The division into three types of thalamic projections is novel and imparts a functional perspective to the target laminar location of thalamic neurons. Although thalamic neurons undoubtedly project to multiple layers, usually via collateral projections, the first-order homotypical architecture of thalamic laminar projections warrants a division into three distinct (source thalamus-target cortical layer) combinations: Ts layers 3/4, Ti-layers 5/6, and TL1-layer 1. For the present circuit we only discuss the Ts projection.

2.3.2 Specific thalamus—Ts

Specific thalamic neurons project to the mid layers in the cerebral cortex. Ts thalamocortical projections are to lower layer 3b in primate isocortex, often avoiding layer 4[97, 99, 100, 101, 102, 103, 104], while only koniocortical projections are to layer 4[105]. The Ts thalamocortical projection is localized (<a few mm2) and topologically organized in the cerebral cortex in accordance with the temporal development of projections[106, 107, 108, 109, 110, 111].

Historical Note:

The early work by Cajal and Lorente de No, along with the disproportionate amount of research dedicated to primary sensory areas, appears to have ingrained layer 4 as the generally taught location of specific thalamocortical projections. The notion that the Ts thalamocortical projections terminate in layer 4 must be updated throughout the neuroscience world to differentiate between koniocortex layer 4 and isocortex layer 3b terminations. As Ted Jones says "Outside these areas [koniocortex] . . . thalamic fibers tend to avoid layer IV and terminate almost completely in the deeper half of layer III." pg. 95[97]

The Ts is composed of multiple histologically identifiable subnuclei that can be further subdivided based on afferent/efferent projections. We functionally separate the non-primary Ts into two main groups and adhere to Jones' terminology[97]. The ventral group is composed of the ventral anterior (VA) and ventral lateral (VL) nuclei. VA and VL (having subdivisions themselves[98]) generally project to the behavioral parts of the brain related to thinking (frontal cortex) and movement (motor cortex) respectively. We separate the ventral group from other Ts nuclei because of the afferent projections from the basal ganglia[112, 113] and cerebellum [114, 115], both involved in controlling thinking and movement. The second non-primary Ts group of nuclei are composed of nuclei related to more sensory (as opposed to behavioral) regions of the brain. The pulvinar (P) and lateral posterior (LP) nuclei can be generally grouped (anatomically/functionally) and largely project to temporal and parietal isocortex. The anterior (A) and the lateral dorsal (LD) complex can be similarly grouped and are largely connected to cingular and retrosplenial cortex. Note the challenges in nuclei naming conventions, e.g. the lateral nuclei not being grouped together.

Functional Interpretation: The neuroanatomical architecture of the specific thalamus facilitates the relay of information from the sensory world to the isocortex as well as drives the selection of perception states through biased input excitation to perception states as in FIG. 8 806.

2.3.3 Cortical Pyramidal Layer 6 Thalamic Projecting—C6t

Cortical C6t cells have a neuroanatomical organization highly linked to Ts projections. C6t cells send both apical dendrite and intracortical axon projections to layer 3b in the isocortex[77, 116, 48, 30] and layer 4 in koniocortex[117]. The C6t cell projections leaving the cortex target local regions of the Ts in a reciprocal manner[104, 103, 118, 119, 120]. Note the anatomical reentrant blueprint specifying that C6t intracortical axons/dendrites target the same cortical layer receiving Ts projections.

Functional Interpretation: The neuroanatomical architecture of C6t facilitates the feedback within perception state selection to facilitate working memory as in FIG. 8 806.

2.3.4 Thalamic Reticular Nucleus—TRN

The TRN is a thin shell of GABAergic neurons surrounding the entire thalamus[121]. The majority of TRN afferent connections arise from ascending Ts and descending C6t projections[122]. Different sizes of axonal boutons (small and large) in the TRN have been correlated with source cortical topology and layer (L6 and L5) respectively[123]. The TRN then projects directly onto the Ts in an inhibitory manner[124, 121]. Other projections to the TRN include cholinergic projections from the brainstem as shown in the cat[125] and GABAergic projections from the basal ganglia GPe in the monkey targeting the ventral thalamic region[126].

Functional Interpretation: The neuroanatomical architecture of TRN facilitates the gating of thalamocortical information and regulates the activation of the entire brain system as in FIGS. 8 806 and 812.

2.3.5 Perspective on Working Memory and Information Processing

Our neuroanatomical viewpoint is that working memory and associated gamma frequency information processing is the result of attentionality directed cortico-thalamocortical oscillations. We hypothesize that information processing involves the competitive selection (activation) of perceptions (cell assemblies) driven by the Ts→C3b→C6t→Ts circuit. Working memory would involve the maintenance of active perceptions in each localized thalamocortical loop, explaining both the distributed nature of working memory, the constraints on the number of items stored, the need for attention, and the competitive interaction between domain specific information. The source and mechanism of attentional control are highlighted in the control circuit.

Additional neuroanatomical evidence is consistent with our hypothesis. In the human, the distance between the cerebral cortex and the thalamus is approximately 20-50 mm[127]. Typical conduction velocities throughout the brain might be regulated from 1-50 mm/ms depending on myelination[128]. Human thalamocortical conduction velocity has been estimated at 29 mm/ms [129].

The cortico-thalamocortical physical distances combined with conduction velocity and short delays in neuronal firing (1-8 millisecond) are consistent with a circuit level cortico-thalamocortical reentrant explanation for gamma frequency information processing oscillations in the brain. Spiking neuroanatomical models have been built supporting our hypothesis[130]. This is in contrast to most other models of working memory that have focused on intrinsic properties of interneurons or intracortical activity without regard to the thalamus [131, 132, 133].

2.4 Action Selection Circuit

In contrast to declarative memory other psychological evidence highlights memory systems more highly involved in the learning of actions and behaviors. We utilize Squire's description that '[procedural memory] is expressed through performance rather than recollection . . . the memories are revealed through reactivation of the systems within which the learning originally occurred' [3]. A distinguishing feature of procedural memory is that through practice and repetition, behavioral memories (i.e. actions) can be learned and executed without declarative recall of how the action was learned. Another term often used is skill learning. We use the term behavioral memory to include all behavioral actions generated by homotypical circuits including externally measurable procedural memory and internal procedural thought processes. Behavioral memory systems have been elucidated in patients like H.M., patients with Alzheimer's and in patients with Parkinson's and Huntington's disease[134]. For example, the behavioral effects of Parkinson's disease typically progress from motor movement rigidity, postural instability and tremor to cognitive apathy and diminished novelty seeking[135]. Huntington's disease on the other hand typically begins with chorea (initiated dance-like movements that flow from start to finish without stopping) and progress to cognitive dysfunctions impairing organizing, planning, or adapting alternatives[136]. Parkinson's and Huntington's disease both involve degeneration of different parts of the basal ganglia, highlighting the role of the basal ganglia in behavior selection. The basal ganglia is highly involved in the action based reward system through increases and decreases in dopamine[137].

2.4.1 Basal Ganglia

The basal ganglia is a structure that is essential for learning and coordination in movement and cognition[138, 43, 135, 139]. The basal ganglia is composed of multiple subnuclei. The historical naming of the basal ganglia does not make the homotypical groupings intuitive. The striatum, containing GABAergic projection neurons, is the dominant input structure and is comprised of the putamen, caudate, and nucleus accumbens (also called the ventral striatum). The globus pallidus external segment (Gpe), referred to only as the globus pallidus in the mouse, dominates the internal circuitry of the basal ganglia. The globus pallidus internal segment (Gpi) and substantia nigra pars reticulata (Snr) form a spatially disjoint but functionally singular GABAergic output structure of the basal ganglia (Gpi/Snr). The subthalamic nucleus (Stn) provides glutamatergic excitatory input to multiple elements in the basal ganglia. The substantia nigra pars compacta (Snc) provides dopaminergic input to the striatum, the damage of which is the source of Parkinson disease. Huntington's disease involves the degeneration of the striatum progressing from motor (putamen) to cognitive (caudate) deficits (degeneration)[134]. The same correlations between motor/cognitive deficits and putamen/caudate dysfunction is found in Parkinson's[135].

The projections through the basal ganglia are organized into parallel, yet overlapped pathways from the entire isocortex[140, 141] forming a homotypical architecture. Primary auditory and visual cortex are the only cortices that do not project to the basal ganglia in the monkey[142]. Most nuclei in the basal ganglia rely on GABA as a neurotransmitter forming a consistent disinhibitory functional pathway. The GABAergic neurons in the basal ganglia are inherently tonically active and do not require input to continually fire action potentials. Based on neuron number, a significant amount of neural convergence occurs from input to output through the basal ganglia. The human and rat striatum have about 70M and 2.8M neurons respectively[143, 144]. In both species the number of neurons decrease approximately 50 to 1 (striatum→Gpe) and 2 to 1 (Gpe→Gpi/Snr)[144, 145], resulting in a 100 to 1 neural convergence of basal ganglia input to output.

Several excellent reviews of the basal ganglia and dopamine system exist[146, 147, 148, 149].

2.4.2 Striatum Matrix and Patch—Sm and Sp

The striatum can be divided into histologically defined compartments called the matrix (matrisome) and patch (striosome). Among other factors, the matrix compartments have high cholinesterase activity, while patches are enriched in enkephalin (i.e. endorphins)[150]. The striatum contains multiple interneurons containing both GABA and acetylcholine forming distinct intrastriatal networks [151].

The matrix compartments of the striatum receive projections from C5s neurons across the entire isocortex[152, 153, 154, 155]. The cortical projections are topographically mapped[156]. In general the striatum receives reciprocal projections back from the thalamic nuclei that it projects to. The intralaminar thalamus projects topographically onto the striatum with the rough order CM→putamen, PF→caudate, midline→ventral striatum[157, 158, 159]. The ventral thalamus also projects back onto the striatum[160].

SmD1 neurons are GABAergic spiny projection neurons found within the matrix portion of the striatum that express dopamine D1 receptors. The effect of dopamine on SmD1 neurons increases excitability[161]. SmD1 is traditionally considered part of the direct pathway through the basal ganglia because of its projections to Gpi/Snr[162]. The projection is topographically maintained from the striatum to Gpi/Snr[163].

SmD2 neurons are GABAergic spiny projection neurons found within the matrix portion of the striatum that express dopamine D2 receptors. The effect of dopamine on SmD2 neurons decreases excitability[161]. SmD2 is traditionally considered part of the indirect pathway through the basal ganglia because of its projections to the Gpe[163, 162].

Sp neurons are GABAergic spiny projection neurons found in the patches of the striatum and project prominently to the Snc[164, 163]. The Sp send smaller numbers of axon collaterals into the Gpe and Gpi/Snr[162]. In contrast to the matrix, the patch compartments receive their input from C5p neurons in the isocortex[165, 150].

Functional Interpretation: The neuroanatomical architecture of the striatum facilitates the selection of perception actions as in FIG. 8 818 by using dopamine reinforcement to learn both start and stop action sequences, while also selecting reward based action output.

2.4.3 Globus Pallidus External Segment—Gpe

The Gpe neurons are GABAergic neurons that primarily receive inhibitory projections from the SmD2 portion of the striatum[163, 162] and excitatory projections from the STN [166, 167]. Gpe neurons project onto the Gpi/Snr, Stn, and send feedback connections onto the matrix portion of the striatum [168].

A potentially significant but rarely mentioned projection is the Gpe projection to the TRN of the ventral thalamus[169, 126, 170]. Since the TRN provides inhibitory input to the thalamus, the Gpe projection to the TRN might be functionally analogous to the Gpe projection to the inhibitory Gpi/Snr that then projects onto the thalamus.

2.4.4 Globus Pallidus Internal Segment/Substantia Nigra Pars Reticulata—Gpi/Snr The Gpi/Snr is the source of the major GABAergic output from the basal ganglia. The Gpi and Snr are physically separated nuclei, with the Snr located adjacent to the Snc (hence the naming convention). However, from a neuroanatomical perspective these structures are functionally equivalent. The Gpi/Snr receives afferent input from all other basal ganglia nuclei, including the matrix striatum[162, 163], the Gpe [168], the STN[171], and collateral projections from the Snc [172, 173].

The Gpi/Snr is tonically active[173] and projects onto the intralaminar thalamus in a topographic pattern[113, 174, 175]. The Gpi/Snr also send significant projections onto the ventral thalamus including TL1[112, 176].

Functional Interpretation: The neuroanatomical architecture of the globus pallidus facilitates precise temporal perception action-selection and perception action-output triggering through disinhibition as shown in FIGS. 8 818 and 815.

2.4.5 Subthalamic Nucleus—STN

The STN is the only excitatory nucleus in the basal ganglia and utilizes glutamate as a neurotrans-mitter. The STN appears to receive an excitatory topographically mapped isocortical afferent input from C5p neurons[177, 166] as well as inhibitory input from the Gpe[168]. The STN projects prominently onto the Gpi/Snr and to the Gpe[167, 166]. The STN also contains inhibitory GABAergic interneurons[171].

Functional Interpretation: The neuroanatomical architecture of STN facilitates the ability of perception states as in FIG. 8 806 to stop triggered action states in 818.

2.4.6 Substantia Nigra Pars Compacta—Snc

The Snc is the source of dopaminergic projections in the basal ganglia. The Snc receives its major afferent input from the patch compartments in the striatum[164, 150]. The Snc is tonically active and receives additional inhibitory input from virtually all other structures in the basal ganglia[147]. The Snc projects onto the matrix compartment of the striatum [178, 179, 146].

Functional Interpretation: The neuroanatomical architecture of the Snc facilitates the dopamine reinforcement reward signals to enable action-selection as shown in FIGS. 8 821 and 818.

2.4.7 Intralaminar Thalamus—Ti

The intralaminar thalamus is composed of the centre median (CM), parafasicular (PF), and midline nuclei[97]. The midline nuclei are usually further subdivided into the central medial, paracentral, central lateral, and rhomboid nuclei. The intralaminar nuclei output topographic projections to both the striatum and to the lower layers of the isocortex[180, 157, 158, 159]. In a gross topographic organization, PF is associated with frontal cortex and the caudate, CM with motor cortex and the putamen, and midline with cingular cortex and the nucleus accumbens. Ti projects dominantly to lower layers 5/6 in the cerebral cortex[181]. The most compelling evidence confirming this fact in primates comes from single-axon tracing studies in the monkey that undeniably demonstrate the majority of intralaminar (CM/PF) projections principally terminate in layers 5/6 with fewer collateral projections to layer 1 [182]. The Ti nuclei projections are largely segregated into those that project exclusively to the cerebral cortex and those that project to the matrix portion of the striatum[182].

Historical note: The intralaminar nuclei of the thalamus were originally thought to provide the majority of the "non-specific" diffuse layer 1 input in the cerebral cortex identified by Lorente de No in the 1940's[11]. In the 1950's, research focused on understanding the cortical 'recruiting response' due to intralaminar electrode stimulation[183, 184]. The recruiting response (most studied in cats) requires pulsed thalamic stimulation of 3-10 Hz[185]. After tens of milliseconds, strong surface negative wave potentials would appear across widespread cortical areas. The widespread nature of the recruiting response was attributed to the thalamocortical layer 1 projections described by Lorente de No. The measured recruiting response is more widespread than Ts stimulation but topographically organized, which is consistent with the intralaminar topographic projection. Today, a more anatomically consistent viewpoint is that the recruiting response involves Ti-05s-basal ganglia-Ti and/or Ti-basal ganglia-Ti-cortical circuits that prominently involve the lower layers of the cerebral cortex rather than layer 1. Future experiments are necessary for any definitive conclusion.

Functional Interpretation: The neuroanatomical architecture of the intralaminar thalamus facilitates the selection of action output and evoked behaviors as shown in FIG. 8 815.

2.4.8 Cortical Pyramidal Layer 5 Striatally Projecting—C5s

C5s are pyramidal neurons in the isocortex that principally project to the striatum. C5s pyramidal neurons are typically located in the upper portion of layer 5, LSa, with a prominent ascending dendrite that arborizes in L1[152, 153, 154]. C5s send projections to the matrix portion of the striatum[165, 77, 177]. C5s neurons are likely the source of cortical projections to Ti that are distinct from C6t projections in the monkey[118] and cat[186]. C6t thalamic terminations are small and dense, while C5s synaptic terminals are large and sparse[187]. The large terminals found in the TRN are likely a result of C5s collaterals[123]. In the rat, C5s and C5p neurons have been shown to be distinct populations[188, 189], with C5s having a higher probability of recurrent C5s C5s connections[190]. L5a intracortical projections have distant ~1-2 mm projections in layers 2/3 a, and slightly longer projections within the same layer 5a[21, 22].

Functional Interpretation: The neuroanatomical architecture of C5s facilitates the transfer of information from perception states to action selection as shown in FIG. 8 between 806 and 818.

2.4.9 Perspective on Behavioral Memory Action Selection

The basal ganglia receives topographic projections from the entire isocortex, which has lead to the notion of separate functional loops through the basal ganglia[140, 141, 148]. We differ in our assessment of the anatomical facts and hypothesize that the pathway through the basal ganglia has a single uniform function, with the only difference being the cortical source of information that is operated on. Functionally, the output from the Gpi/Snr to the thalamus is tonically inhibitory. Therefore, processing in the basal ganglia ultimately results in disinhibition of the thalamus for causal effect. One view of disinhibition is allowing target neurons to be excited. Another view of disinhibition is causing neurons to fire precise rebound spikes as a result of release from inhibition [191]. The evidence suggests that the basal ganglia is responsible for learning to select sequences of precise on/off action triggering[192]. The evolution of the coordinated control of muscles and muscle groups in early ancestral vertebrates requires this exact on/off mechanism of learning. A hierarchical information structure, like the cerebral cortex and topographic striatal mapping, operating at different time scales would enable enormous combinatorial flexibility of cognitive behavior just as with movement.

If the basal ganglia is responsible for action selection, then the near 100 to 1 neural convergence from the striatum to the Gpi/Snr complex implies a reduced set of output action possibilities compared to input action suggestions. The basal ganglia is likely capable of storing temporally sequenced actions (or cortical locations) through its internal circuitry. In this case, the 100 to 1 convergence may serve to encode temporal sequences of actions represented by Cys that are translated into disinhibition of singular actions in Ti in a sequential manner. The utilization of two prominent dopamine systems, D1 and D2, would serve to encode coupled starting and stopping actions respectively[193]. The increase (reward) or decrease (anti-reward) of dopamine would then serve to reinforce start and stop sequences.

The projection from the cerebral cortex C5p neurons to the patch portion of the striatum is significant because of the indirect effect on dopamine release via the Snc. The same C5p neurons appear to project to the STN, creating a significant path of primarily stopping actions (increased activity of STN), while simultaneously generating an anti-reward signal (increased inhibition of the Snc) to prevent that same future behavior.

2.5 Action Output Circuit

Behavior involves not only an organism's externally observable movement, but also its internal cognitive processes. During evolution, the same circuits that regulated muscles through the spinal chord in early vertebrates were re-directed to target internal brain structures[1]. We focus here on neuronal groups known to be involved in behavioral movement and their parallel internal connectivity presumably involved in behavioral cognitive processes.

In all vertebrates, motor neurons in the spinal chord project acetylcholine onto muscles to make them contract[194, 1]. In higher mammals projections from large neurons in lower layer 5 (C5p) of primary motor cortex directly target alpha motor neurons in the spinal chord[195]. Lesions to primary motor cortex in the human cause complete paralysis of the body associated with the cortical lesion[4].

To neuroanatomically understand behavioral output, we focus on the C5p neuron and the correlates to acetylcholine systems in the brain that appear to be phylogenetically involved in movement.

2.5.1 Cortical Pyramidal Layer 5 Pons Projecting—C5p

The C5p population refers to the collection of primarily pons (and other subcortically) projecting pyramidal cells found throughout the entire isocortex[79, 2]. C5p neurons are located in layer 5b[196], have large dendritic tufts in layer 1, and are distinct from C5s neurons[189, 190]. The C5p intracortical projections are not extensive, often restricted to short distances in layer 5[197], however their dendritic arborization is quite large. Generally, the largest neurons in the isocortex are C5p neurons and in primary motor cortex C5p neurons are referred as large Betz cells[198]. Since the majority of C5p neurons target the pons (relaying information to the cerebellum), we suggest that the cognitive function of C5p neurons may be inferred through analogy with Betz cells in primary motor cortex. The projections from C5p neurons in primary motor cortex synapse directly with the spinal chord causing physical movement[195]. The direct projection to the spinal chord is weak in lower mammals, but becomes increasingly prominent in primates, and presumably dominates in humans, suggesting an increasingly more direct cortical involvement in behavior[199]. C5p projections from frontal cortex target the STN of the basal ganglia with collaterals to the striatum [166, 177]. Evidence suggests that C5p striatal projections target the Sp patch (striosome) portion of the striatum that projects to the dopamine filled Snc[165, 150].

The origin of C5p afferent input should provide a clue to the synaptic organization of cognitive and physical behavior memory output throughout the brain. A synaptic relationship exists between C3b and C5p neuronal groups because of a preference for direct synaptic connections from C3b to C5p neurons potentially related to basal forebrain acetylcholine activity[200, 201, 82].

Functional Interpretation: The neuroanatomical architecture of C5p facilitates the behavioral and action output as shown in FIG. 8 815.

2.5.2 Basal Forebrain—BF

Acetylcholine is found in primarily three populations of neurons in the brain: alpha-motor neurons, interneurons in the striatum, and the basal forebrain including the nucleus of Meynert[202]. Basal forebrain lesions "abolish cortical plasticity associated with motor skill learning"[203]. Large lesions of the basal forebrain in the rat have resulted in deep coma consistent with the disruption of behavioral output [204]. Acetylcholinesterase staining typically stains layer 1 of most cortices, therefore the BF projection appears to primarily target layer 1 of most of the cortex[205]. In monkey and human cortex, C3b and C5p neurons appear to preferentially stain for acetylcholinesterase suggesting a prominent utilization of acetylcholine[79, 206, 80].

Functional Interpretation: The neuroanatomical architecture of the basal forebrain facilitates the cholinergic (acetylcholine) reward signals 824 to learn mappings between perception states 806 and action output 815 as shown in FIG. 8.

2.5.3 Perspective on Behavioral Memory Output

Within a homotypical cognitive architecture, if C5p neurons are a form of behavioral output in motor cortex they are a form of behavioral output in the rest of the isocortex. Similarly, if spinocerebellar signals communicate body movement/posture information states to the cerebellum, then C5p projections to the cerebellum through the pons may communicate analogous cognitive information states from brain [139]. Combining the two analogies we hypothesize the C5p group provides a behavioral output predicting desired future coordinated behaviors. Motor cortex would communicate physical behaviors for the nervous system to operate on, while other isocortical regions would communicate cognitive or perceptual behaviors to various subcortical structures. The neuroanatomical evidence suggests that acetylcholine delivered by the basal forebrain is critical for the activation and learning of a mapping between C3b and C5p neurons, and that this mapping is the source of cortically learned behavior output and/or skill learning. The relationship of C5p neurons to C3b populations is significant because the C3b population appears to be centrally located in nearly all circuits. Therefore a direct mapping, driven by acetylcholine projections, from stable C3b perceptions to C5p behavior output can be developed over time exclusively in the cerebral cortex.

2.6 Perception State and Action Control Circuit

Nervous systems evolved to control muscles through structures like the basal ganglia and cerebellum[1]. Muscles are widely distributed throughout the body, but must be controlled in a coordinated manner. Human cognition, evolving from the same circuitry, is certainly controlled too. However, the neuroanatomical mechanism underlying cognitive control is still an open question.

Along with the basal ganglia, the cerebellum is another structure critical for smooth control of movement and cognition[207]. Lesions to the cerebellum often produce dysmetria (lack of co-ordination of movement) and cerebellar cognitive dysfunction has been described as "dysmetria of thought" [208]. By psychological analogy movement and cognition appear to be functionally controlled in the same way.

2.6.1 Cortical layer 1—L1

Layer 1 of the cerebral cortex, referred to as the molecular layer, lies closest to the pial surface of the brain. The only neurons in L1 are inhibitory Cajal-Retzius cells containing long horizontal axons[53, 63, 61]. L1 is composed of a dense plexus of dendritic tufts of pyramidal neurons combined with axons from cortical and subcortical origin. Many nonglutamate neurotransmitters systems (serotoninergic, adrenergic, cholinergic) appear to target the lower portions of layer 1 [209]. The dense plexus of dendrites in L1 provides the opportunity for a given axon terminating in L1 to effect pyramidal neurons throughout all layers. The cortical pyramidal neurons consistently demonstrating prominent L1 apical dendritic tufts are C2, C3a, C3b, C5s, and C5p.

Functional Interpretation: The neuroanatomical architecture of layer 1 facilitates the control input enabling the control of perception state representation, selection and working memory 806 as shown in FIG. 8.

2.6.2 Thalamocortical layer 1 projections—TL1

Herkenham first described a localized region of the thalamus in the mouse, VM, that projected diffusely to layer 1 of nearly the entire cerebral cortex[181, 210]. The projection has a decreasing density gradient from frontal cortex (cognitive) to parietal cortex (sensory). Other studies in the rat definitively confirm the VM→L1 projection[211, 212]. The ventral thalamus in the monkey has significant projections to layer 1[213, 103]. However, a localized thalamic L1 projection nuclei has not been directly looked for in primates and we use the nuclei VAmc/VM to estimate the localized thalamic TL1 projection source occurring near the mammothalamic tract that presumably exists in the primate (human). The VAmc/VM nuclei receive projections from the Gpi/Snr and the cerebellum[112, 214, 174] and send projections back to the striatum[160]. As part of the reticular activating system the ventral (and other thalamic nuclei) receive afferent cholinergic projections from the brainstem[215]. We include in the TL1 definition the more sparsely distributed layer 1 projecting thalamic matrix described by Jones[216].

Historical Note: One of the most perplexing thalamic projections has been the non-specific thalamocortical layer 1 projection described by Lorente de No in the 1940's[11]. The intralaminar thalamic nuclei have long been thought to supply the layer 1 projection, but given the infragranular (L5/6) targets of Ti that appears unlikely today[182]. Ironically, the discovery of the actual source of these layer 1 projections was surely, albeit unknowingly, discovered in the early electrophysiology intralaminar recruiting response experiments in cats[183]. Hanbery and Jaspers "discovered a portion of the diffuse projection system which behaves quite differently from [the traditional recruiting response]. In . . . VA . . . we have obtained diffuse short-latency cortical responses in response to a single shock . . . We seem to be stimulating here . . . a short latency diffuse projection system, which actually does not give true recruiting responses of the type presumably characteristic of the intralaminar system"[183]. A focused experiment to directly test for this projection in the primate would be fruitful for neuroscience.

Functional Interpretation: The neuroanatomical architecture of TL1 facilitates the control of perception state representation selection and working memory 806 as shown in FIG. 8.

2.6.3 Metencephalon—Pons, Cerebellum

The metencephalon primarily includes the pons, cerebellum, and deep cerebellar nuclei. The pons receives nearly all its afferent projections from the isocortex and sends nearly all its efferent output to the cerebellum[217]. This close relationship is demonstrated by the tight correlated volumetric evolution between the pons and cerebral cortex across species. The pons accounting for 6% of the brainstem in prosimians, 11-21% in monkeys and 37% in humans[217]. As discussed, the pons receives its cortical projection from the C5p cells from nearly the entire cerebral cortex[218, 219, 220]. A few prefrontal and temporal cortical regions in the primate do not appear to project to the pons[221]. The pons then continues to project topographically onto the cerebellum[222]. The output of the cerebellum arises from inhibitory purkinje cells that target the deep cerebellar nuclei (DCN)[207]. Therefore, like the basal ganglia, the cerebellum functions on the principle of disinhibition. A detailed cerebellum review is useful for understanding the internal cerebellar circuitry[223]. The output of the DCN is an excitatory glutamatergic projection targeting predominantly the ventral thalamus[114]. The cortico-cerebellar-thalamocortical circuit results in closed loop topographic projections to wide areas of the frontal, temporal, and parietal cortices[224, 222].

Functional Interpretation: The neuroanatomical architecture of the pons facilitates the output of the rhombencephalon dynamically stabilizing control system for fine tuning and stabilizing sequences of movement and cognitive behaviors as shown between 812 and 806 in FIG. 8.

2.6.4 Perspective on cognitive control

We present the hypothesis that cognition is fundamentally controlled via the TL1 thalamocortical projection system. We hypothesize all thalamocortical layer 1 projections have a similar functional role in cognitive control through the activation of cortical modules to drive cortico-thalamocortical information processing and working memory. While the VAmc/VM nuclei might be considered "centralized control", the matrix layer 1 projections from other distributed thalamic locations might be considered "local feedback control".

By analogy, if alpha motor neurons activate individual muscles and TL1 projections activate individual cortical modules, then the TL1 projecting neurons might be considered 'alpha motor neurons of thought'. If a cortical region like Brodmann's area 8 or 9 targets this region with cortico-thalamocortical C6t projections then that region might be considered "primary thought cortex". Human lesion studies to these areas resulting in the elimination of voluntary cognitive processes are consistent with this hypothesis (e.g. patient M.F.)[4]. Multiple experiments could be created to test this hypothesis in the primate, all beginning with first locating the exact thalamic region capable of exciting diffuse surface wave potentials described by Hanbery and Jasper [183]. With the region identified through electrophysiology, behavioral effects of stimulation or lesions can be tested, and the exact afferent/efferent cortical laminar projections can be determined through tracing studies.

2.7 Cortical Information Flow Regulation: Cortico-Claustral-Cortico Circuit

The claustrum and related circuitry is one of the least understood functionally. The most prominent ideas implicating the claustrum in the integration of conscious precepts [225].

2.7.1 Claustrum—CM

The claustrum is located midway between layer 6 of insular cortex (from which it breaks off early in brain development) and the striatum. Debate is ongoing on whether the claustrum's developmental origin is cortical, striatal, or a hybrid [226].

Projections from the claustrum target nearly the entire brain, with little segregation of projections in the claustrum [227]. Claustrum projections travel through the external capsule and appear slightly biased to cognitive and cortical control centers of the brain[228]. The projections from the claustrum terminate mostly in layer 4 and appear to preferentially target inhibitory neurons, possibly chandelier cells with axoaxonic terminals[229, 224].

Functional Interpretation: The neuroanatomical architecture of the claustrum facilitates the transfer of information between perception states as shown in FIG. 8 818.

2.7.2 Cortical Layer 6 Claustrum Projecting—C6m

The claustrum receives projections from virtually the entire cortex in a topographic, but largely overlapped fashion [230]. The projections from cortex originate from C6m neurons, which are distinct from C6t neurons in the cat[231]. Apical dendrites of these neurons typically arborize directly below layer 4 in the upper part of layer 5[35, 11]. Occasionally collaterals of C5s neurons are found in the claustrum [177].

Functional Interpretation: The neuroanatomical architecture of the C6m facilitates the transfer of information between perception states in conjunction with the claustrum and action selection as shown in FIGS. 8 806 and 818.

2.7.3 Perspective on the Claustrum

The claustrum's functional connections are suited to regulate the flow of information between wide areas of the cortex, potentially through the excitation of inhibitory chandelier type cells. Activation of inhibitory chandelier cells would immediately prevent the transmission of action potentials from active neurons in layers 3-5 without reducing the excitation of the neuron. Notable is the C6m dendritic and axon projections to layer 5a containing C5s striatally projecting cells. The additional relationship of the claustrum to striatally projecting neurons further implies, through analogous function, selection and/or gating of information.

3 Summary Perspective on Neuroanatomical Information Flow

Figure 4:
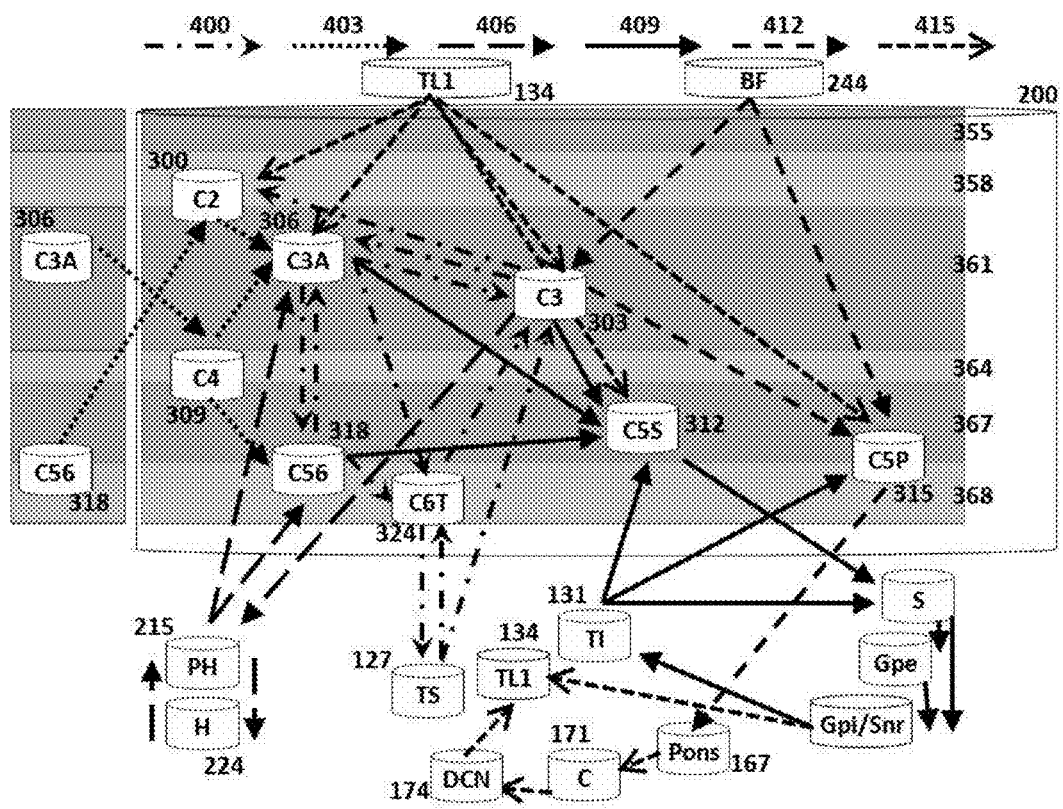
FIG. 4 shows a non-limiting example of a NABS architecture; in this case, a software architecture described by short-term memory 406, long-term memory 403, perceptual information processing 400, action selection 409, action output 412, and control circuits 415.

FIG. 4 shows the hypothesized organization of six circuits viewable from two perspectives: circuit development and information flow. As a summary, we hypothesize a simplified but comprehensive cognitive framework mutually consistent with the summarized neuroanatomical facts.

3.1 Perspective on Cognitive Development

We briefly hypothesize the development of the circuits in the maturing brain in relation to FIG. 4.

- Layer 4 feed forward projections drive the formation of perceptual cell assemblies in C3a and C56.
- Critical periods first regulate the formation of cell assemblies within and between neuronal groups C3a and C56, followed by C3b and C6t.
- Stable invariant C3b representations are simultaneously formed through intercortical C4 feed-forward and C2 feedback influence and C3a intracortical input.
- Stable C3b representations in different cortical modules are associated when temporally coactive in the hippocampus.
- During sleep cycles most behavioral selection and behavior output circuits are shut down and working memory and short-term memory circuits are active in order to consolidate short-term memory into intercortical long-term memory.
- Action representations (C5s) form to communicate cortical action behaviors to the basal ganglia. The claustrum may be important in this development.
- Dopamine input to the striatum from the Snc is used to reward or antireward C5s action sequence selection, learning combinatorial sequences from the cortical modular hierarchy.
- Ti projects upon the lower layers of the isocortex (C5s/C5p) to aid in the selection of behaviors.
- Successful output behaviors, determined by cholinergic basal forebrain activity, reinforce the mapping between C3b and C5p for direct activation of learned behaviors.
- The cerebellum learns to aid in ventral thalamic control in response to C5p cortical output.

3.2 Perspective on developed cognitive information processing

We briefly hypothesize the utilization of the circuits in the matured brain in relation to FIG. 4.

- Instigation of cognitive information processing begins with the layer 1 control projections (TL1) to the cerebral cortex. The cholinergic reticular activating system turns on thalamic nuclei.
- Control inputs drive cortico-thalamocortical information processing to select active C3b perceptions simultaneously in multiple cortical modules.
- Long-term memory associations and short-term memory simultaneously bias the selection of C3b perceptions in target cortical modules.
- C5s cortical action suggestions are communicated to the basal ganglia for selection.
- C3b perceptions trigger output C5p groups that communicate cognitive output to the cerebellum or directly cause physical behavior in motor cortex.
- Cognitive control via TL1 is simultaneously driven by basal ganglia, cerebellar, and direct frontal cortex C6t input, resulting in ongoing "self-controlled thought."

References

[1] G. F. Striedter, Principles of Brain Evolution. Sunderland: Sinauer Associates, Inc., 2005.

[2] A. Watakabe, N. Ichinohe, S. Ohsawa, T. Hashikawa, Y. Komatsu, K. S. Rockland, and T. Yamamori, "Comparative analysis of layer-specific genes in mammalian neocortex," Cereb Cortex, 2006.

[3] L. R. Squire, "Memory systems of the brain: a brief history and current perspective," Neurobiology of Learning and Memory, vol. 82, pp. 171-177, 2004.

[4] W. Penfield and T. Rasmussen, The Cerebral Cortex of Man: A Clinical Study of Localization of Function. New York: Hafner Publishing Company, 1968.

[5] N. Geschwind, "Disconnexion syndromes in animals and man. ii," Brain, vol. 88, no. 3, pp. 585-644, 1965.

[6] N. Geschwind, "Disconnexion syndromes in animals and man. i," Brain, vol. 88, no. 2, pp. 237-94, 1965.

[7] J. D. Schmahmann, E. E. Smith, F. S. Eichler, and C. M. Filley, "Cerebral white matter: neuroanatomy, clinical neurology, and neurobehavioral correlates," Ann N Y Acad Sci, vol. 1142, pp. 266-309, 2008.

[8] H. Damasio and A. R. Damasio, "The anatomical basis of conduction aphasia," Brain, vol. 103, no. 2, pp. 337-50, 1980.

[9] R. Toro, M. Perron, B. Pike, L. Richer, S. Veillette, Z. Pausova, and T. Paus, "Brain size and folding of the human cerebral cortex," Cereb Cortex, vol. 18, no. 10, pp. 2352-7, 2008.

[10] C. von Economo, The Cytoarchitectonics of the Human Cerebral Cortex. London: Oxford University Press, 1929.

[11] R. Lorente de No, "Cerebral cortex: Architecture, intracortical connections, motor projections," in Physiology of the nervous system (J. Fulton, ed.), Outlines of Physiology Series, pp. 274-301, New York: Oxford University Press, 2nd ed. ed., 1943.

[12] P. Rakic, "A small step for the cell, a giant leap for mankind: a hypothesis of neocortical expansion during evolution," Trends Neurosci, vol. 18, no. 9, pp. 383-8, 1995.

[13] R. G. Northcutt and J. H. Kaas, "The emergence and evolution of mammalian neocortex," Trends Neurosci, vol. 18, no. 9, pp. 373-9, 1995.

[14] K. Brodmann, Brodmann's 'Localisation in the Cerebral Cortex'. London: Smith-Gordon, 1909.

[15] L. C. Triarhou, "A proposed number system for the 107 cortical areas of economo and koskinas, and brodmann area correlations," Stereotact Funct Neurosurg, vol. 85, no. 5, pp. 204-15, 2007.

[16] M. Catani and D. H. ffytche, "The rises and falls of disconnection syndromes," Brain, vol. 128, pp. 2224-39, 2005.

[17] J. Szentagothai, "The 'module-concept' in cerebral cortex architecture," Brain Res, vol. 95, no. 2-3, pp. 475-96, 1975.

[18] K. Tanaka, "Columns for complex visual object features in the inferotemporal cortex: Clustering of cells with similar but slightly different stimulus selectivities," Cerebral Cortex, vol. 13, no. 1, pp. 90-99, 2003.

[19] P. S. Goldman-Rakic, "Regional and cellular fractionation of working memory," Proc Natl Acad Sci USA, vol. 93, no. 24, pp. 13473-80, 1996.

[20] S. T. Grafton, M. A. Arbib, L. Fadiga, and G. Rizzolatti, "Localization of grasp representations in humans by positron emission tomography," Experimental Brain Research, vol. 112, no. 1, 1996.

[21] M. F. Kritzer and P. S. Goldman-Rakic, "Intrinsic circuit organization of the major layers and sublayers of the dorsolateral prefrontal cortex in the rhesus monkey," J Comp Neurol, vol. 359, no. 1, pp. 131-43, 1995.

[22] J. B. Levitt, D. A. Lewis, T. Yoshioka, and J. S. Lund, "Topography of pyramidal neuron intrinsic connections in macaque monkey prefrontal cortex (areas 9 and 46)," J Comp Neurol, vol. 338, no. 3, pp. 360-76, 1993.

[23] M. L. Pucak, J. B. Levitt, J. S. Lund, and D. A. Lewis, "Patterns of intrinsic and associational circuitry in monkey prefrontal cortex," J Comp Neurol, vol. 376, no. 4, pp. 614-30, 1996.

[24] I. Fujita and T. Fujita, "Intrinsic connections in the macaque inferior temporal cortex," J Comp Neurol, vol. 368, no. 4, pp. 467-86, 1996.

[25] A. D. de Lima, T. Voigt, and J. H. Morrison, "Morphology of the cells within the inferior temporal gyrus that project to the prefrontal cortex in the macaque monkey," J Comp Neurol, vol. 296, no. 1, pp. 159-72, 1990.

[26] D. J. Price, H. Kennedy, C. Dehay, L. Zhou, M. Mercier, Y. Jossin, A. M. Goffinet, F. Tissir, D. Blakey, and Z. Molnar, "The development of cortical connections," Eur J Neurosci, vol. 23, no. 4, pp. 910-20, 2006.

[27] D. S. Melchitzky, G. Gonzalez-Burgos, G. Barrionuevo, and D. A. Lewis, "Synaptic targets of the intrinsic axon collaterals of supragranular pyramidal neurons in monkey prefrontal cortex," J Comp Neurol, vol. 430, no. 2, pp. 209-21, 2001.

[28] D. P. Buxhoeveden and M. F. Casanova, "The minicolumn hypothesis in neuroscience," Brain, vol. 125, no. 5, pp. 935-951, 2002.

[29] V. B. Mountcastle, "Introduction," Cerebral cortex, vol. 13, pp. 2-4, 2003.

[30] K. S. Rockland and N. Ichinohe, "Some thoughts on cortical minicolumns," Exp Brain Res, vol. 158, no. 3, pp. 265-77, 2004.

[31] J. D. Schmahmann and D. N. Pandya, Fiber Pathways of the Brain. New York: Oxford University Press, 2006.

[32] D. S. Marcus, J. Harwell, T. Olsen, M. Hodge, M. F. Glasser, F. Prior, M. Jenkinson, T. Laumann, S. W. Curtiss, and D. C. Van Essen, "Informatics and data mining tools and strategies for the human connectome project," Front Neuroinform, vol. 5, p. 4, 2011.

[33] R. Kotter, "Online retrieval, processing, and visualization of primate connectivity data from the cocomac database," Neuroinformatics, vol. 2, no. 2, pp. 127-44, 2004.

[34] H. Barbas, C. C. Hilgetag, S. Saha, C. R. Dermon, and J. L. Suski, "Parallel organization of contralateral and ipsilateral prefrontal cortical projections in the rhesus monkey," BMC Neurosci, vol. 6, no. 1, p. 32, 2005.

[35] A. S. Soloway, M. L. Pucak, D. S. Melchitzky, and D. A. Lewis, "Dendritic morphology of callosal and ipsilateral projection neurons in monkey prefrontal cortex," Neuroscience, vol. 109, no. 3, pp. 461-71, 2002.

[36] A. Walker, "A cytoarchitectural study of the prefrontal area of the macaque monkey," J Comp Neurol, vol. 73, no. 1, pp. 59-86, 1940.

[37] H. Barbas, "Pattern in the laminar origin of corticocortical connections," J Comp Neurol, vol. 252, no. 3, pp. 415-22, 1986.

[38] H. Barbas and N. Rempel-Clower, "Cortical structure predicts the pattern of corticocortical connections," Cereb Cortex, vol. 7, no. 7, pp. 635-46, 1997.

[39] N. L. Rempel-Clower and H. Barbas, "The laminar pattern of connections between prefrontal and anterior temporal cortices in the rhesus monkey is related to cortical structure and function," Cereb Cortex, vol. 10, no. 9, pp. 851-65, 2000.

[40] H. Barbas, M. Medalla, O. Alade, J. Suski, B. Zikopoulos, and P. Lera, "Relationship of prefrontal connections to inhibitory systems in superior temporal areas in the rhesus monkey," Cereb Cortex, vol. 15, no. 9, pp. 1356-70, 2005.

[41] K. S. Rockland, "Configuration, in serial reconstruction, of individual axons projecting from area v2 to v4 in the macaque monkey," Cereb Cortex, vol. 2, no. 5, pp. 353-74, 1992.

[42] M. Medalla and H. Barbas, "Diversity of laminar connections linking periarcuate and lateral intraparietal areas depends on cortical structure," Eur J Neurosci, vol. 23, no. 1, pp. 161-79, 2006.

[43] D. C. Van Essen, "Corticocortical and thalamocortical information flow in the primate visual system," Progress in Brain Research, vol. 149, pp. 173-183, 2005.

[44] D. J. Felleman and D. C. Van Essen, "Distributed hierarchical processing in the primate cerebral cortex," Cereb Cortex, vol. 1, no. 1, pp. 1-47, 1991.

[45] G. von Bonin and P. Bailey, The Neocortex of Macaca Mulatta. Illinois: The University of Illinois Press, 1947.

[46] J. DeFelipe, M. Conley, and E. G. Jones, "Long-range focal collateralization of axons arising from corticocortical cells in monkey sensory-motor cortex," J Neurosci, vol. 6, no. 12, pp. 3749-66, 1986.

[47] G. Meyer, T. H. Gonzalez-Hernandez, and R. Ferres-Torres, "The spiny stellate neurons in layer iv of the human auditory cortex. a golgi study," Neuroscience, vol. 33, no. 3, pp. 489-98, 1989.

[48] J. S. Lund, A. E. Hendrickson, M. P. Ogren, and E. A. Tobin, "Anatomical organization of primate visual cortex area vii," J Comp Neurol, vol. 202, no. 1, pp. 19-45, 1981.

[49] H. Tanigawa, I. Fujita, M. Kato, and H. Ojima, "Distribution, morphology, and gammaaminobutyric acid immunoreactivity of horizontally projecting neurons in the macaque inferior temporal cortex," J Comp Neurol, vol. 401, no. 1, pp. 129-43, 1998.

[50] J. S. Lund, T. Yoshioka, and J. B. Levitt, "Comparison of intrinsic connectivity in different areas of macaque monkey cerebral cortex," Cereb Cortex, vol. 3, no. 2, pp. 148-62, 1993.

[51] E. Tardif, A. Probst, and S. Clarke, "Laminar specificity of intrinsic connections in broca's area," Cerebral Cortex, vol. 17, no. 12, pp. 2949-60, 2007.

[52] K. S. Rockland and G. W. Drash, "Collateralized divergent feedback connections that target multiple cortical areas," J Comp Neurol, vol. 373, no. 4, pp. 529-48, 1996.

[53] S. R. y. Cajal, Texture of the nervous system of man and the vertebrates, vol. 3. New Nork: Springer-Verlag, 2002.

[54] L. Alonso-Nanclares, S. Anderson, G. Ascoli, R. Benavides-Piccione, A. Burkhalter, G. Buzsaki, B. Cauli, J. DeFelipe, A. Fairen, D. Feldmeyer, G. Fishel, Y. Fregnac, T. F. Freund, K. Fukuyi, M. Glarreta, J. Goldberg, M. Helmstaedter, T. Hensch, S. Hestrin, Z. Kisvarday, B. Lambolez, D. Lewis, C. McBain, O. Marin, H. Markham, H. Monyer, A. Muoz, C. Petersen, K. Rockland, H. Rossier, B. Ruby, P. Somogyi, J. F. Staiger, G. Tamas, A. Thomason, M. Toledo-Rodriguez, X.-J. Wang, Y. Wang, D. West, and R. Yuste, "Petilla 2005: Nomenclature of features of gabaergic interneurons of the cerebral cortex," 2005.

[55] K. Letinic, R. Zoncu, and P. Rakic, "Origin of gabaergic neurons in the human neocortex," Nature, vol. 417, no. 6889, pp. 645-9, 2002.

[56] J. S. Lund and D. A. Lewis, "Local circuit neurons of developing and mature macaque pre-frontal cortex: Golgi and immunocytochemical characteristics," J Comp Neurol, vol. 328, no. 2, pp. 282-312, 1993.

[57] J. R. Gibson, M. Beierlein, and B. W. Connors, "Two networks of electrically coupled inhibitory neurons in neocortex," Nature, vol. 402, no. 6757, pp. 75-9, 1999.

[58] S. Hestrin and M. Galarreta, "Electrical synapses define networks of neocortical gabaergic neurons," Trends in Neurosciences, vol. 28, no. 6, pp. 304-309, 2005.

[59] A. V. Zaitsev, G. Gonzalez-Burgos, N. V. Povysheva, S. Kroner, D. A. Lewis, and L. S. Krimer, "Localization of calcium-binding proteins in physiologically and morphologically characterized interneurons of monkey dorsolateral prefrontal cortex," Cereb Cortex, vol. 15, no. 8, pp. 1178-86, 2005.

[60] A. V. Zaitsev, N. V. Povysheva, G. Gonzalez-Burgos, D. Rotaru, K. N. Fish, L. S. Krimer, and D. A. Lewis, "Interneuron diversity in layers 2-3 of monkey prefrontal cortex," Cereb Cortex, vol. 19, no. 7, pp. 1597-615, 2009.

[61] F. Conde, J. S. Lund, D. M. Jacobowitz, K. G. Baimbridge, and D. A. Lewis, "Local circuit neurons immunoreactive for calretinin, calbindin d-28k or parvalbumin in monkey prefrontal cortex: distribution and morphology," J Comp Neurol, vol. 341, no. 1, pp. 95-116, 1994.

[62] J. Defelipe, M. C. Gonzalez-Albo, M. R. Del Rio, and G. N. Elston, "Distribution and patterns of connectivity of interneurons containing calbindin, calretinin, and parvalbumin in visual areas of the occipital and temporal lobes of the macaque monkey," J Comp Neurol, vol. 412, no. 3, pp. 515-26, 1999.

[63] P. L. Gabbott and S. J. Bacon, "Local circuit neurons in the medial prefrontal cortex (areas 24a,b,c, 25 and 32) in the monkey: I. cell morphology and morphometrics," J Comp Neurol, vol. 364, no. 4, pp. 567-608, 1996.

[64] K. M. Murphy, B. R. Beston, P. M. Boley, and D. G. Jones, "Development of human visual cortex: a balance between excitatory and inhibitory plasticity mechanisms," Dev Psychobiol, vol. 46, no. 3, pp. 209-21, 2005.

[65] D. O. Hebb, The Organization of Behavior: A Neuropsychological Theory. New Jersey: Lawrence Erlbaum Associates, 1949.

[66] Y. Yoshimura, J. L. Dantzker, and E. M. Callaway, "Excitatory cortical neurons form fine-scale functional networks," Nature, vol. 433, pp. 868-873, 2005.

[67] D. Y. Tsao, W. A. Freiwald, R. B. Tootell, and M. S. Livingstone, "A cortical region consisting entirely of face-selective cells," Science, vol. 311, no. 5761, pp. 670-4, 2006.

[68] J. M. Fuster, Cortex and Mind. New York: Oxford University Press, 2003.

[69] L. R. Squire and P. Alvarez, "Retrograde amnesia and memory consolidation: a neurobiological perspective," Curr Opin Neurobiol, vol. 5, no. 2, pp. 169-77, 1995.

[70] B. Milner, "The medial temporal-lobe amnesic syndrome," Psychiatr Clin North Am, vol. 28, no. 3, pp. 599-611, 609, 2005.

[71] L. R. Squire and S. M. Zola, "Structure and function of declarative and nondeclarative memory systems," Proc Natl Acad Sci USA, vol. 93, no. 24, pp. 13515-22, 1996.

[72] H. Eichenbaum, "A cortical-hippocampal system for declarative memory," Nature Reviews. Neuroscience, vol. 1, no. 1, pp. 41-50, 2000.

[73] R. D. Burwell, "The parahippocampal region: cortico-cortico connectivity," Annals of the New York Academy of Sciences, vol. 911, pp. 25-42, 2000.

[74] P. Lavenex, W. A. Suzuki, and D. G. Amaral, "Perirhinal and parahippocampal cortices of the macaque monkey: projections to the neocortex," Journal of Comparative Neurology, vol. 447, no. 4, pp. 394-420, 2002.

[75] M. Witter, H. Groenewegen, F. L. D. Silva, and A. Lohman, "Functional organization of the extrinsic and intrinsic circuitry of the parahippocampal region," Progress in Neurobiology, vol. 33, pp. 161-253, 1989.

[76] R. Insausti, D. G. Amaral, and W. M. Cowan, "The entorhinal cortex of the monkey: Iii. subcortical afferents," J Comp Neurol, vol. 264, no. 3, pp. 396-408, 1987.

[77] E. G. Jones and S. P. Wise, "Size, laminar and columnar distribution of efferent cells in the sensory-motor cortex of monkeys," J Comp Neurol, vol. 175, no. 4, pp. 391-438, 1977.

[78] J. DeFelipe, "Types of neurons, synaptic connections and chemical characteristics of cells immunoreactive for calbindin-d28k, parvalbumin and calretinin in the neocortex," J Chem Neuroanat, vol. 14, no. 1, pp. 1-19, 1997.

[79] T. A. Hackett, T. M. Preuss, and J. H. Kaas, "Architectonic identification of the core region in auditory cortex of macaques, chimpanzees, and humans," Journal of Comparative Neurology, vol. 441, no. 3, pp. 197-222, 2001.

[80] M. L. Voytko, C. A. Kitt, and D. L. Price, "Cholinergic immunoreactive fibers in monkey anterior temporal cortex," Cereb Cortex, vol. 2, no. 1, pp. 48-55, 1992.

[81] F. Briggs and E. M. Callaway, "Laminar patterns of local excitatory input to layer 5 neurons in macaque primary visual cortex," Cereb Cortex, vol. 15, no. 5, pp. 479-88, 2005.

[82] A. M. Thomson and A. P. Bannister, "Postsynaptic pyramidal target selection by descending layer iii pyramidal axons: dual intracellular recordings and biocytin filling in slices of rat neocortex," Neuroscience, vol. 84, no. 3, pp. 669-83, 1998.

[83] D. G. Amaral and M. P. Witter, "The three-dimensional organization of the hippocampal formation: a review of anatomical data," Neuroscience, vol. 31, no. 3, pp. 571-91, 1989.

[84] E. Gould, "How widespread is adult neurogenesis in mammals?," Nat Rev Neurosci, vol. 8, no. 6, pp. 481-8, 2007.

[85] D. G. Amaral and W. M. Cowan, "Subcortical afferents to the hippocampal formation in the monkey," J Comp Neurol, vol. 189, no. 4, pp. 573-91, 1980.

[86] T. J. Teyler and J. W. Rudy, "The hippocampal indexing theory and episodic memory: updating the index," Hippocampus, vol. 17, no. 12, pp. 1158-69, 2007.

[87] J. O'Neill, B. Pleydell-Bouverie, D. Dupret, and J. Csicsvari, "Play it again: reactivation of waking experience and memory," Trends Neurosci, vol. 33, no. 5, pp. 220-9, 2010.

[88] Y. Kobayashi and D. G. Amaral, "Macaque monkey retrosplenial cortex: Ii. cortical afferents," J Comp Neurol, vol. 466, no. 1, pp. 48-79, 2003.

[89] Y. Kobayashi and D. G. Amaral, "Macaque monkey retrosplenial cortex: Iii. cortical efferents," J Comp Neurol, vol. 502, no. 5, pp. 810-33, 2007.

[90] S. Monsell, "Components of working memory underlying verbal skills: a "distributed capacities" view," in International Symposium on Attention and Performance X (B. H. and B. D., eds.), vol. 10, pp. 327-350, Hillsdale, N.J.: Erlbaum, 1984.

[91] A. Baddeley, "The concept of working memory: a view of its current state and probable future development," Cognition, vol. 10, no. 1-3, pp. 17-23, 1981.

[92] G. Buzsaki, Rhythms of the brain. New York: Oxford, 2006.

[93] R. T. Knight, "Neuroscience. Neural networks debunk phrenology," Science, vol. 316, no. 5831, pp. 1578-9, 2007.

[94] R. T. Canolty, E. Edwards, S. S. Dalal, M. Soltani, S. S. Nagarajan, H. E. Kirsch, M. S. Berger, N. M. Barbaro, and R. T. Knight, "High gamma power is phase-locked to theta oscillations in human neocortex," Science, vol. 313, no. 5793, pp. 1626-8, 2006.

[95] E. Edwards, M. Soltani, L. Y. Deouell, M. S. Berger, and R. T. Knight, "High gamma activity in response to deviant auditory stimuli recorded directly from human cortex," J Neurophysiol, vol. 94, no. 6, pp. 4269-80, 2005.

[96] M. Steriade, "Grouping of brain rhythms in corticothalamic systems," Neuroscience, vol. 137, no. 4, pp. 1087-106, 2006.

[97] E. G. Jones, The Thalamus, vol. 1-2. Cambridge: Cambridge University Press, second ed., 2007.

[98] G. Macchi and E. G. Jones, "Toward an agreement on terminology of nuclear and subnuclear divisions of the motor thalamus," J Neurosurg, vol. 86, no. 4, pp. 670-85, 1997.

[99] L. M. Romanski, M. Giguere, J. F. Bates, and P. S. Goldman-Rakic, "Topographic organization of medial pulvinar connections with the prefrontal cortex in the rhesus monkey," J Comp Neurol, vol. 379, no. 3, pp. 313-32, 1997.

[100] E. G. Jones and H. Burton, "Areal differences in the laminar distribution of thalamic afferents in cortical fields of the insular, parietal and temporal regions of primates," J Comp Neurol, vol. 168, no. 2, pp. 197-247, 1976.

[101] J. Q. Trojanowski and S. Jacobson, "Areal and laminar distribution of some pulvinar cortical efferents in rhesus monkey," J Comp Neurol, vol. 169, no. 3, pp. 371-92, 1976.

[102] K. S. Rockland, J. Andresen, R. J. Cowie, and D. L. Robinson, "Single axon analysis of pulvinocortical connections to several visual areas in the macaque," J Comp Neurol, vol. 406, no. 2, pp. 221-50, 1999.

[103] N. R. McFarland and S. N. Haber, "Thalamic relay nuclei of the basal ganglia form both reciprocal and nonreciprocal cortical connections, linking multiple frontal cortical areas," J Neurosci, vol. 22, no. 18, pp. 8117-32, 2002.

[104] M. Giguere and P. S. Goldman-Rakic, "Mediodorsal nucleus: areal, laminar, and tangential distribution of afferents and efferents in the frontal lobe of rhesus monkeys," J Comp Neurol, vol. 277, no. 2, pp. 195-213, 1988.

[105] E. M. Callaway, "Local circuits in primary visual cortex of the macaque monkey," Annual Review of Neuroscience, vol. 21, pp. 47-74, 1998.

[106] W. Brysch, I. Brysch, 0. D. Creutzfeldt, R. Schlingensiepen, and K. H. Schlingensiepen, "The topology of the thalamo-cortical projections in the marmoset monkey (callithrix jacchus)," Exp Brain Res, vol. 81, no. 1, pp. 1-17, 1990.

[107] J. C. Hohl-Abrahao and O. D. Creutzfeldt, "Topographical mapping of the thalamocortical projections in rodents and comparison with that in primates," Exp Brain Res, vol. 87, no. 2, pp. 283-94, 1991.

[108] B. A. Vogt, D. N. Pandya, and D. L. Rosene, "Cingulate cortex of the rhesus monkey: I. cytoarchitecture and thalamic afferents," J Comp Neurol, vol. 262, no. 2, pp. 256-70, 1987.

[109] P. S. Goldman-Rakic and L. J. Porrino, "The primate mediodorsal (md) nucleus and its projection to the frontal lobe," J Comp Neurol, vol. 242, no. 4, pp. 535-60, 1985.

[110] C. Baleydier and F. Mauguiere, "Network organization of the connectivity between parietal area 7, posterior cingulate cortex and medial pulvinar nucleus: a double fluorescent tracer study in monkey," Exp Brain Res, vol. 66, no. 2, pp. 385-93, 1987.

[111] J. Kievit and H. G. Kuypers, "Organization of the thalamo-cortical connexions to the frontal lobe in the rhesus monkey," Exp Brain Res, vol. 29, no. 3-4, pp. 299-322, 1977.

[112] M. Sidibe, M. D. Bevan, J. P. Bolam, and Y. Smith, "Efferent connections of the internal globus pallidus in the squirrel monkey: I. topography and synaptic organization of the pallidothalamic projection," J Comp Neurol, vol. 382, no. 3, pp. 323-47, 1997.

[113] M. Parent and A. Parent, "The pallidofugal motor fiber system in primates," Parkinsonism Relat Disord, vol. 10, no. 4, pp. 203-11, 2004.

[114] S. T. Sakai, M. Inase, and J. Tanji, "Comparison of cerebellothalamic and pallidothalamic projections in the monkey (macaca fuscata): a double anterograde labeling study," J Comp Neurol, vol. 368, no. 2, pp. 215-28, 1996.

[115] C. Hamani, J. O. Dostrovsky, and A. M. Lozano, "The motor thalamus in neurosurgery,"Neurosurgery, vol. 58, no. 1, pp. 146-58; discussion 146-58, 2006.

[116] A. Peters, J. M. Cifuentes, and C. Sethares, "The organization of pyramidal cells in area 18 of the rhesus monkey," Cereb Cortex, vol. 7, no. 5, pp. 405-21, 1997.

[117] F. Briggs and E. M. Callaway, "Layer-specific input to distinct cell types in layer 6 of monkey primary visual cortex," J Neurosci, vol. 21, no. 10, pp. 3600-8, 2001.

[118] C. E. Catsman-Berrevoets and H. G. Kuypers, "Differential laminar distribution of corticothalamic neurons projecting to the vl and the center median. an hrp study in the cynomolgus monkey," Brain Res, vol. 154, no. 2, pp. 359-65, 1978.

[119] J. Q. Trojanowski and S. Jacobson, "The morphology and laminar distribution of corticopulvinar neurons in the rhesus monkey," Exp Brain Res, vol. 28, no. 1-2, pp. 51-62, 1977.

[120] C. Asanuma, R. A. Andersen, and W. M. Cowan, "The thalamic relations of the caudal inferior parietal lobule and the lateral prefrontal cortex in monkeys: divergent cortical projections from cell clusters in the medial pulvinar nucleus," J Comp Neurol, vol. 241, no. 3, pp. 357-81, 1985.

[121] M. E. Scheibel and A. B. Scheibel, "The organization of the nucleus reticularis thalami: a Golgi study," Brain Res, vol. 1, no. 1, pp. 43-62, 1966.

[122] E. G. Jones, "Some aspects of the organization of the thalamic reticular complex," J Comp Neurol, vol. 162, no. 3, pp. 285-308, 1975.

[123] B. Zikopoulos and H. Barbas, "Prefrontal projections to the thalamic reticular nucleus form a unique circuit for attentional mechanisms," J Neurosci, vol. 26, no. 28, pp. 7348-61, 2006.

[124] J. L. Velayos, J. Jimenez-Castellanos, J., and F. Reinoso-Suarez, "Topographical organization of the projections from the reticular thalamic nucleus to the intralaminar and medial thalamic nuclei in the cat," J Comp Neurol, vol. 279, no. 3, pp. 457-69, 1989.

[125] D. Pare, Y. Smith, A. Parent, and M. Steriade, "Projections of brainstem core cholinergic and non-cholinergic neurons of cat to intralaminar and reticular thalamic nuclei," Neuroscience, vol. 25, no. 1, pp. 69-86, 1988.

[126] C. Asanuma, "Gabaergic and pallidal terminals in the thalamic reticular nucleus of squirrel monkeys," Exp Brain Res, vol. 101, no. 3, pp. 439-51, 1994.

[127] J. Nolte and J. B. Angevine, The human brain in pictures and diagrams. Philadelphia: Mosby, second ed., 2000.

[128] F. Kimura and C. Itami, "Myelination and isochronicity in neural networks," Front Neuroanat, vol. 3, p. 12, 2009.

[129] T. Kimura, I. Ozaki, and I. Hashimoto, "Impulse propagation along thalamocortical fibers can be detected magnetically outside the human brain," J Neurosci, vol. 28, no. 47, pp. 12535-8, 2008.

[130] S. Solari, A unified anatomical theory and computational model of cognitive information processing in the mammalian brain and the introduction of DNA reco codes. PhD thesis, University of California, San Diego, 2009.

[131] D. Durstewitz, J. K. Seamans, and T. J. Sejnowski, "Neurocomputational models of working memory," Nat Neurosci, vol. 3 Suppl, pp. 1184-91, 2000.

[132] A. Compte, N. Brunel, P. S. Goldman-Rakic, and X. J. Wang, "Synaptic mechanisms and network dynamics underlying spatial working memory in a cortical network model," Cereb Cortex, vol. 10, no. 9, pp. 910-23, 2000.

[133] N. Brunel and X. J. Wang, "Effects of neuromodulation in a cortical network model of object working memory dominated by recurrent inhibition," J Comput Neurosci, vol. 11, no. 1, pp. 63-85, 2001.

[134] W. Heindel, D. Salmon, C. Shults, P. Walicke, and N. Butters, "Neuropsychological evidence for multiple implicit memory systems: a comparison of alzheimer's, huntington's, and parkinson's disease patients," Journal of Neuroscience, vol. 9, no. 2, pp. 582-587, 1989.

[135] E. C. Lauterbach, "The neuropsychiatry of parkinson's disease," Minerva Med, vol. 96, no. 3, pp. 155-73, 2005.

[136] F. O. Walker, "Huntington's disease," Lancet, vol. 369, no. 9557, pp. 218-28, 2007.

[137] E. S. Bromberg-Martin, M. Matsumoto, and O. Hikosaka, "Dopamine in motivational control: rewarding, aversive, and alerting," Neuron, vol. 68, no. 5, pp. 815-34, 2010.

[138] T. Benke, M. Delazer, L. Bartha, and A. Auer, "Basal ganglia lesions and the theory of frontosubcortical loops: neuropsychological findings in two patients with left caudate lesions," Neurocase, vol. 9, no. 1, pp. 70-85, 2003.

[139] K. Doya, "What are the computations of the cerebellum, the basal ganglia and the cerebral cortex?," Neural Networks, vol. 12, pp. 961-974, 1999.

[140] Y. Smith, D. V. Raju, J. F. Pare, and M. Sidibe, "The thalamostriatal system: a highly specific network of the basal ganglia circuitry," Trends Neurosci, vol. 27, no. 9, pp. 520-7, 2004.

[141] Y. Smith, M. D. Bevan, E. Shink, and J. P. Bolam, "Microcircuitry of the direct and indirect pathways of the basal ganglia," Neuroscience, vol. 86, no. 2, pp. 353-87, 1998.

[142] S. Borgmann and U. Jurgens, "Lack of cortico-striatal projections from the primary auditory cortex in the squirrel monkey," Brain Res, vol. 836, no. 1-2, pp. 225-8, 1999.

[143] P. Kreczmanski, H. Heinsen, V. Mantua, F. Woltersdorf, T. Masson, N. Ulfig, R. Schmidt-Kastner, H. Korr, H. W. Steinbusch, P. R. H of, and C. Schmitz, "Volume, neuron density and total neuron number in five subcortical regions in schizophrenia," Brain, vol. 130, no. Pt 3, pp. 678-92, 2007.

[144] D. E. Oorschot, "Total number of neurons in the neostriatal, pallidal, subthalamic, and substantia nigral nuclei of the rat basal ganglia: a stereological study using the cavalieri and optical disector methods," J Comp Neurol, vol. 366, no. 4, pp. 580-99, 1996.

[145] C. D. Hardman, J. M. Henderson, D. I. Finkelstein, M. K. Horne, G. Paxinos, and G. M. Halliday, "Comparison of the basal ganglia in rats, marmosets, macaques, baboons, and humans: volume and neuronal number for the output, internal relay, and striatal modulating nuclei," J Comp Neurol, vol. 445, no. 3, pp. 238-55, 2002.

[146] C. R. Gerfen and D. J. Surmeier, "Modulation of striatal projection systems by dopamine," Annu Rev Neurosci, 2010.

[147] C. R. Lee and J. M. Tepper, "Basal ganglia control of substantia nigra dopaminergic neurons," J Neural Transm Suppl, vol. 1, no. 73, pp. 71-90, 2009.

[148] S. N. Haber, "The primate basal ganglia: parallel and integrative networks," J Chem Neuroanat, vol. 26, no. 4, pp. 317-30, 2003.

[149] M. T. Herrero, C. Barcia, and J. M. Navarro, "Functional anatomy of thalamus and basal ganglia," Childs Nery Syst, vol. 18, no. 8, pp. 386-404, 2002.

[150] C. R. Gerfen, "The neostriatal mosaic: compartmentalization of corticostriatal input and striatonigral output systems," Nature, vol. 311, no. 5985, pp. 461-4, 1984.

[151] Y. Kawaguchi, C. J. Wilson, S. J. Augood, and P. C. Emson, "Striatal interneurones: chemical, physiological and morphological characterization," Trends Neurosci, vol. 18, no. 12, pp. 527-35, 1995.

[152] E. G. Jones, J. D. Coulter, H. Burton, and R. Porter, "Cells of origin and terminal distribution of corticostriatal fibers arising in the sensory-motor cortex of monkeys," J Comp Neurol, vol. 173, no. 1, pp. 53-80, 1977.

[153] E. H. Yeterian and D. N. Pandya, "Laminar origin of striatal and thalamic projections of the prefrontal cortex in rhesus monkeys," Exp Brain Res, vol. 99, no. 3, pp. 383-98, 1994.

[154] T. Arikuni and K. Kubota, "The organization of prefrontocaudate projections and their laminar origin in the macaque monkey: a retrograde study using hrp-gel," J Comp Neurol, vol. 244, no. 4, pp. 492-510, 1986.

[155] K. Kunishio and S. N. Haber, "Primate cingulostriatal projection: limbic striatal versus sensorimotor striatal input," J Comp Neurol, vol. 350, no. 3, pp. 337-56, 1994.

[156] G. E. Alexander, M. R. DeLong, and P. L. Strick, "Parallel organization of functionally segregated circuits linking basal ganglia and cortex," Annu Rev Neurosci, vol. 9, pp. 357-81, 1986.

[157] D. Tande, J. Feger, E. C. Hirsch, and C. Francois, "Parafascicular nucleus projection to the extrastriatal basal ganglia in monkeys," Neuroreport, vol. 17, no. 3, pp. 277-80, 2006.

[158] A. F. Sadikot, A. Parent, and C. Francois, "Efferent connections of the centromedian and parafascicular thalamic nuclei in the squirrel monkey: a pha-1 study of subcortical projections," J Comp Neurol, vol. 315, no. 2, pp. 137-59, 1992.

[159] A. F. Sadikot, A. Parent, Y. Smith, and J. P. Bolam, "Efferent connections of the centromedian and parafascicular thalamic nuclei in the squirrel monkey: a light and electron microscopic study of the thalamostriatal projection in relation to striatal heterogeneity," J Comp Neurol, vol. 320, no. 2, pp. 228-42, 1992.

[160] N. R. McFarland and S. N. Haber, "Organization of thalamostriatal terminals from the ventral motor nuclei in the macaque," J Comp Neurol, vol. 429, no. 2, pp. 321-36, 2001.

[161] D. J. Surmeier, J. Ding, M. Day, Z. Wang, and W. Shen, "D1 and d2 dopamine-receptor modulation of striatal glutamatergic signaling in striatal medium spiny neurons," Trends Neurosci, vol. 30, no. 5, pp. 228-35, 2007.

[162] M. Levesque and A. Parent, "The striatofugal fiber system in primates: a reevaluation of its organization based on single-axon tracing studies," Proc Natl Acad Sci USA, vol. 102, no. 33, pp. 11888-93, 2005.

[163] S. N. Haber, E. Lynd, C. Klein, and H. J. Groenewegen, "Topographic organization of the ventral striatal efferent projections in the rhesus monkey: an anterograde tracing study," J Comp Neurol, vol. 293, no. 2, pp. 282-98, 1990.

[164] F. Fujiyama, J. Sohn, T. Nakano, T. Furuta, K. C. Nakamura, W. Matsuda, and T. Kaneko, "Exclusive and common targets of neostriatofugal projections of rat striosome neurons: a single neuron-tracing study using a viral vector," Eur J Neurosci, vol. 33, no. 4, pp. 668-77, 2011.

[165] C. R. Gerfen, "The neostriatal mosaic: striatal patch-matrix organization is related to cortical lamination," Science, vol. 246, no. 4928, pp. 385-8, 1989.

[166] A. Nambu, H. Tokuno, I. Hamada, H. Kita, M. Imanishi, T. Akazawa, Y. Ikeuchi, and N. Hasegawa, "Excitatory cortical inputs to pallidal neurons via the subthalamic nucleus in the monkey," J Neurophysiol, vol. 84, no. 1, pp. 289-300, 2000.

[167] A. Parent, Y. Smith, M. Filion, and J. Dumas, "Distinct afferents to internal and external pallidal segments in the squirrel monkey," Neurosci Lett, vol. 96, no. 2, pp. 140-4, 1989.

[168] F. Sato, P. Lavallee, M. Levesque, and A. Parent, "Single-axon tracing study of neurons of the external segment of the globus pallidus in primate," J Comp Neurol, vol. 417, no. 1, pp. 17-31, 2000.

[169] L. N. Hazrati and A. Parent, "Projection from the external pallidum to the reticular thalamic nucleus in the squirrel monkey," Brain Res, vol. 550, no. 1, pp. 142-6, 1991.

[170] J. A. Gandia, S. De Las Heras, M. Garcia, and J. M. Gimenez-Amaya, "Afferent projections to the reticular thalamic nucleus from the globus pallidus and the substantia nigra in the rat," Brain Res Bull, vol. 32, no. 4, pp. 351-8, 1993.

[171] J. C. Levesque and A. Parent, "Gabaergic interneurons in human subthalamic nucleus," Mov Disord, vol. 20, no. 5, pp. 574-84, 2005.

[172] A. Charara and A. Parent, "Brainstem dopaminergic, cholinergic and serotoninergic afferents to the pallidum in the squirrel monkey," Brain Res, vol. 640, no. 1-2, pp. 155-70, 1994.

[173] F. W. Zhou, Y. Jin, S. G. Matta, M. Xu, and F. M. Zhou, "An ultra-short dopamine pathway regulates basal ganglia output," J Neurosci, vol. 29, no. 33, pp. 10424-35, 2009.

[174] M. Parent, M. Levesque, and A. Parent, "Two types of projection neurons in the internal pallidum of primates: single-axon tracing and three-dimensional reconstruction," J Comp Neurol, vol. 439, no. 2, pp. 162-75, 2001.

[175] M. Sidibe, J. F. Pare, and Y. Smith, "Nigral and pallidal inputs to functionally segregated thalamostriatal neurons in the centromedian/parafascicular intralaminar nuclear complex in monkey," J Comp Neurol, vol. 447, no. 3, pp. 286-99, 2002.

[176] L. N. Hazrati and A. Parent, "Contralateral pallidothalamic and pallidotegmental projections in primates: an anterograde and retrograde labeling study," Brain Res, vol. 567, no. 2, pp. 212-23, 1991.

[177] M. Parent and A. Parent, "Single-axon tracing study of corticostriatal projections arising from primary motor cortex in primates," J Comp Neurol, vol. 496, no. 2, pp. 202-13, 2006.

[178] W. Matsuda, T. Furuta, K. C. Nakamura, H. Hioki, F. Fujiyama, R. Arai, and T. Kaneko, "Single nigrostriatal dopaminergic neurons form widely spread and highly dense axonal arborizations in the neostriatum," J Neurosci, vol. 29, no. 2, pp. 444-53, 2009.

[179] L. F. Langer and A. M. Graybiel, "Distinct nigrostriatal projection systems innervate striosomes and matrix in the primate striatum," Brain Res, vol. 498, no. 2, pp. 344-50, 1989.

[180] I. Brysch, W. Brysch, O. Creutzfeldt, N. L. Hayes, and K. H. Schlingensiepen, "The second, intralaminar thalamo-cortical projection system," Anat Embryol (Berl), vol. 169, no. 2, pp. 111-8, 1984.

[181] M. Herkenham, "Laminar organization of thalamic projections to the rat neocortex," Science, vol. 207, no. 4430, pp. 532-5, 1980.

[182] M. Parent and A. Parent, "Single-axon tracing and three-dimensional reconstruction of centre median-parafascicular thalamic neurons in primates," J Comp Neurol, vol. 481, no. 1, pp. 127-44, 2005.

[183] J. Hanbery and H. Jasper, "Independence of diffuse thalamo-cortical projection system shown by specific nuclear destructions," J Neurophysiol, vol. 16, no. 3, pp. 252-71, 1953.

[184] J. Hanbery and H. Jasper, "The non-specific thalamo-cortical projection system," J Neurosurg, vol. 11, no. 1, pp. 24-5, 1954.

[185] M. Verzeano, D. B. Lindsley, and H. W. Magoun, "Nature of recruiting response," J Neurophysiol, vol. 16, no. 2, pp. 183-95, 1953.

[186] S. Kakei, J. Na, and Y. Shinoda, "Thalamic terminal morphology and distribution of single corticothalamic axons originating from layers 5 and 6 of the cat motor cortex," J Comp Neurol, vol. 437, no. 2, pp. 170-85, 2001.

[187] E. M. Rouiller and C. Durif, "The dual pattern of corticothalamic projection of the primary auditory cortex in macaque monkey," Neurosci Lett, vol. 358, no. 1, pp. 49-52, 2004.

[188] M. Levesque, S. Gagnon, A. Parent, and Deschenes, "Axonal arborizations of corticostriatal and corticothalamic fibers arising from the second somatosensory area in the rat," Cereb Cortex, vol. 6, no. 6, pp. 759-70, 1996.

[189] Z. Molnar and A. F. Cheung, "Towards the classification of subpopulations of layer v pyramidal projection neurons," Neurosci Res, vol. 55, no. 2, pp. 105-15, 2006.

[190] M. Morishima and Y. Kawaguchi, "Recurrent connection patterns of corticostriatal pyramidal cells in frontal cortex," J Neurosci, vol. 26, no. 16, pp. 4394-405, 2006.

[191] F. Grenier, I. Timofeev, and M. Steriade, "Leading role of thalamic over cortical neurons during postinhibitory rebound excitation," Proc Natl Acad Sci USA, vol. 95, no. 23, pp. 13929-34, 1998.

[192] S. W. Bottjer, "Timing and prediction the code from basal ganglia to thalamus," Neuron, vol. 46, no. 1, pp. 4-7, 2005.

[193] P. Apicella, "Leading tonically active neurons of the striatum from reward detection to context recognition," Trends Neurosci, vol. 30, no. 6, pp. 299-306, 2007.

[194] R. L. Lieber, Skeletal muscle structure, function, and plasticity. Philadelphia: Lippincott Williams and Wilkins, second ed., 2002.

[195] B. B. Stanfield, "The development of the corticospinal projection," Prog Neurobiol, vol. 38, no. 2, pp. 169-202, 1992.

[196] R. E. Foster, J. P. Donoghue, and F. F. Ebner, "Laminar organization of efferent cells in the parietal cortex of the virginia opossum," Exp Brain Res, vol. 43, no. 3-4, pp. 330-6, 1981.

[197] S. Ghosh and R. Porter, "Morphology of pyramidal neurones in monkey motor cortex and the synaptic actions of their intracortical axon collaterals," J Physiol, vol. 400, pp. 593-615, 1988.

[198] H. Braak and E. Braak, "The pyramidal cells of betz within the cingulate and precentral gigantopyramidal field in the human brain. a golgi and pigmentarchitectonic study," Cell Tissue Res, vol. 172, no. 1, pp. 103-19, 1976.

[199] R. N. Lemon and J. Griffiths, "Comparing the function of the corticospinal system in different species: organizational differences for motor specialization?," Muscle Nerve, vol. 32, no. 3, pp. 261-79, 2005.

[200] T. Kaneko, R. Cho, Y. Li, S. Nomura, and N. Mizuno, "Predominant information transfer from layer iii pyramidal neurons to corticospinal neurons," J Comp Neurol, vol. 423, no. 1, pp. 52-65, 2000.

[201] A. M. Thomson and J. Deuchars, "Synaptic interactions in neocortical local circuits: dual intracellular recordings in vitro," Cereb Cortex, vol. 7, no. 6, pp. 510-22, 1997.

[202] K. Satoh and H. C. Fibiger, "Distribution of central cholinergic neurons in the baboon (papio papio). i. general morphology," Journal of Comparative Neurology, vol. 236, no. 2, pp. 197-214, 1985.

[203] J. M. Conner, A. Culberson, C. Packowski, A. A. Chiba, and M. H. Tuszynski, "Lesions of the basal forebrain cholinergic system impair task acquisition and abolish cortical plasticity associated with motor skill learning," Neuron, vol. 38, no. 5, pp. 819-29, 2003.

[204] P. Fuller, D. Sherman, N. P. Pedersen, C. B. Saper, and J. Lu, "Reassessment of the structural basis of the ascending arousal system," J Comp Neurol, vol. 519, no. 5, pp. 933-56, 2011.

[205] V. Bigl, N. J. Woolf, and L. L. Butcher, "Cholinergic projections from the basal forebrain to frontal, parietal, temporal, occipital, and cingulate cortices: a combined fluorescent tracer and acetylcholinesterase analysis," Brain Research Bulletin, vol. 8, no. 6, pp. 727-49, 1982.

[206] H. Bravo and H. J. Karten, "Pyramidal neurons of the rat cerebral cortex, immunoreactive to nicotinic acetylcholine receptors, project mainly to subcortical targets," Journal of Comparative Neurology, vol. 320, no. 1, pp. 62-8, 1992.

[207] N. Ramnani, "The primate cortico-cerebellar system: anatomy and function," Nat Rev Neurosci, vol. 7, no. 7, pp. 511-22, 2006.

[208] U. Wolf, M. J. Rapoport, and T. A. Schweizer, "Evaluating the affective component of the cerebellar cognitive affective syndrome," J Neuropsychiatry Clin Neurosci, vol. 21, no. 3, pp. 245-53, 2009.

[209] S. B. Eickhoff, A. Schleicher, F. Scheperjans, N. Palomero-Gallagher, and K. Zilles, "Analysis of neurotransmitter receptor distribution patterns in the cerebral cortex," Neuroimage, vol. 34, no. 4, pp. 1317-30, 2007.

[210] M. Herkenham, "The afferent and efferent connections of the ventromedial thalamic nucleus in the rat," J Comp Neurol, vol. 183, no. 3, pp. 487-517, 1979.

[211] B. D. Mitchell and L. J. Cauller, "Corticocortical and thalamocortical projections to layer i of the frontal neocortex in rats," Brain Res, vol. 921, no. 1-2, pp. 68-77, 2001.

[212] G. W. Arbuthnott, N. K. MacLeod, D. J. Maxwell, and A. K. Wright, "Distribution and synaptic contacts of the cortical terminals arising from neurons in the rat ventromedial thalamic nucleus," Neuroscience, vol. 38, no. 1, pp. 47-60, 1990.

[213] K. Nakano, A. Tokushige, M. Kohno, Y. Hasegawa, T. Kayahara, and K. Sasaki, "An autoradiographic study of cortical projections from motor thalamic nuclei in the macaque monkey," Neuroscience Research, vol. 13, no. 2, pp. 119-37, 1992.

[214] C. Francois, D. Tande, J. Yelnik, and E. C. Hirsch, "Distribution and morphology of nigral axons projecting to the thalamus in primates," J Comp Neurol, vol. 447, no. 3, pp. 249-60, 2002.

[215] M. Steriade, D. Pare, A. Parent, and Y. Smith, "Projections of cholinergic and non-cholinergic neurons of the brainstem core to relay and associational thalamic nuclei in the cat and macaque monkey," Neuroscience, vol. 25, no. 1, pp. 47-67, 1988.

[216] E. G. Jones, "Viewpoint: the core and matrix of thalamic organization," Neuroscience, vol. 85, no. 2, pp. 331-45, 1998.

[217] P. Brodal and J. G. Bjaalie, "Organization of the pontine nuclei," Neurosci Res, vol. 13, no. 2, pp. 83-118, 1992.

[218] M. Glickstein, r. May, J. G., and B. E. Mercier, "Corticopontine projection in the macaque: the distribution of labelled cortical cells after large injections of horseradish peroxidase in the pontine nuclei," J Comp Neurol, vol. 235, no. 3, pp. 343-59, 1985.

[219] P. Brodal, "The corticopontine projection in the rhesus monkey. origin and principles of organization," Brain, vol. 101, no. 2, pp. 251-83, 1978.

[220] G. R. Leichnetz, D. J. Smith, and R. F. Spencer, "Cortical projections to the paramedian tegmental and basilar pons in the monkey," J Comp Neurol, vol. 228, no. 3, pp. 388-408, 1984.

[221] J. D. Schmahmann and D. N. Pandya, "Prefrontal cortex projections to the basilar pons in rhesus monkey: implications for the cerebellar contribution to higher function," Neurosci Lett, vol. 199, no. 3, pp. 175-8, 1995.

[222] R. M. Kelly and P. L. Strick, "Cerebellar loops with motor cortex and prefrontal cortex of a nonhuman primate," J Neurosci, vol. 23, no. 23, pp. 8432-44, 2003.

[223] J. Voogd, "The human cerebellum," J Chem Neuroanat, vol. 26, no. 4, pp. 243-52, 2003.

[224] S. LeVay and H. Sherk, "The visual claustrum of the cat. I. Structure and connections," J Neurosci, vol. 1, no. 9, pp. 956-80, 1981.

[225] F. C. Crick and C. Koch, "What is the function of the claustrum?," Philos Trans R Soc Lond B Biol Sci, vol. 360, no. 1458, pp. 1271-9, 2005.

[226] L. R. Edelstein and F. J. Denaro, "The claustrum: a historical review of its anatomy, physiology, cytochemistry and functional significance," Cell Mol Biol (Noisy-le-grand), vol. 50, no. 6, pp. 675-702, 2004.

[227] J. Tanne-Gariepy, D. Boussaoud, and E. M. Rouiller, "Projections of the claustrum to the primary motor, premotor, and prefrontal cortices in the macaque monkey," J Comp Neurol, vol. 454, no. 2, pp. 140-57, 2002.

[228] Z. Molnar, C. Metin, A. Stoykova, V. Tarabykin, D. J. Price, F. Francis, G. Meyer, C. Dehay, and H. Kennedy, "Comparative aspects of cerebral cortical development," Eur J Neurosci, vol. 23, no. 4, pp. 921-34, 2006.

[229] S. LeVay, "Synaptic organization of claustral and geniculate afferents to the visual cortex of the cat," J Neurosci, vol. 6, no. 12, pp. 3564-75, 1986.

[230] R. C. Pearson, P. Brodal, K. C. Gatter, and T. P. Powell, "The organization of the connections between the cortex and the claustrum in the monkey," Brain Res, vol. 234, no. 2, pp. 435-41, 1982.

[231] L. C. Katz, "Local circuitry of identified projection neurons in cat visual cortex brain slices," J Neurosci, vol. 7, no. 4, pp. 1223-49, 1987.

Anatomical Structures Simulated by the Architecture

To simulate the cognitive information processing occurring in a brain within a software architecture, one must recognize that the cognitive information processing occurring in any brain is the result of the functions performed by existing structures in the brain and the neuroanatomical connectivity between those structures. The architecture of a brain can be described at multiple hierarchical levels in addition to being simulated at multiple hierarchical levels or combinations thereof.

Simulated intelligence described herein requires that computational structures and computational circuits in the functioning computer brain are correlated to neuroanatomical structures and neuroanatomical circuits in functioning biological brains. In order to create simulated intelligence one must simulate the information processing functions of the neuroanatomical structures in the brain. Therefore, to create simulated intelligence, one must write software that simulates the neuroanatomical function of the structures. In so doing, one is creating a system comprised of modules representing neuroanatomical structures that provide neuroanatomically functional interpretations of the brain that is being simulated.

In a brain, the operational function at any moment in time is dependent on the experiential history of the brain. The experiential history includes the continuous development of the structures and circuitry along with the brains exposure to sensory input to those structures including feedback from behavioral output. Simulated intelligence simulates the operational function of a brain in a computer.

An important distinction is the difference between simulated intelligence and artificial intelligence (AI). The difference between simulated intelligence and AI is ultimately in the means of 'how' information is processed, not in the end 'what' information is processed. Simulated intelligence and AI are both approaches to solving information processing problems. While AI allows for an infinite number of possible implementations to solve those problems, simulated intelligence requires a single implementation, namely that the computer operationally functions in the most highly correlated way as a brain, by implementing software modules performing functions that correlate to the 6 circuits described.

Simulated intelligence requires that the operational function of a computer correlate to the function of neuroanatomical structures and neuroanatomical circuits. Persons of ordinary skill in the art will know that there is currently an increasing knowledge about brains, their structures, and their circuits. NABS, disclosed herein, provides a framework within which additional neuroscience knowledge is optionally integrated as it is known so that a skilled artisan applying NABS optionally integrates that improved neuroscience knowledge to improve the correlation between the computer's operational function and the brains operational function. In so doing, the disclosure of NABS provided herein enables one skilled in the art to build simulated intelligence to the maximal extent that is capable at any time. Over time, neuroscience knowledge will improve, and in light of the disclosure provided herein those of skill in the art will be able to improve the simulated intelligence performance of a NABS system as a result.

A functioning brain requires a sufficiently accurate neuroanatomical architecture containing multiple topographically organized implementations of approximately 6 neuroanatomical circuits. A sufficiently accurate neuroanatomical architecture is achieved when each circuit performs information processing operations that correlate to the information processing occurring in the same neuroanatomical structures in the vertebrate and mammalian brain. In order to construct a sufficiently accurate neuroanatomical architecture, one must understand the developmental organization of a brain and implement that developmental organization in a computer. Due to the comparative complexities in describing the homologous relationship between mammalian neuroanatomical structures and other vertebrate neuroanatomical structures, we maintain consistency with mammalian neuroanatomical descriptions. However, in light of the disclosure provided herein, persons of skill in the art should recognize the correlations to vertebrate neuroanatomical systems at the appropriate hierarchical level for implementation.

A brain begins with a developmental architecture that determines the evolution of the structures and circuitry and thereby the function of the brain over time. In some embodiments, the change in architecture over time is dependent on some states within the brain itself. Similarly, simulated intelligence utilizes computer software to design a developmental hierarchical architecture. In some embodiments, object oriented programming is used to specify the structures and circuitry of the computer brain. In further embodiments, the object oriented structures have properties that reflect the states of the neuroanatomy and developmental time period as well as functions that dictate how those structures and circuits should operationally function as a result of input to the structure.

A circuit in a brain is defined by a set of neuroanatomical connections between neuroanatomical structures. In order to form circuits in a brain, the set of neuroanatomical structures must be defined and the connections between those structures must be defined. Neuroanatomical structures are optionally defined at multiple hierarchical levels. In some embodiments, at a fundamental level, three primary structures: prosencephalon, mesencephalon, and rhombencephalon are optionally defined that represent an entire brain. In further embodiments, the 6 primary circuits defining NABS and enabling simulated intelligence exist as a result of the interconnectivity between the substructures within the three primary structures. In some embodiments, the implementation of a NABS system requires that the function of the 6 circuits are implemented in a computer and that their function can be correlated to the function of the underlying neuroanatomical structures in the vertebrate brain that is being simulated.

The NABS inventions described herein enable the replication of the function of current neuroanatomy knowledge and are designed to enable the inclusion of additional information as it is known. As further details are learned about the neuroanatomical circuits and their connections, those details are optionally integrated into future NABS systems. Therefore, we entirely expect the capability of NABS software to increase as further neuroanatomy and neuroscience knowledge is gained. Importantly, the disclosure provided herein creates a framework for persons skilled in the art to implement the function of the neuroanatomy that has been elucidated to date.

In order to sufficiently enable one skilled in the art to both implement the function of the 6 circuits at an abstracted level and to ensure that the function of those 6 circuits correlates with neuroanatomical structures, the neuroanatomical hierarchy underlying the three primary structures, prosencephalon, mesencephalon and rhombencephalon, must be detailed.

As shown in FIG. 1, a particular computer implementation of a brain 100 is composed of the developmental structures prosencephalon 103, mesencephalon 106, and rhombencephalon 109. In some embodiments, a spinal cord is also included. In further embodiments, the three developmental structures contain all the rules regulating the generation of new substructures and their functions, the projection and connectivity rules between structures, the learning rules set to modify connections, the learning rules set to modify structures and their functions, and the timing of development of any structure or connection.

In some embodiments, the function of the prosencephalon, mesencephalon, or rhombencephalon is implicitly specified by specifying the organization and function of the substructures and connections deriving from the prosencephalon, mesencephalon, and rhombencephalon. In some computer embodiments, structures are implemented at a chosen hierarchical level and FIG. 1 shows examples of the developmental structures that are comprised of other structures. For the implementation of the instantiation of any structure, a hierarchical level of implementation must be chosen. Implicit in the choice of hierarchical level is the fact that a structure and its function can be specified fully by an earlier developmental structure at a higher level, or a structure can be implemented in more detail at a lower level. In this regard, the structure can be said to be simulating the function of the neuroanatomical structure in a biological brain because the structure and its function can be correlated to the neuroanatomy and function in a biological brain.

Continuing to refer to FIG. 1, in some embodiments, the prosencephalon 103 may be implicitly specified by specifying the developmental function of a telencephalon 112 and a diencephalon 115. While these structures are still developmental in nature they continue to differentiate functional structures within the system and inform current and future function of the cognitive system. In an embodiment where structures and their connectivity are specified at a lower hierarchical level it is implicit that those structures, their function and their connectivity originated in a higher hierarchical level or developmental structure and therefore could have been specified appropriately as such. In further embodiments, the telencephalon 112 is implicitly specified by specifying a pallium 118 and subpallium 121. In other embodiments, the diencephalon 115 is implicitly implemented as a combination or part thereof of a thalamus 124, hypothalamus 141 or STN. In some embodiments, the thalamus is implicitly specified by a system comprising the developmental structures Ts 127, Ti 131, TL1 134, and TRN 137 that are discussed in the anatomical section.

Continuing to refer to FIG. 1, in further embodiments, the mesencephalon is implicitly specified by a system comprising the developmental structures Dop 148 and Colliculi 151. The structure Dop 148 refers to the development structure that will produce substructures and circuits that deliver reward based reinforcement signals, also called dopamine, to other structures in the brain. In some embodiments, the Dop structure comprises the SNc 149 and VTA 150. In further embodiments, the Dop 148 is a structure dedicated for delivering reward based reinforcement signals to the telencephalon 112. In further embodiments, the SNc 149 is a structure with the function of delivering reinforcement signals to the subpallium 121. In further embodiments, the VTA is a structure with the function of delivering reinforcements signals to the pallium 118. In further embodiments, other substructures within Dop have the function of delivering reinforcement signals to other structures in the brain.

Continuing to refer to FIG. 1, in some embodiments, the colliculi 151 refers to the developmental structure that will produce substructures and circuits that are related to peripheral sensory information existing within a spatial context. In some embodiments, the colliculi 151 comprises the substructures inferior colliculus 154 and superior colliculus 157. In further embodiments, the superior colliculus 157 is a structure with some function for directing the spatial attention of a brains vision system. In further embodiments, the inferior colliculus 154 is a structure with some function for directing the spatial attention of a brain's auditory system. In further embodiments, the colliculi 151 comprise additional structures to dedicate spatial attention to other sensors in the brain with a spatial context. In some embodiments of a computer brain, these sensors may not exist in a biological brain.

Continuing to refer to FIG. 1, in some embodiments, the rhombencephalon is implicitly specified by a system comprising the developmental structures metencephalon 161 and myelencephalon 164. In further embodiments, the metencephalon 161 is implicitly specified by a system comprising the developmental structures pons 167, dcn 174, and cerebellum 171. In some embodiments, the metencephalon has the function of developing a dynamical model to integrate actions and deliver control sequences to other structures for the smooth control of target structures and their corresponding dynamical models. In further embodiments, the metencephalon 109 comprises additional substructures not shown.

Continuing to refer to FIG. 1, in some embodiments, the myelencephalon 164 functions to deliver control signals to actuators. In further embodiments, the myelencephalon 164 comprises a medulla oblongata and a substructure that comprises the spinal cord that delivers control signals to actuators whose states contracts or relaxes.

Figure 2:
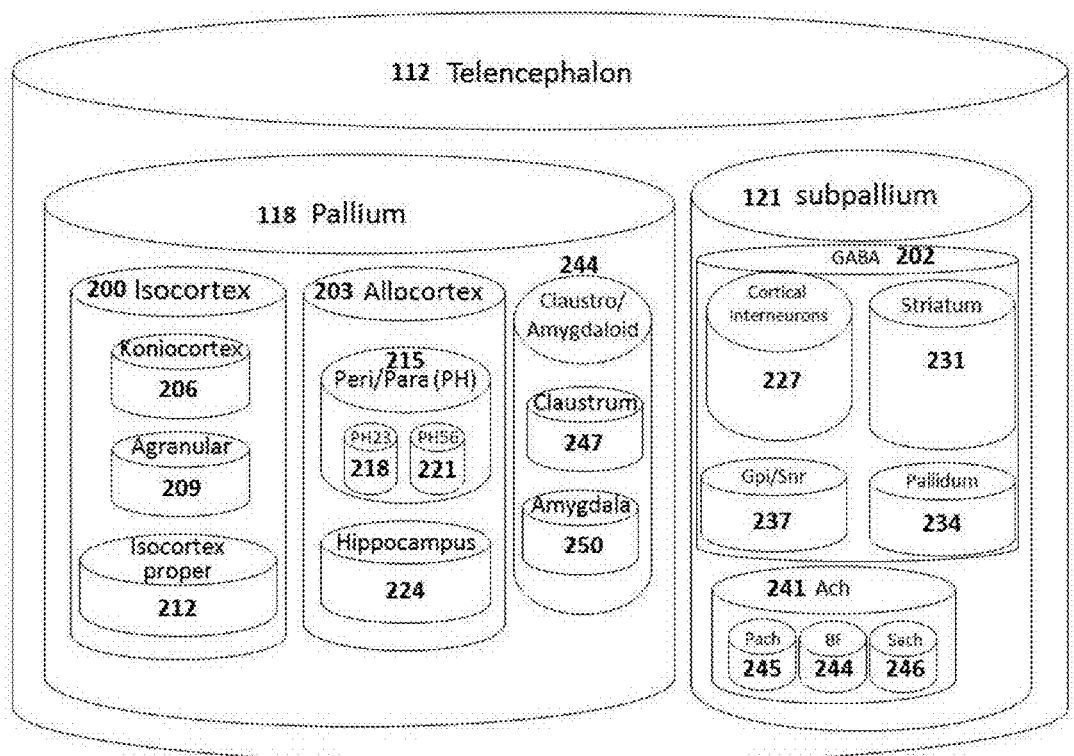
FIG. 2 shows a non-limiting example of a computer implementation of a telencephalon 112; in this case, a telencephalon 112 comprising the developmental structures pallium 118 and subpallium 121 and substructures within them.

Referring to FIG. 2, in some embodiments, the pallium 118 is implicitly specified by a system comprising the developmental structures isocortex 200, allocortex 203, and claustro/amygdaloid complex 244.

Continuing to refer to FIG. 2, in further embodiments, the claustro/amygdaloid complex is implicitly specified by a system comprising the developmental structures claustrum 247 and 250. In some embodiments, the function of the claustrum 247 is to regulate the flow of information in the isocortex 200. In further embodiments, the function of the amygdale is to create a dynamical model of consequence generating states and deliver learning signals to other structures in a timely manner based on the recognition of those consequence states.

Continuing to refer to FIG. 2, in some embodiments, the allocortex 203 is implicitly specified by a system comprising the developmental structures perirhinal/perihippocampal cortex 215 and the hippocampus 224. In some embodiments, the perirhinal/perihippocampal cortex 215 is implicitly specified by a system comprising the developmental structures PH23 218 and PH56 221. In some embodiments, the function of the allocortex is to store associations between perceptual states and perceptual state sequences in order to recall target perceptual states given source perceptual states with which they have been associated. In some embodiments, the function of the allocortex is to implement short-term memory as shown in FIG. 8 803. In further embodiments, the allocortex 203 functions to reactivate perceptual states in the isocortex 200 for the consolidation of associations into direct associations between perceptual states in different isocortex 200 regions.

Continuing to refer to FIG. 2, in some embodiments, the isocortex 200 is implicitly divided into the three types: koniocortex 206, agranular 209, and isocortex proper 212. In some embodiments, the isocortex proper structure 212 lies along a structural gradient between 206 and 209 depending on its position in the NABS hierarchy. In some embodiments, the function of the koniocortex 206 is to function as the sensory input isocortex 200 structure. In some embodiments, the function of the agranular isocortex 209 is to function as the action output isocortex 200 structure. In some embodiments, the function of the isocortex 200 is to form representations of perceptual states and perceptual actions as shown in FIG. 8 806. In further embodiments, the function of the isocortex 200 is to form a circuit wherein the processing of perceptual states and perceptual actions can take place. In further embodiments, the function of the isocortex 200 is to form a flexible circuit to select and learn all variants of mappings between perceptual states and perception actions.

Continuing to refer to FIG. 2, in some embodiments, the subpallium 121 is implicitly specified by a system comprising the developmental structures GABA 202 and Ach 241. In some embodiments, the GABA 202 structure performs the developmental function of generating structures and their connectivity that utilize synapses that are inhibitory in nature for information processing. In further embodiments, the GABA structure is implicitly specified by a system comprising the developmental structures cortical interneurons 227, striatum 231, pallidum 234, and Gpi/Snr 237. In further embodiments, the Ach 241 performs the developmental function of generating developmental structures that utilize synapses that use acetylcholine for the purpose of activating and reinforcing target structures. In further embodiments, the Ach 241 structure is implicitly specified by a system comprising the developmental structures Pach 245, BF 244, and Sach 246. In further embodiments, the function of the Pach structure 245 is to deliver functional interpretations of acetylcholine to the diencephalon 115 and isocortex 200. In further embodiments, the function of the BF 244 is to deliver acetylcholine to the isocortex 200 for the purpose of reinforcing the mapping between perception states and perception actions.

Referring to FIG. 1, in some embodiments, structures 124, 127, 131, 134, 137, 144, 149, 167, 171, and 174 have an organization and function described in the neuroanatomy section.

Referring to FIG. 2, in some embodiments, structures 200, 203, 247, 250, 227, 231, 237, 234, and 244 have an organization and function described in the neuroanatomy section.

Figure 3:
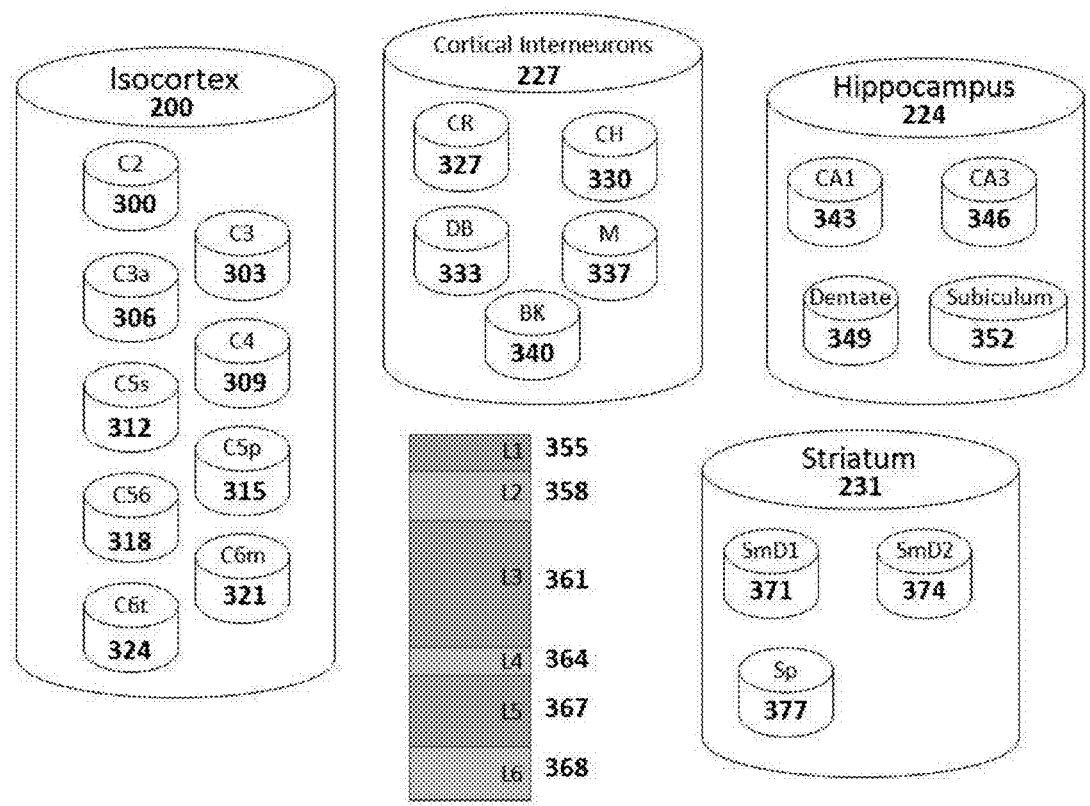
FIG. 3 shows a non-limiting example of a software architecture; in this case, a software architecture including substructures for the isocortex 200, cortical interneurons 227, hippocampus 224, and striatum 231.

Referring to FIG. 3, in some embodiments, the structures isocortex 200, cortical interneurons 227, hippocampus 224, striatum, and layers 355, 358, 361, 364, 367, and 368 have an organization and function described in the neuroanatomy section.

FIG. 4 exemplifies connectivity between low level structures and the functional circuits that they form. In this particular embodiment, the general organization of the isocortex 200, including the general plan of the six layers shown by 355, 358, 361, 364, 367, and 368, and the substructures within the isocortex 300, 303, 306, 309, 312, 315, 318, and 324. In further embodiments, the functions performed by structures and their connections can be described by 6 circuits. These circuits are shown by different style lines throughout the figure.

In one embodiment, depicted in FIG. 4, a circuit 400 describes the structures and connections that comprise circuits for the functions of perception state representation, selection, and working memory. In this embodiment, the function of a local instantiation of the circuit 400 is to form and store perceptions within the isocortex 200 and to develop subcircuits that are capable of being controlled to select perception states based on the state of other external circuits and structures.

In one embodiment, a circuit 400 depicted in FIG. 4 is shown as a functional element within a high level functional block diagram as 806 in FIG. 8.

In another embodiment, depicted FIG. 4, a circuit 403 describes the structures and connections that comprise circuits for the functions of long term memory and the storage of long term associations between perception states. In this embodiment, the function of a local instantiation of the circuit 403 is to form and store associations between perception states in one or more isocortex 200 regions and to deliver those contextually based associations in a hierarchical manner between associated perceptions. The formation of circuit 403 is dependent on the associations that are formed in the short-term memory association circuit 406.

In yet another embodiment, a circuit 403 depicted in FIG. 4 is shown as a functional element within a high level functional block diagram as 800 in FIG. 8.

In yet another embodiment, depicted FIG. 4, a circuit 406 describes the structures and connections that comprise circuits for the functions of the temporary storage of associations in short-term memory. In this embodiment, the function of a local instantiation of the circuit 406 is to form and store temporary associations between perception states in one or more isocortex 200 regions and to deliver those contextually based associations in a hierarchical manner between associated perceptions. In further embodiments, the structures 215 and 224 in circuit 406 receive reward or consequence based input from structures such as the amygdala, 250 in FIG. 2.

In one embodiment, a circuit 406 depicted in FIG. 4 is shown as a functional element within a high level functional block diagram as 803 in FIG. 8.

In one embodiment, depicted in FIG. 4, a circuit 409 describes the structures and connections that comprise circuits for the functions of the representation and storage of perception action sequences. In this embodiment, the function of a local instantiation of the circuit 409 is to form and store perception action sequences and to provide a mechanism for learning stop/start mechanisms for those sequences and subsequences contained therein. In further embodiments, the structures 231, 234, and 237 in circuit 409 receive reinforcement reward from structures such as the SNc, 250 in FIG. 2.

In one embodiment, a circuit 409 depicted in FIG. 4 is shown as a functional element within a high level functional block diagram as 818 in FIG. 8.

In another embodiment, depicted in FIG. 4, a circuit 412 describes the structures and connections that comprise circuits for the functions of the representation and storage of perception action outputs. In this embodiment, the function of a local instantiation of the circuit 412 is to form and store perception action outputs and to provide a mechanism for learning mappings between perception states and perception action outputs. In further embodiments, the structures 303 and 315 in circuit 412 receive reinforcement reward from structures such as the BF 244 in FIG. 2 and FIG. 4.

In one embodiment, a circuit 412 depicted in FIG. 4 is shown as a functional element within a high level functional block diagram as 815 in FIG. 8.

In another embodiment, depicted in FIG. 4, the circuit 415 describes the structures and connections that comprise circuits for the functions of the representation and storage of control signals. In this embodiment, the function of a local instantiation of the circuit 415 is to form and store coordinated control signals for the regulation of information processing in local instantiations of information processing structures 200.

Referring to FIG. 4, in one embodiment, the circuit 415 is shown as a functional element within a high level functional block diagram as 812 in FIG. 8.

In one embodiment, FIG. 8 shows the abstracted functions of a brain and their interconnections. In further embodiments, structures shown in FIG. 8 represent functional descriptions of neuroanatomical circuits described in the earlier anatomy section presented. In further embodiments, several of the elements in FIG. 8 correspond to anatomical circuits in FIG. 4 as discussed herein.

Figure 6:
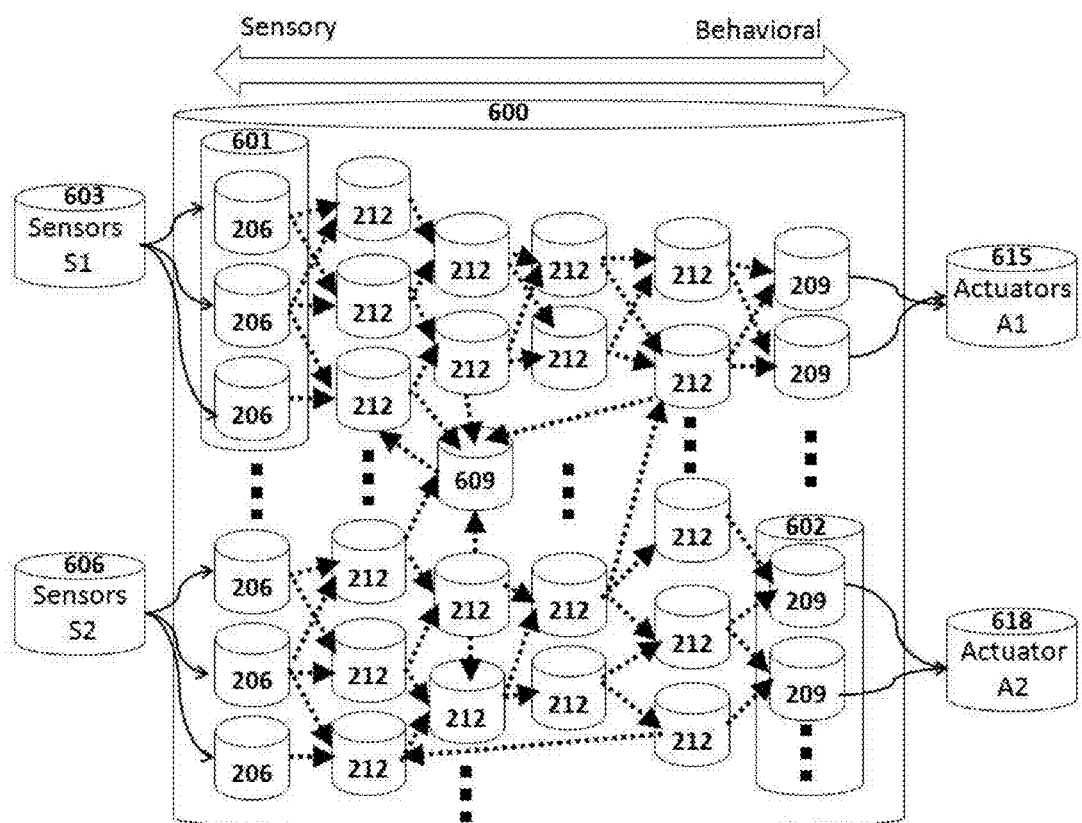
FIG. 6 shows a non-limiting example of an implementation of a NABS architecture; in this case, an architecture consisting of a higher level structure 600 composed of multiple regional and hierarchically organized lower level structures 212 with dedicated structures 206 dedicated to connecting to sensors and structures 209 dedicated to connecting to actuators.

Continuing to refer to FIG. 8, in some embodiments, the abstracted functional descriptions described in FIG. 8 can be implemented at a high level in order to perform simulated intelligence functions in NABS applications. In further embodiments, an abstracted structure 806 performs perception state representation. In further embodiments, the structure 806 is connected to sensors in order to develop state representations of sensor data. In further embodiments, the structure 806 is connected internally to develop state representations in a hierarchical manner. In a particular embodiment, FIG. 6 demonstrates such a hierarchical connectivity. Referring to FIG. 8, in further embodiments, structure 806 utilizes any number of mathematical techniques related to self-organization such as self-organizing maps, vector quantization, adaptive-subspace self-organizing maps, BCM theory, or other unsupervised feature detection techniques to create features in response to sensory data. In some embodiments, the structure 806 would be organized into substructures in a hierarchical manner as shown in FIG. 6.

Continuing to refer to FIG. 8, in some embodiments, the functional description of the short-term memory circuit is represented by an abstracted functional structure 803 in order to temporarily store associations between perception states. In further embodiments, 803 contain contextually based learning signals that specify the degree of association that should be created between active perception states in 806. In further embodiments, the reinforcement learning signals to 803 are generated in a structure 808 responsible for identifying states of consequence in the system. In some embodiments, states of consequence are used to determine the importance of associations for the purpose of achieving certain goals of the system like minimizing pain, avoiding threatening states to the systems survival. In further embodiments, 803 form associations between perception states based on probabilistic models of co-occurrence.

Continuing to refer to FIG. 8, in further embodiments, the functional description of the long-term memory circuit is represented by an abstracted functional structure 800 in order to store associations between perception states that are stored independently of associations stored in 803.

Continuing to refer to FIG. 8, in further embodiments, the brain undergoes sleep cycles wherein 803 re-activates perception states in 800 for the purpose of consolidating associations into long-term memory in 800. In further embodiments, structure 806 performs regulated perception state selection. The structure 806 is controlled via structure 812 to select perceptions based on context from short-term association memory structure 803 and a long-term memory structure 800.

Figure 7:
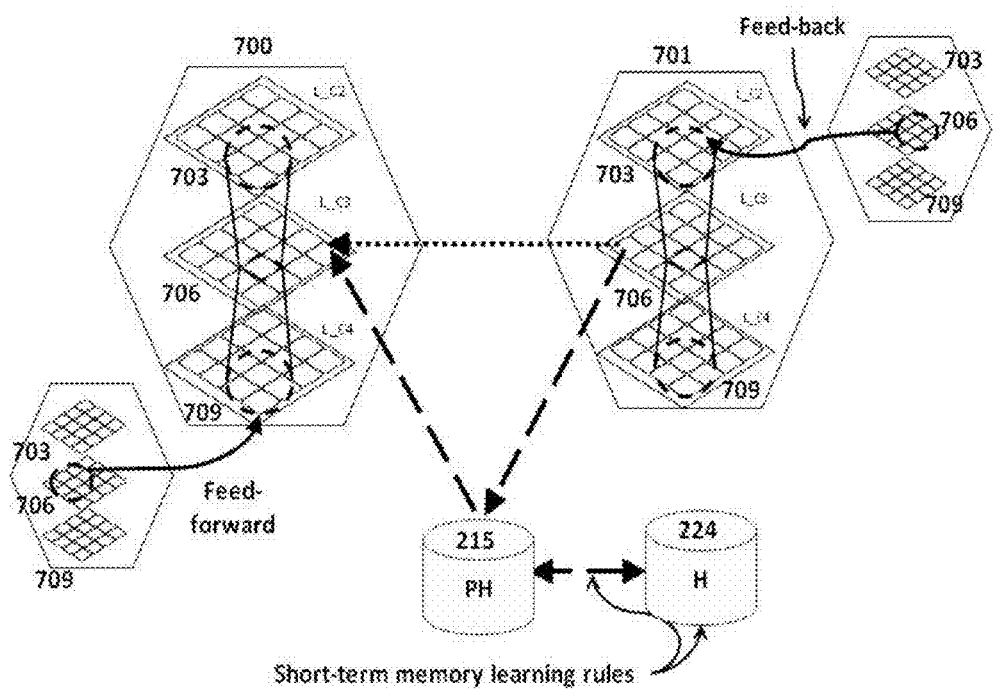
FIG. 7 shows a non-limiting example of an architecture to connect together processing structures 700 and 701 with a single direct connection type and a second indirect connection type through two additional structures 215 and 224.

Referring to FIG. 7, in some embodiments, the representation of perception states is stored in an isothalamocortical structure type represented by 700 and 701. In further embodiments, the isothalamocortical module is composed of three layers 703, 706, and 709. In further embodiments, spatiotemporal invariant states are self-organized in an unsupervised manner in 706 in response to inputs from 703 and 709. In further embodiments, perception states are active in 706 and are communicated to the short-term memory circuit implemented by structures 215 and 224. In further embodiments, the long-term memory circuit is represented by the interactions between two or more structures like 703. In further embodiments, perception states in 703 in 701 reactivate perception states in 703 in 700 through the short-term memory circuit 215 and 224. In further embodiments, associations are transferred from the short term memory circuit to the long-term memory circuit.

Referring to FIG. 8, in some embodiments, an abstracted function of action sequence representation and selection is represented by a structure 818. In further embodiments, the structure 803 communicates to 818 potential action sequences given the perceptual states. In further embodiments, 818 receives a learning signal from structure 821 that models dopamine reinforcement learning. In further embodiments, structure 818 learns action sequences. In further embodiments, structure 818 starts, stops, and generates learned action sequences.

Continuing to refer to FIG. 8, in some embodiments, an abstracted function of action output representation and selection is represented by a structure 815. In further embodiments, the action output 815 controls external actuators through a series of learned coordinated action output sequences. In further embodiments, a mapping between perception states in 806 and action outputs in 815 are learned through an acetylcholine reinforcement signal that is delivered from a structure 824. In further embodiments, the acetylcholine signal rewards the selection of action outputs that have contributed to the accomplishment of system goals.

Continuing to refer to FIG. 8, in some embodiments, an abstracted function of the control signals circuit is represented by a structure 812. In further embodiments, the control structure 812 provides control input to regulate the flow of information between perception states 806 and memory structures 800 and 803. In further embodiments, the control structure 812 utilizes action outputs to generate control to substructures in 806. In further embodiments, the control structure 812 contains learning reinforcement inputs to improve control sequences for the purpose of achieving system goals.

Hierarchical Configuration of Software Modules

Figure 9:
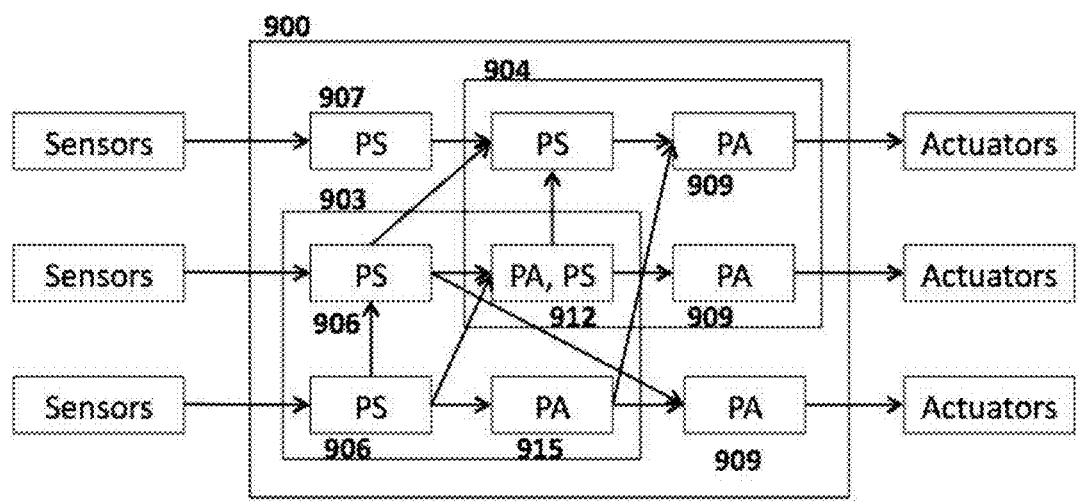
FIG. 9 shows a non-limiting example of an embodiment characterized by a circuit description containing a higher level structure 900 composed of two lower level structures 903 and 904; in this case, a higher level structure 900 containing connections to sensors and connections to actuators.

FIG. 9 exemplifies the importance of understanding the relative descriptions inherent to NABS hierarchical systems. When describing any element in a NABS hierarchical system the functional description must be relative to the exact structures or circuit being discussed. FIG. 9 shows a particular embodiment characterized by a circuit description containing a higher level structure 900 composed of two lower level structures 903 and 904. In further embodiments, the structure 903 is composed of substructures 906, 912, and 915. In further embodiments, the structure 904 is composed of substructures 907, 912, and 909. In the circuit of FIG. 9, the higher level structure 900 contains connections to sensors at the left and connections to actuators on the right. Certain structures in FIG. 9 are shown to be classified as perceptual states PS or perceptual actions PA relative to a structure in the hierarchy. The definition of a structure as representing perceptual states or perceptual actions depends here on the relative structure with which a structure is being described. Relative to structure 903, the substructures 906 are defined as perceptual states while the substructures 912 and 915 are defined as perceptual actions. Relative to structure 904, the structure 912 is defined as a perceptual action. Therefore the definition or description of 912 as a perceptual state or perceptual action is ambiguous unless it is described in reference to a structure or circuit. In reference to structure 900, the substructures 903 and 907 are defined as perceptual states while the structures 909 are defined as perceptual actions. In some embodiments, all structures are unambiguously identifiable.

We herein describe exemplary embodiments of a method of constructing a NABS hierarchical architecture. FIG. 1 shows one embodiment of a brain 100 containing a prosencephalon 103, mesencephalon 106 and rhombencephalon 109 and the set of substructures within them that comprise a primate brain. In FIG. 1, the prosencephalon is shown to comprise a telencephalon 112. A further embodiment is shown in FIG. 2 wherein the telencephalon 112 comprises the developmental structures pallium 118 and subpallium 121 and substructures within them. A further embodiment is shown in FIG. 3 wherein substructures are shown for the isocortex 200, cortical interneurons 227, hippocampus 224, and striatum 231.

Referring to FIG. 6, in some embodiments, a cerebral cortex 600 is represented by a plurality of isocortical structures in a hierarchical manner. In some embodiments, the connections between structures imply that structures are incorporated in layers. In FIG. 6, layers are not shown for clarity. In further embodiments, the isocortical structures are comprised of three types of structures 206, 212, and 209. In some embodiments, the hierarchy is directed from sensors to behaviors as shown in FIG. 6. In further embodiments, sensors are connected to a specific type of koniocortical structure 206. In further embodiments, if all of the sensors of a given type are connected to several koniocortical structures 206, those structures can be grouped as a larger primary sensory cortex structure 601.

Continuing to refer to FIG. 6, in further embodiments, isocortical proper structures of the same construction 212 are organized through a hierarchical and regional manner, such that the information a structure 212 processes is dependent on the inputs to that structure. In further embodiments, some isocortical structures 609 receive multi-modal sensory information and therefore represent and process a mixture of sensory and behavioral information. In some embodiments, structures 209 are connected to actuator structures 615 and 618 in order to deliver action output to the actuator structures. In further embodiments, structures 209 all target the same type of actuator to control those actuators in a coordinated manner those structures can be grouped into a primary output cortex 602. In some embodiments, 602 take the form of primary motor cortex to control physical actuators. In further embodiments, 602 takes the form of a general primary output cortex to control computer operations.

FIG. 6 demonstrates the principle of NABS that structures can be organized into both a regional and hierarchical manner. In some embodiments, once a structure is defined and the connections between structures of various types are defined, different instances of structures and connections can be used to construct a regional, topological, or hierarchical architecture. In some embodiments, the interpretation of hierarchical or regional position is entirely dependent on the connectivity of the structure.

Figure 5:
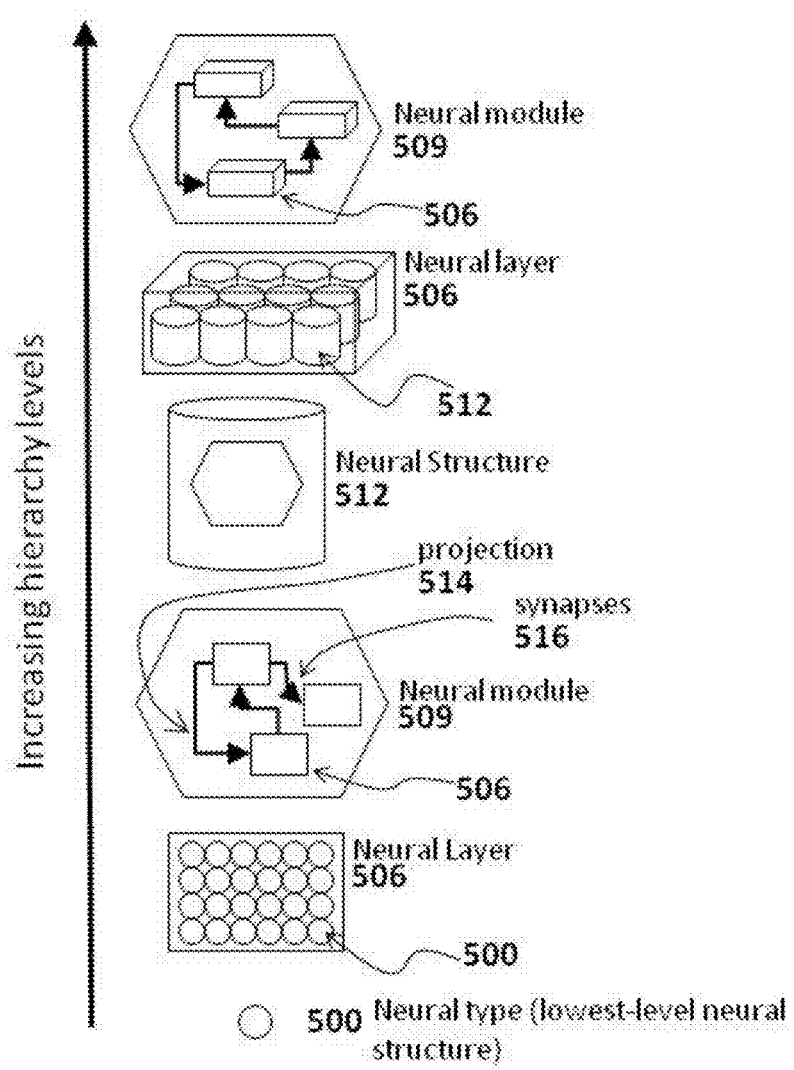
FIG. 5 shows a non-limiting example of an implementation of a NABS architecture; in this case, an architecture wherein a lowest level structure 500 is a neural type.

FIG. 5 shows a non-limiting example of a preferred embodiment of the hierarchical structure of a NABS architecture described herein. In this case, a hierarchical organization enables the definition of a top level structure that is the brain to specify further developmental structures that are used to construct the brain. These structures can then specify substructures, projections, and connections to establish functional circuit modules in a hierarchical manner. The construction of NABS in this manner enables a hierarchical specification of the architecture in which recursive algorithms are optionally utilized to instantiate the architecture followed by executing the software architecture to perform simulated intelligence.

Referring to FIG. 5, in the implementation of a NABS architecture, one or more lowest level structures must be defined that are not composed of substructures, layers or circuits. FIG. 5 demonstrates an embodiment wherein a lowest level structure 500 is called a neural type, which is the lowest level neural structure in the system. A neural type is a neural structure that has no substructures. A neural type has a functional definition in software that receives input from connections, alters the state of the neural type and produces output for transmission to other structures through connections. Neural types together with connections form the basis set of elements upon which higher level circuits and structures can be built. Although a neural type is not further decomposed in one NABS implementation, the neural type structure may perform functional interpretations that have been abstracted for computational efficiency, programming clarity or other reasons. In this instance, the neural type structure could be described in another NABS implementation by further substructures, and those substructure implementations potentially produce increased accuracy in performing simulated intelligence.

In order to connect structures in a NABS architecture in a topological manner, structures must hold a position in a topological space. In one embodiment, a purpose for a topological connectivity would be to connect the brain to the sensory world in a topological manner or connect structures internally in a topological manner to form an ordered hierarchy. In some embodiments, a layer is the term used to define an N-dimensional topological space. In one embodiment, a layer may refer to an N-dimensional Euclidean space where in the distance between structures in the space is well defined as a function of their position. In other embodiments, an N-dimensional space can be defined wherein each dimension represents a property of the structure. In such a topology, distances can be defined as a function of the similarity between structures or as a function of the difference between properties between the structures. In further embodiments, one skilled in the art could define multiple arbitrary N-dimensional topological spaces.

Referring to FIG. 5, in one embodiment of a NABS architecture described herein, structures of the same class are placed within a neural layer 506. At the lowest level in the hierarchy, a neural layer consists of a single class of neural type 500. Once structures are placed within a neural layer 506, each structure holds a defined position within the N-dimensional topological space. The trivial embodiment is every structure is placed solely within an independent layer. In one embodiment, a projection 514 is specified between two layer classes. The projection, as discussed, defines how to topologically connect structures within the layers. Additionally, a synapse 516 is specified that defines the functional transformation of information between two classes of structures. The combination of projections and synapses defines all connections between structures.

The utilization of projections enables NABS architectures to specify probabilistic connections between structures. Therefore the same definition of a NABS architecture can produce two different instantiations of that architecture, whose function will depend on the probabilistic connectivity. Hence, diversity in the application of the same NABS architecture is possible.

Continuing to refer to FIG. 5, a neural module 509 is defined by all connections between structures in neural layers that do not exit or enter the neural module 509. Once a neural module is defined, the module can be declared a structure 512 for placement in another neural layer. When a module is declared a structure, the module has a functional interpretation that is defined by the information transformation occurring in the structure. By declaring a module as a structure, module classes can be re-used throughout the architecture to perform their specified functional interpretation.

At the highest level, a brain is considered a structure that contains a neural module. The brain neural module will contain many substructures and modules that together define the functional interpretation of the brain. A subtle point is that the brain will have no connections to the external world. Therefore, in a NABS architecture, one additional higher level application structure must be created that contains the brain in addition to any external sensors and/or actuators, including connections between actuators/sensors to the brain, which the brain must communicate with. In so doing, the NABS architecture optionally runs and transfers information in and/or out of the brain as the brain performs simulated intelligence.

In a NABS system, the connections between structures are defined and must exist. Without connections between structures, information cannot be communicated between structures. In one embodiment, the connectivity between structures is defined directly and individually. However, in large systems defining connections individually between structures becomes unwieldy and difficult to define. In addition, principles of connectivity between structures of the same types cannot be implemented uniformly. In order to establish a method to implement principles of connectivity, a projection is introduced to identify the topology of connections between the elements in one layer and the elements in another layer.

In some embodiments, a projection is defined in a unidirectional manner between a source layer and a target layer. In further embodiments, a connection is defined in a unidirectional manner between a source structure and a target structure. Reciprocal projections are, in some embodiments, specified as two unidirectional projections between layers and reciprocal connections can be defined by specifying two unidirectional connections between two structures.

Figure 10:
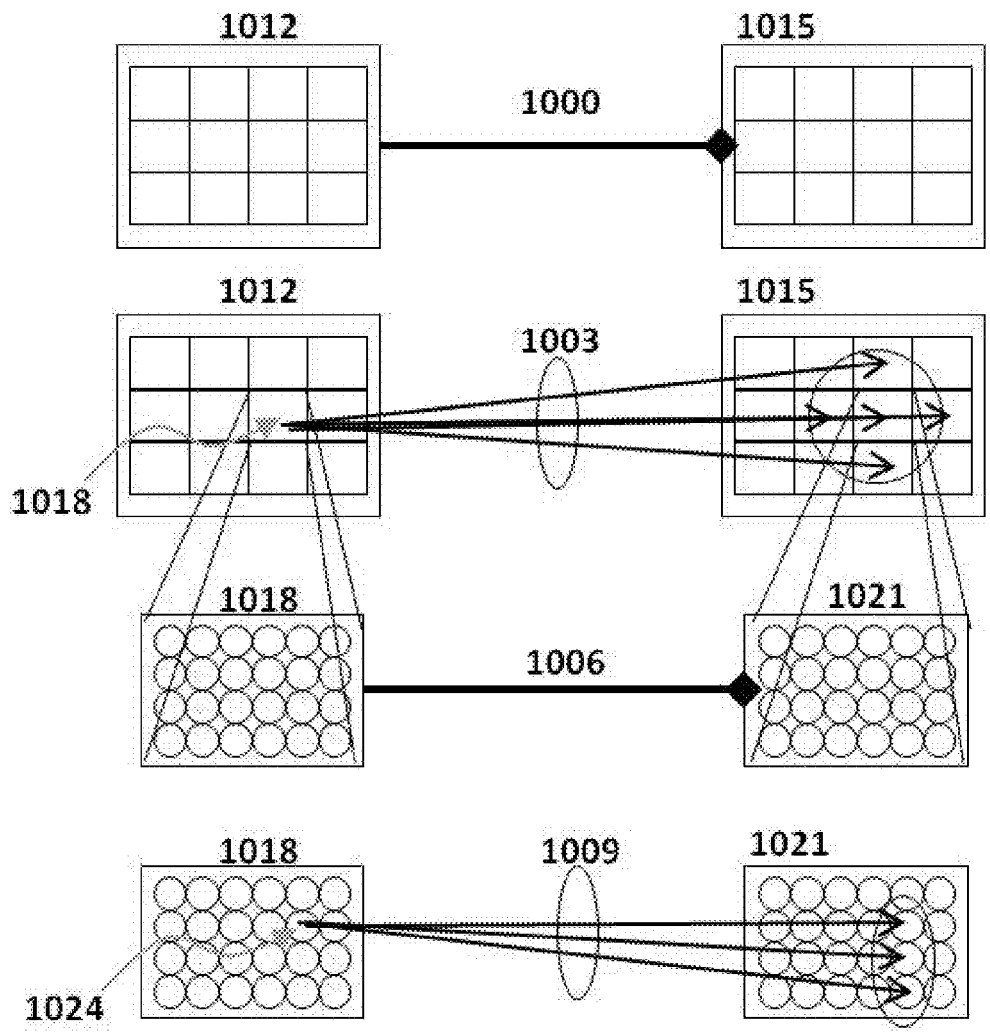
FIG. 10 shows a non-limiting example of an architecture utilizing projections to connect the elements between layers and the propagation of projections and connections through to sublayers; in this case, a projection 1000 between a source layer 1012 and a target layer 1015 is specified that defines the topology and connection types between subelements in the source layer 1012 and the target layer 1015.

FIG. 10 exemplifies the utilization of projections to connect the elements between layers and the propagation of projections and connections through to sublayers. The projection 1000 between a source layer 1012 and a target layer 1015 is specified that defines the topology and connection types between subelements in the source layer 1012 and the target layer 1015. In one embodiment shown in FIG. 10, the projection between 1012 and 1015 specifies a radial distance of connectivity between the two layers. The connections 1003 established by implementing the projection 1000 are shown connecting a single source subelement 1018 to target subelements in layer 1015. The target elements are clearly connected in this case in a radial topology. Further, in this case, since the subelement 1018 in layer 1012 consists of further subelements, a projection 1006 is specified that defines the topology and connection types between subelements in source layer 1018 and target layer 1021. In one embodiment as shown in FIG. 10, the projection 1006 has a directional topology. The connections 1009 established by implementing the projection 1006 are shown connecting a single source subelement 1024 to target subelements in layer 1021. The target elements are clearly connected in this case in a directional topology. The projection 1006 connects two neural layers, which are the lowest level layers, therefore no further projections can exist at lower levels.

In further embodiments, projections and connections are propagated down through the hierarchy. FIG. 10 shows an example of the propagation of projections and connections down through a hierarchical structure. To connect all neural types existing in layer 1012 to all neural types in 1015 in a complex manner requires only the definition of the topology of two layer objects and two projection rules to connect those pairs of layer objects. In light of the disclosure provided herein, one skilled in the art would see that the final connectivity between neural types cannot be specified easily without the hierarchy and the propagation of connectivity through the hierarchy.

The organization of structures, layers, and circuits enables NABS to form large numbers of connections in complex topologies in flexible ways based on only a limited set of projection rules. In a hierarchically defined NABS architecture, projections and connections are propagated down the hierarchy until the projection between two neural layers containing neural types is implemented and the connection between two neural types is implemented. In further embodiments, a projection may change over time and therefore the connections between neural types will change. In some embodiments, the change in a projection may be to the topology of the projection were the topology of connections between structures will change. In other embodiments, the type of connection will change and therefore the effect of the information communicated by the source structures onto target structures will change.

Many variations of topological projections and connections are optionally specified. One embodiment of a topological connectivity rule is full connectivity, wherein all the elements in one layer are connected to all the elements in another layer. Another embodiment of topological connectivity is sparse random connectivity wherein a probability is specified for whether a connection should be formed or not between two elements and elements are connected based on individual random trials based on the probability. In further embodiments, a radial connectivity is optionally specified wherein a connection is made between a source and target element if the target element is within some radius of the source element. In other embodiments, a radial connectivity is defined as a connection if the source element is within some radius of the target element. In further embodiments, a directional connectivity is specified wherein a direction is specified in the target layer and a source element will only connect to target elements in that direction.

In further embodiments, individual topological projection rules are optionally combined, such as in a sparse random directional projection wherein a directional gradient and a probability of connection are defined together. In further embodiments, a sparse random radial connectivity is optionally formed by combining sparse random connectivity with radial connectivity, wherein a random subset of target elements will be connected with some radius of the source element. In further embodiments, a increasing or decreasing sparse random connectivity is optionally specified wherein the probability of connectivity changes as a function of the distance from the target element in the radial direction. In light of the disclosure provided herein, one skilled in the art would be capable of constructing many additional topological connectivity rules.

Referring to FIG. 10, exemplary connections are shown between structures in the source layer 1018 and structures in the target layer 1021. In some embodiments, a projection defines the type of synapse used by all connections created by a projection. In further embodiments, a synapse comprises a weight. In further embodiments, the weight is stored as one or more numerical numbers. In further embodiments, the weight is stored as one or more properties that can be defined for usage in the effect of the synapse. In further embodiments, the synapse has modifiable weights. In some embodiments, the source structure is called the pre-synaptic structure and the target structure is called the post-synaptic structure.

In some embodiments, a synapse is defined to have a target effect on the target structure with which it is connected. In further embodiments, the target effect is defined within the global scope of all the target structure's synapses and the functional transformation of input to output by the target structure. In various embodiments, the target effect is, by way of non-limiting examples, additive, subtractive, multiplicative, and divisive to a function of the weights of other synapses. In some embodiments, the target effect is additive to a function of the weights of other synapses. In some embodiments, the target effect is subtractive to a function of the weights of other synapses. In some embodiments, the target effect is multiplicative to a function of the weights of other synapses. In some embodiments, the target effect is divisive to a function of the weights of other synapses. In further embodiments, the target effect is a regulatory function operating on a function of the weights of the other synapses. In still further embodiments, the target effect is a non-linear function operating on a function of the weights of other synapses.

In some embodiments, when a synapse contains a weight that is modifiable, the modification is determined by a defined learning rule dependent on the dynamical state of the pre-synaptic structure, the dynamical state of the post-synaptic structure and the current weight. In further embodiments, the learning rule can change over time.

Recursive Software Organization

Figure 11:
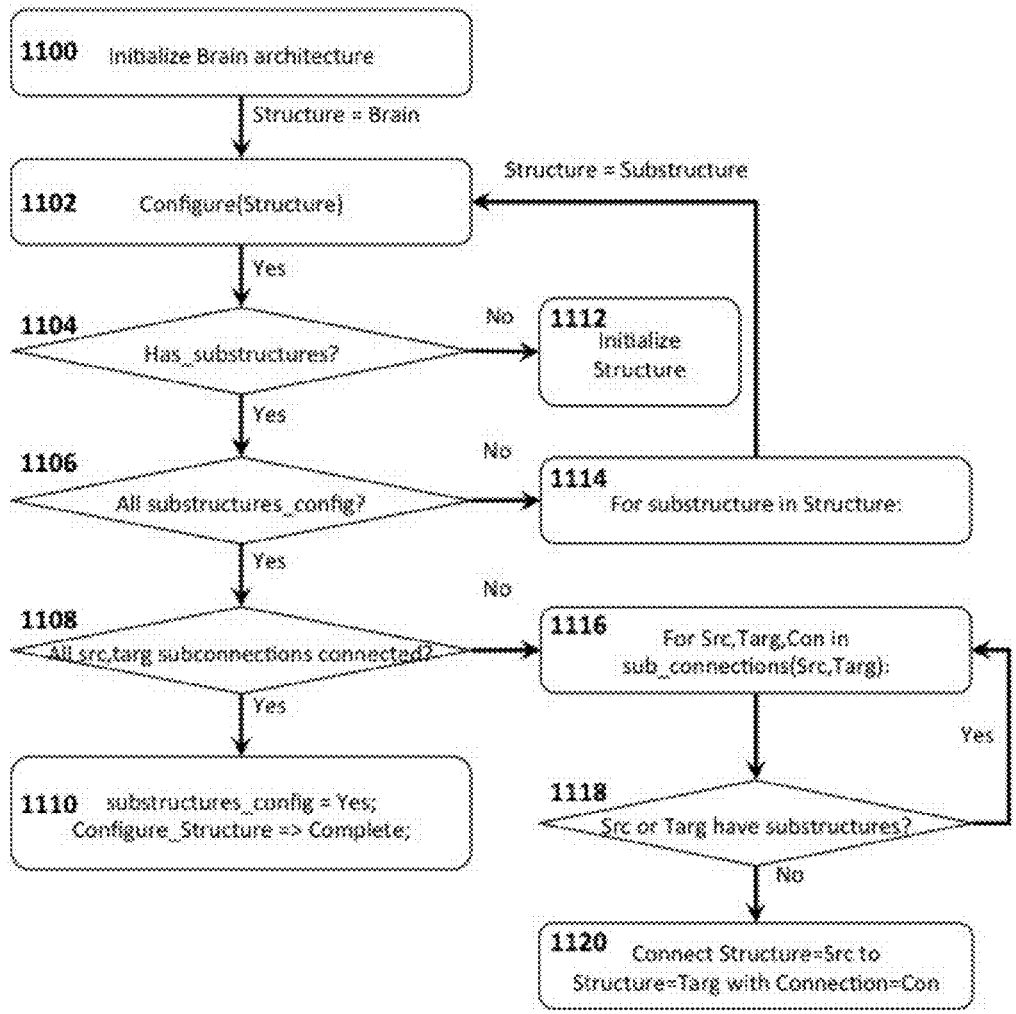
FIG. 11 shows a non-limiting example of a recursive algorithm to build a NABS system described herein.

In one embodiment, a NABS system is created in software through a recursive algorithm as shown in FIG. 11. In this exemplary embodiment, the recursive algorithm requires that the structures in the brain are defined, and all substructures within each structure are defined. Preferred embodiments of structures and their hierarchical organization have been discussed. Furthermore, the connections between all pairs of structures are defined. The connections between structures have been discussed in some embodiments in the context of the 6 neuroanatomical circuits.

Continuing to refer to FIG. 11, a brain is initialized by defining the top level structure as a brain as in 1100 and calling the structure configuration software module as in 1102. The configure structure software module 1102 will check if the structure has substructures as in 1104. If the structure has substructures, then the module will check if each substructure has been configured as in 1106. If substructures have not been configured, the configure structure module will be called recursively for every substructure as show in 1114 and 1102. This recursive structure configuration guarantees that all structures throughout the brain are configured and enables a simple hierarchical system definition with combinatorially complex software configurations.

Continuing to refer to FIG. 11, if a structure does not have a substructure 1104, then the initialize structure module 1112 will be called. In some embodiments the initialize structure 1112 module will instantiate a software object that contains the properties and methods of that structure. The properties specify all attributes of the structure that define its relationship to other structures in the brain as well as any parameters that may affect the methods within the structure. The methods within the structure define the functions that can be implemented by the structure. In other embodiments the initialize structure module may select and allocate specific hardware that will implement the function of the structure.

Continuing to refer to FIG. 11, once all lowest level structures, in some embodiments called neural types as in FIG. 5 500, are initialized through recursion via the initialize structure, then the structures are configured and can be connected. For the current structure, the recursion algorithm in FIG. 11 will then check whether or not all substructures within that structure have been connected 1108. If all the substructures have been connected then the structure is considered fully configured and will return as configured to 1102.

Continuing to refer to FIG. 11, if all substructures within the structure under consideration are not connected 1108, then they must be connected with a connection routine 1116. The connection routine 1116 will loop through all defined unidirectional connection specifications (shown as Con in 1116) between source (shown as Src in 1116) and target (shown as Targ in 1116) substructures. If either the Src or Targ structures have substructures themselves, then recursion, shown through 1118 and 1116, is used to continuously identify the connected substructures until the lowest level structures are reached.

Continuing to refer to FIG. 11, once two lowest level structures are reached that have no substructures 1118 to 1120, then those two structures are connected via the connect structures module 1120. The connect structures module 1120 instantiates the needed connection object that will be used to transmit information between structures during operation. In some embodiments, the connect structures module will instantiate a matrix with weights that represent the synaptic connections between structures. In other embodiments, a synaptic object will be instantiated that has properties and methods to transmit information from the source structure to the target structure. In further embodiments, the connect structure module 1120 instantiates hardware to simulate the connection between the source and target structures.

Continuing to refer to FIG. 11, once all connections are formed between the substructures within a structure the structure is considered configured as in 1110 and the program returns to configure the next structure. Once all structures are configured throughout the hierarchy the NABS brain architecture is configured, at which time data can be passed to the brain.

At some point in time after a NABS architecture has been configured additional structures and connections can be added through the same recursion simply by introducing new unconfigured structures and connections and recalling the recursion algorithm. The recursion algorithm will connect an initialize the newly added structures and connections until they are initialized and configured in the system. In some embodiments, the addition of new structures and connections over time is used to further correlate the NABS architecture temporal configuration with the temporal development of biological brains.

Applications and Uses

In various embodiments, a NABS system is used to perform simulated intelligence in the applications of, by way of non-limiting examples, speech transcription, video transcription, descriptive text output in response to video input, video anomaly detection, speaker identification, meeting transcription, healthcare textual input, healthcare predictive diagnostic system, natural language processing, predictive analytics, computer network anomaly detection, computer network data inference and prediction, detecting anomalies in sensor data, determining regions of importance in data, creating predictive models of sensory data, multi-modal data integration and inference, control of actuators, control of dynamical structures, constructing dynamical models of sensory data for the purpose of predictive inference, olfaction systems, tactile sensor identification, auditory object spatial localization, video object spatial localization, facial detection, object detection, education systems for feedback instruction, combinations of the above mentioned applications, or any number of other cognitive tasks that humans commonly perform.

Figure 12:
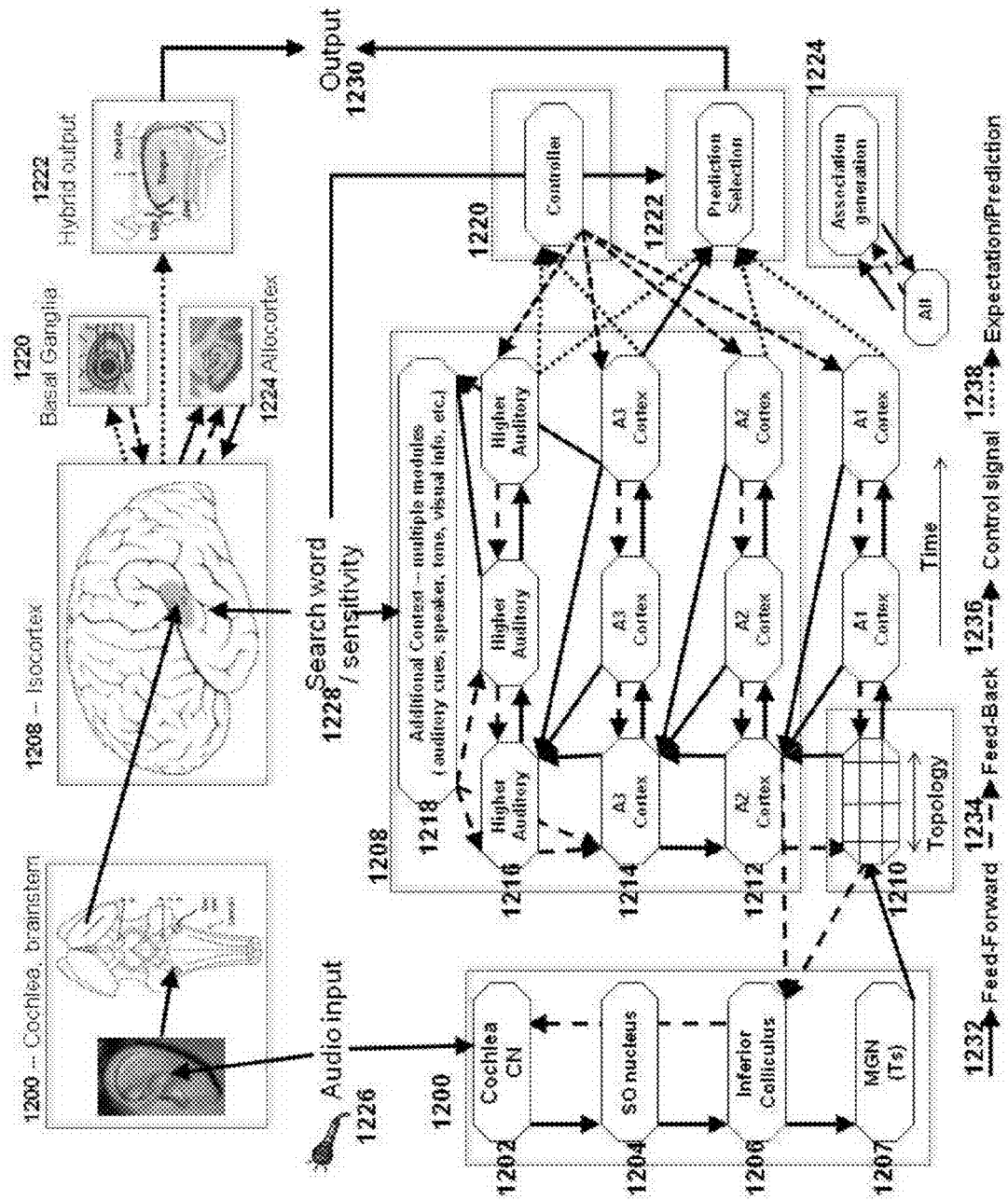
FIG. 12 shows a non-limiting example of a NABS system described herein implemented to perform robust speech understanding.

In one embodiment, as depicted in FIG. 12, NABS are used to perform robust speech understanding. The NABS architecture is capable of applying vast amounts of context in very flexible ways. The ability to detect locations in auditory streams that "should" (by disambiguation from context) contain a desired search word but do not (possibly due to noise, or the target speaker changing a code word) is a natural consequence of our context-based neuroanatomical model. Similarly to humans, our system heavily relies on hierarchical feedback from surrounding contextual information to perform speech recognition as opposed to most current approaches, which rely on probabilistic matches to the feed forward audio signal itself. Thus, dealing with ambiguous sounds while still performing accurate word recognition through the use of context is inherent to the design.

In FIG. 12, the approach we are utilizing and architecture we are developing are not limited to the auditory system. In fact, the human brain has a very homogenous architecture; therefore, the system we are developing can and will, be applied to other sensory information processing domains, such as vision. That information can be easily combined to add additional context and improve performance without many changes to overall function and design. Thus, our approach has potential to revolutionize automatic audio/visual search and understanding.

Continuing to refer to FIG. 12, the software solution mimics the human brain, executing keyword search in the same way as a human analyst would approach the problem (and with the same neuroanatomical architecture). The upper half of the figure is a neuroanatomical high-level block diagram, while the lower portion of the figure shows a more detailed NABS implementation.

In one embodiment, the NABS system depicted in FIG. 12 consists of structures is shown as circuits that correspond to neuroanatomical structures in the human brain involved in auditory cognition: cochlea and brainstem including MGN Ts thalamus 1200, the isocortex 1208, the basal ganglia 1220, the allocortex 1224, and action output generation structures 1222.

Continuing to refer to FIG. 12, each structure has a functional interpretation that together enable system training and operation. Referring to the structures in FIG. 12, in some embodiments a description of the functional interpretation would comprise sound preprocessing 1200, hierarchical perception state representation-selection-and working memory 1208, associative learning 1224, control with action selection 1220, and output generation 1230.

Continuing to refer to FIG. 12, each substructure 1210 in the isocortex module 1208 is an information processing module consistent with the functional interpretation of 6-layer human cerebral cortex and thalamic interaction. The module contains different functional components that communicate with other elements in the system. The modules information processing components comprise, feature self organization, temporal invariant feature development and extraction, expectation/output generation, control input, and association connectivity to other cortical modules.

Continuing to refer to FIG. 12, training the system involves learning through exposure. The system develops a hierarchically organized internal representation of the data as shown by the increasing hierarchy of isocortex structures from A1 cortex 1210 to A2 cortex 1212, to A3 cortex 1214, to more abstract multimodal isocortex 1218. The system is exposed to language as a human would experience throughout their life. As training progresses, associations are developed between internal representations. Next, training continues by presenting and mapping orthographic representations to the internal sound representations (similar to a child learning to talk before they can read, and then teaching the child to read). In a final training stage, utilizing supervised and reinforcement learning, the system is trained to output orthographic representations in response to sound input, and/or to create a prediction signal based on a desired key word. In some embodiments, the architecture utilizes various times of connections such as feed-forward 1232, feed-back 1234, control signals 1236, and expectations and predictions 1238.

NABS (and the human brain) utilize a massively hierarchical and parallel architecture to simultaneously process sensory information from multiple modalities. The connectivity ensures that any and all context from the experiential/cognitive world may be applied to most effectively "perceive" sensory information based largely on the expectation that the perception must be consistent with the simultaneously present "active" context occurring throughout the brain.

Certain Non-Limiting Embodiments

In some embodiments, disclosed herein are computer-implemented systems for replicating mammalian cognitive information processing comprising: a digital processing device comprising an operating system configured to perform executable instructions and a memory; a computer program including instructions executable by the digital processing device to create a hierarchical software architecture comprising: a module for providing a functional interpretation of the prosencephalon; a module for providing a functional interpretation of the mesencephalon; and a module for providing a functional interpretation of the rhombencephalon; wherein the software architecture simulates vertebrate, mammalian, primate, or human neuroanatomy. In some embodiments, the module for providing a functional interpretation of the prosencephalon generates the developmental platform to establish the architecture and connectivity of the telencephalon and diencephalon. In some embodiments, the module for providing a functional interpretation of the prosencephalon comprises modules for providing functional interpretations of the telencephalon and diencephalon. In further embodiments, the module for providing a functional interpretation of the telencephalon generates the developmental platform to establish the architecture connectivity in the pallium and subpallium. In some embodiments, the module for providing a functional interpretation of the telencephalon comprises modules for providing functional interpretations of the pallium and subpallium. In further embodiments, the module for providing a functional interpretation of the pallium creates excitatory elements to learn, store, and select cognitive states. In further embodiments, the module for providing a functional interpretation of the subpallium generates inhibitory modules that perform inhibitory functions in the system. In some embodiments, the module for providing a functional interpretation of the pallium comprises modules for providing functional interpretations of the isocortex, allocortex, and claustro/amygdaloid complex. In further embodiments, the module for providing a functional interpretation of the isocortex acts as a general information processing system capable of forming temporally and topologically invariant perception states, forming temporal and topological perception actions related to the perception states, learning mappings between perception states and perception action states, and capable of facilitating the controlled dynamic and contextually relevant selection of both states. In further embodiments, the module for providing a functional interpretation of the allocortex enables the temporary association between perceptions in the isocortex based on co-activation, emotional or other contextual significance, for later consolidation of those associations in the cerebral cortex. In further embodiments, the module for providing a functional interpretation of the claustro/amygdaloid complex stores significance representations in the module for providing a functional interpretation of the telencephalon. In some embodiments, the module for providing a functional interpretation of the isocortex comprises modules for providing functional interpretations of the koniocortex, agranular cortex, and isocortex proper. In further embodiments, the module for providing a functional interpretation of the koniocortex acts as the input cerebral cortex type for sensory input to connect the cerebral cortex to the systems sensory world, containing specialized input feature perception state layers and smaller output perception action layers. In further embodiments, the module for providing a functional interpretation of the agranular cortex acts as the output cerebral cortex type for action output to connect the cerebral cortex to the systems actions, containing lesser or non-existent input feature layers and large output action layers. In further embodiments, the module for providing a functional interpretation of the isocortex proper acts as a modular hierarchically based isocortical architecture to represent perceptions at different spatial scales, different temporal scales, and to integrate perceptions from different perceptual domains into multi-modal perceptions. In some embodiments, the module for providing a functional interpretation of the allocortex comprises modules for providing functional interpretations of the perirhinal/perihippocampal cortex and hippocampal cortex. In further embodiments, the module for providing a functional interpretation of the perirhinal/perihippocampal cortex generates an associative interface between the isocortex and hippocampal cortex wherein temporally co-active perceptions in the isocortex are transmitted to the hippocampal cortex to be associated, and associated perceptions in the hippocampal cortex can be excited in the isocortex through reactivation in the perirhinal/perihippocampal cortex. In further embodiments, the module for providing a functional interpretation of the hippocampal cortex stores temporal associations between perceptions that are active in the perirhinal/perihippocampal cortex. In some embodiments, the module for providing a functional interpretation of the subpallium comprises modules for providing functional interpretations of cortical interneurons and the GABA portion of basal ganglia. In further embodiments, the module for providing a functional interpretation of cortical interneurons generates inhibition within the cerebral cortex to facilitate competitive excitatory competition between perception states and between behavior states and to stabilize excitatory information processing. In further embodiments, the module for providing a functional interpretation of GABA portion of basal ganglia generates a disinhibitory reward based reinforcement learning system to learn and control (stop/start/trigger) sequences of behavioral actions generated by the isocortex through internal feedforward and feedback loops. In further embodiments, module for providing a functional interpretation of the diencephalon generates the developmental platform to establish the architecture and connectivity of the thalamus and the hypothalamus. In some embodiments, the module for providing a functional interpretation of the diencephalon comprises modules for providing functional interpretations of the thalamus and the hypothalamus. In further embodiments, the module for providing a functional interpretation of the thalamus generates correct mapping of functional signals from subcortical structures to relay to the cerebral cortex to generate different target functions. In some embodiments, the module for providing a functional interpretation of the thalamus comprises modules for providing functional interpretations of the specific thalamus, intralaminar thalamus, and a layer 1 projecting thalamus. In further embodiments, the module for providing a functional interpretation of the specific thalamus selects or biases perceptual states within the isocortex. In further embodiments, the module for providing a functional interpretation of the intralaminar thalamus selects or biases behavioral perception actions within the isocortex. In further embodiments, the module for providing a functional interpretation of a layer 1 projecting thalamus generates a control signal to isocortex modules to control the state of information processing within target isocortex modules. In further embodiments, the module for providing a functional interpretation of the hypothalamus regulates automated functions within the system global operating parameters. In some embodiments, the module for providing a functional interpretation of the mesencephalon generates the developmental platform to establish the architecture and connectivity of the SNc/VTA and colliculi. In some embodiments, the module for providing a functional interpretation of the mesencephalon comprises modules for providing functional interpretations of the SNc/VTA and colliculi. In further embodiments, the module for providing a functional interpretation of the SNc/VTA generates a reinforcement reward signal to the system for reinforcement learning of actions. In further embodiments, the module for providing a functional interpretation of the colliculi directs spatial attention of external sensors. In some embodiments, the module for providing a functional interpretation of the colliculi comprises modules for providing functional interpretations of the inferior colliculus and superior colliculus. In further embodiments, the module for providing a functional interpretation of the inferior colliculus directs spatial attention of vision sensors. In further embodiments, the module for providing a functional interpretation of the superior colliculus directs spatial attention of auditory sensors. In further embodiments, the module for providing a functional interpretation of the rhombencephalon generates the developmental platform to establish the architecture and connectivity of the metencephalon and myelencephalon. In some embodiments, the module for providing a functional interpretation of the rhombencephalon comprises modules for providing functional interpretations of the metencephalon and myelencephalon. In some embodiments, the module for providing a functional interpretation of the metencephalon comprises modules for providing functional interpretations of the pons and cerebellum. In further embodiments, the module for providing a functional interpretation of the metencephalon generates a dynamical model of the behavioral actions of the system based on sensor inputs and generating a stabilizing controller output to smoothly achieve desired future perception actions within that dynamical model based on reference inputs. In some embodiments, one or more modules, or submodules thereof, are connected. In further embodiments, each connection is unidirectional, having a source module and a target module. In some embodiments, one or more connections are propagated through the hierarchy until the lowest submodules in the hierarchy are connected. In some embodiments, each connection has a topology. In further embodiments, a topology is selected from the group consisting of: full connectivity, sparse random connectivity, topological radial connectivity, ordered gradient connectivity, and combinations thereof. In some embodiments, each connection has an effect type. In further embodiments, an effect type is selected from the group consisting of: additive, subtractive, multiplicative, divisive, activating, and learning. In still further embodiments, an effect type has a modifiable weight. In some embodiments, one or more connections are grouped to create one or more functional circuits that replicate vertebrate, mammalian, primate, or human neuroanatomy. In some embodiments, the circuits replicating human neuroanatomy perform human-like cognitive information processing. In some embodiments, the software architecture is adapted for use in general information processing. In some embodiments, the software architecture is adapted for use in cognition. In some embodiments, the software architecture is adapted for use in sensory perception. In further embodiments, the software architecture is adapted for use in one or more of sound processing, speech processing, vision processing, and language processing. In some embodiments, the software architecture is implemented as a server. In some embodiments, the software architecture is implemented as a web application. In some embodiments, the software architecture is implemented as software as a service. In some embodiments, the software architecture is implemented as a mobile application. In some embodiments, the digital processing device selected from the group consisting of: a server, a desktop computer, a portable computer, a smartphone, an appliance, and a vehicle.

In some embodiments, disclosed herein are computer-implemented methods for replicating mammalian cognitive information processing comprising the step of: providing to a processing device a software module for providing a functional interpretation of the prosencephalon; a software module for providing a functional interpretation of the mesencephalon; and a software module for providing a functional interpretation of the rhombencephalon; wherein said provided modules comprise software architecture simulates vertebrate, mammalian, primate, or human neuroanatomy.

In some embodiments, disclosed herein are computer readable media encoded with a computer program including instructions executable by a digital processing device to create a hierarchical, modular software architecture for creation of applications that simulate mammalian cognitive information processing, wherein said architecture is characterized by: the ability to abstract functions at multiple hierarchical levels for efficient computational implementations of cognitive information processing functions; and the ability to replace abstracted functions at any hierarchical level with variable biologically realistic organization. In some embodiments, the hierarchical levels replicate vertebrate neuroanatomy. In further embodiments, the hierarchical levels replicate mammalian neuroanatomy. In still further embodiments, the hierarchical levels replicate primate neuroanatomy. In still further embodiments, the hierarchical levels replicate human neuroanatomy. In some embodiments, the degree of biologically realistic organization increases where abstracted functions are replaced at finer or lower levels in the hierarchy. In some embodiments, the hierarchical levels are selected from the group consisting of: a neural type; a neural field consisting of one or more instances of a neural type; a neural layer consisting of one or more neural fields, one or more neural layers, or one or more structures; a neural circuit consisting of a plurality of layers and one or more connections therebetween; and a neural structure consisting of a neural circuit or a neural type, wherein said neural structure possesses an abstracted function. In further embodiments, each connection consists of a projection definition and a synapse definition. In still further embodiments, a projection type is defined between a source layer and a target layer. In still further embodiments, a synapse type is defined between a source neural type and a target neural type. In some embodiments, the encoding is fixed in a permanent, semi-permanent, or non-transitory form.

Digital Processing Device

The systems, platforms, applications, and methods described herein include a digital processing device, or use of the same. The digital processing device includes one or more hardware central processing units (CPU) that carry out the device's functions. The digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the systems, platforms, applications, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the systems, platforms, applications, and methods disclosed herein include at least one computer program. A computer program includes a sequence of instructions, executable in the digital processing device's CPU, written to perform a specified task. In light of the disclosure provided herein, those of skill in the art will recognize that a computer program may be written in various versions of various languages. In some embodiments, a computer program comprises one sequence of instructions. In some embodiments, a computer program comprises a plurality of sequences of instructions. In various embodiments, a computer program comprises a file, a section of code, a programming object, a programming structure, or combinations thereof. In further various embodiments, a computer program comprises a plurality of files, a plurality of sections of code, a plurality of programming objects, a plurality of programming structures, or combinations thereof. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, or Tcl. In some embodiments, a web application is written to some extent in a database query language such as Structured Query Language (SQL).

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the systems, platforms, applications, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

EXAMPLES

The following illustrative examples are representative of embodiments of the software applications, systems, and methods described herein and are not meant to be limiting in any way.

Example 1

Speech Understanding

A brain is created in software for the purpose of performing speech understanding applications. The brain is programmed in the python programming language utilizing object classes to simulate the function of neuroanatomical structures and their connectivity forming functional operational circuits.

The software solution mimics the human brain, performing speech processing as a human brain would approach the problem (and with the same neuroanatomical architecture). The NABS architecture consists of components that correspond to the neuronal structures in the human brain involved in auditory cognition: cochlea/brainstem, thalamus/cerebral cortex, hippocampus, basal ganglia, metencephalon, dopamine reward and further output structures. Each of these structures plays a functional role in the overall system training and operation: sound preprocessing, hierarchical contextual information processing, associative learning, control, and selection/output generation.

The construction of the architecture is specified by defining the structures that will make up the system, the function of those structures, and the connectivity of those structures through a definition file that represents the programming of their origin structures, namely the prosencephalon, mesencephalon, and rhombencephalon in relation to a specific vertebrate brain. In this case, a definition file is constructed for the human brain. A specification is written to construct the final architecture as a result of different substructures selected from these high-level structures. Given the speech task, only those final structures and connectivity that comprise the necessary components need to be specified.

As a simplified description of the definition file, the prosencephalon constructs structures to self-organize perceptual states based on sensory input and to self-organize perception actions to control the processing of internal structures. The prosencephalon constructs the structures capable of learning action sequences for the control of the sequence of activation of additional structures. The mesencephalon constructs reinforcement learning signals that can be triggered by the prosencephalon to reinforce learning taking place in the prosencephalon in a hierarchical manner and the spatial attention structures to receive auditory data and to provide spatial feedback to the cochlea. The rhombencephalon constructs structures to receive input from the prosencephalon and interact to regulate the smooth control of structures within the prosencephalon.

The functioning system progresses through developmental stages. The first stage is constructing the architecture, wherein each module is formed and simultaneously connects to the other modules specified by the prosencephalon, mesencephalon, and rhombencephalon specifications. In the second developmental stage, the system is exposed to sensory data that is transmitted through the connectivity in a temporal manner. In this case the sensory data is auditory data that is first transformed by the cochlea then moves up the auditory system model toward the isocortex. In the second developmental stages, the system develops a hierarchically organized internal representation of the speech data to which it is exposed in a series of subdevelopmental stages. The NABS hierarchy contains multiple overlapping stacks of both spatial and temporal invariant perception state development. As training progresses in successive subdevelopmental stages, perception states are frozen and synaptic associations are developed between internal representations. After this stage, the system is capable of activating perceptions given auditory streams of data. The system now has an early sensory model of the world. The third developmental stage involves training by presenting and mapping orthographic representations to the internal sound representations (similar to a child learning to talk before they can read, and then teaching the child to read). In a final training stage, utilizing supervised and reinforcement learning, the system is trained to output orthographic representations in response to sound input. Feedback is given to the system and the system utilizes reinforcement learning to learn the control of dynamical selection of internal perceptual states to select among correct orthographic representations as deemed by the responses of the feedback modules.

At this point, the system progresses through the final developmental stage into a continuously running stage. Now the system contextually transcribes the speech input. Temporal rhythms are tracked real-time and dynamically adjust information processing eliminating the need for biologically unrealistic techniques like dynamic time warping (DTW) or hidden markov models (HMM).

The NABS architecture applies vast amounts of context in very flexible ways. The software architecture detects locations in auditory streams that "should" (by disambiguation from context) contain a desired search word but does not (possibly due to noise, mumbling or the target speaker pausing and continuing). Similarly to humans, the system relies on hierarchical feedback from surrounding contextual information to perform speech recognition and transcription as opposed to most current approaches, which rely on probabilistic matches to the feed forward audio signal itself. Thus, dealing with ambiguous sounds while still performing accurate word recognition through the use of context is inherent to the design.

NABS (and the human brain) utilize a massively hierarchical and parallel architecture to simultaneously process sensory information from multiple modalities. The connectivity ensures that any and all context from the experiential/cognitive world may be applied to most effectively "perceive" sensory information based largely on the expectation that the perception must be consistent with the simultaneously present "active" context occurring throughout the brain.

The connectivity derived from the prosencephalon is the largest component of the software. A software isothalamocortical circuit structure is constructed to form the topological-hierarchical thalamocortical processing stages. The structure is an information processing module consistent with 6-layer human cerebral cortex and thalamic interaction. The module contains the following components that must communicate with other elements in the system: feature self organization, temporal invariant feature development and extraction, expectation/output generation, learning input, control input, and association connectivity to other cortical modules.

The isothalamocortical definition contains L2, L3, L4, L5s and L5p, where L2 self-organizes feedback from L3 of other modules as perception states in learning stages and selects represented features based on input context and bias the selection of L3 features in the current module in running states. L3 is a model of thalamocortical interaction. L3 self-organizes spatio-temporal invariant features in learning stages and select represented perception states based on input context. L4 self-organizes feedforward perception states in learning stages and selects represented features based on input context and bias the selection of L3 features in running states. L5s forms expectations of future state representations and feature actions in the isocortical module and selects among those based on L3 contextual input for transmission to target basal ganglia modules.

A cerebral cortex is then specified with a topological mapping of isothalamocorical modules. The cerebral cortex is represented in a 3-D topology such that multiple 2-D arrays of isothalamocortical modules can be connected in a radial topology to successively higher layers.

Example 2

Visual Recognition

A vision system application is created that is nearly identical to the auditory system of Example 1. The definition of the system utilizing definition files of the prosencephalon, mesencephalon, and rhombencephalon is the same; however, peripheral structures utilized in vision systems are slightly different. A vision system contains eyes that process and pass video data on to the isothalamocortical module hierarchy. In a vision system, the same developmental stages occur, except that video data is utilized. The system in this case outputs words corresponding to objects seen in the video data.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computer-implemented system for simulated intelligence information processing comprising:
   (a) a digital processing device comprising an operating system configured to perform executable instructions and a memory;
   (b) a computer program including instructions executable by the digital processing device to create a hierarchical software architecture for creation of applications that simulate a brain, the architecture comprising:
      (1) a module configured to provide a functional interpretation of prosencephalon, wherein the functional interpretation of the prosencephalon comprises: a topographic and hierarchically organized and connected set of one or more perception state modules and one or more perception action modules; wherein
(i) each perception state module is capable of learning temporally and topographically invariant perception states, selecting perception states based on an activity of other perceptual states and perceptual actions transmitted through connections in the brain;
(ii) each perception action module is capable of learning temporally and topographically ordered perception actions, selecting perception actions based on an activity of other perceptual states and perceptual actions transmitted through connections in the brain;
(iii) zero or more perceptual state modules are connected to each other;
(iv) one or more perceptual state modules are connected to one or more perceptual action modules;
(v) one or more perceptual state modules are connected to sensors for externally driven input perceptual states; and
(vi) one or more perceptual action modules are connected to actuators for externally generated output perceptual actions;
(2) a module configured to provide a functional interpretation of the mesencephalon, wherein the functional interpretation of the mesencephalon comprises:
(i) at least one module configured to provide reward reinforcement learning signals for the entire brain, and
(ii) at least one module configured to provide attention and arousal control signals for the entire brain;
(3) a module configured to provide a functional interpretation of the rhombencephalon, wherein the functional interpretation of the rhombencephalon comprises:
(i) at least one module configured to provide a behavioral model of perception state sequences and perception action sequences, and
(ii) at least one module configured to provide a stabilizing dynamical controller for controlling the temporally ordered selection of perceptual states and perceptual actions;
wherein the hierarchical software architecture simulates the cognitive information processing of vertebrate, mammalian, primate, or human neuroanatomy.

2. The system of claim 1, wherein the module configured to provide a functional interpretation of the prosencephalon comprises functional interpretations of the telencephalon and diencephalon.

3. The system of claim 2, wherein the module configured to provide a functional interpretation of the telencephalon comprises functional interpretations of the pallium and subpallium.

4. The system of claim 3, wherein the module configured to provide a functional interpretation of the pallium comprises functional interpretations of the isocortex, allocortex and, claustro/amygdaloid structure.

5. The system of claim 4, wherein the module configured to provide a functional interpretation of the allocortex comprises a functional interpretation of the perirhinal/parahippocampal cortex, and the hippocampus.

6. The system of claim 5, wherein the module configured to provide a functional interpretation of the perirhinal/parahippocampal cortex comprises functional interpretations of PH23 and PH56.

7. The system of claim 5, wherein the module configured to provide a functional interpretation of the hippocampus comprises functional interpretations of the dentate, CA3, CA1, and subiculum.

8. The system of claim 4, wherein the module configured to provide a functional interpretation of the claustro/amygdaloid structure comprises the claustrum and amygdala.

9. The system of claim 4, wherein the module configured to provide a functional interpretation of the isocortex comprises functional interpretations of C2, C3, C3a, C4, C5s, C5p, C56, C6m, and C6t.

10. The system of claim 4, wherein the module configured to provide a functional interpretation of the isocortex comprises functional interpretations of koniocortex, agranular cortex, and isocortex proper.

11. The system of claim 3, wherein the module configured to provide a functional interpretation of the subpallium comprises functional interpretations of GABA structures and Ach structures.

12. The system of claim 11, wherein the module configured to provide a functional interpretation of the GABA structures comprises functional interpretations of cortical interneurons, the striatum, the Gpi/Snr, and pallidum.

13. The system of claim 12, wherein the module configured to provide a functional interpretation of the striatum comprises striatum matrix SmD1, striatum matrix SmD2, and striatum patch Sp.

14. The system of claim 12, wherein the module configured to provide a functional interpretation of the cortical interneurons comprises CR, CH, DB, M, BK.

15. The system of claim 11, wherein the module configured to provide a functional interpretation of the Ach comprises functional interpretations of Pach, BF, and Sach.

16. The system of claim 1, wherein the module configured to provide a functional interpretation of the mesencephalon comprises functional interpretations of and inferior and superior colliculi and dopamine generating structures Snc and VTA.

17. The system of claim 1, wherein the module configured to provide a functional interpretation of the rhombencephalon comprises functional interpretations of the metencephalon and myelencephalon.

18. The system of claim 17, wherein the module configured to provide a functional interpretation of the metencephalon comprises functional interpretations of the pons, cerebellum, and dcn.

19. The system of claim 1, wherein the hierarchical software architecture comprises:
(a) at least one module configured to provide short-term memory;
(b) at least one module configured to provide long-term memory;
(c) at least one module configured to provide perception state representation, selection, and working memory;
(d) at least one module configured to provide perception action selection;
(e) at least one module configured to provide perception action output; and
(f) at least one module configured to provide perception state and action control.

20. The system of claim 19, wherein the at least one module is configured to provide short-term memory comprises a functional interpretation of allocortex wherein temporally recent weighted associations are stored between active perception states having high co-occurrence or significance as deemed by feedback from other telencephalon substructures.

21. The system of claim 19, wherein the at least one module is configured to provide long-term memory comprises a functional interpretation of isocortex wherein semi-permanent weighted associations are stored between perception states previously stored in short-term memory.

22. The system of claim 19, wherein the at least one module is configured to provide perception state representation, selection, and working memory comprises a functional interpretation of telencephalon wherein temporally and topographically invariant representations of perception states are learned.

23. The system of claim 19, wherein the at least one module is configured to provide perception state representation, selection, and working memory comprises a functional interpretation of telencephalon wherein temporally and topographically ordered representations of perception actions are learned.

24. The system of claim 19, wherein the at least one module is configured to provide perception state representation, selection, and working memory comprises a functional interpretation of prosencephalon wherein perception states are maintained as graded activations for working memory enabling graded information communication to connected perception states and perception actions.

25. The system of claim 19, wherein the at least one module is configured to provide perception state representation, selection, and working memory comprises a functional interpretation of isocortex modules wherein perception states are selected based on control input and context from other selected perception states in the pallium.

26. The system of claim 19, wherein the at least one module is configured to provide perception action selection comprises a functional interpretation of subpallium wherein temporal sequences of perception action selection patterns are learned, stored and re-activated in connection to mesencephalon reinforcement learning.

27. The system of claim 19, wherein the at least one module is configured to provide perception action output comprises a functional interpretation of isocortex C5p wherein topographically ordered behavioral action outputs are learned and stored.

28. The system of claim 19, wherein the at least one module is configured to provide perception state and action control comprises a functional interpretation of the rhombencephalon wherein control signals are generated to regulate the state of information processing in the perception state, representation and working memory module.

29. The system of claim 19, wherein the at least one module is configured to provide perception state and action control comprises a functional interpretation of the subpallium and diencephalon wherein control signals are generated to regulate the state of information processing in the perception state, representation and working memory module.

30. The system of claim 1, wherein the applications are adapted for use in general information processing.

31. The system of claim 1, wherein the applications are adapted for use in sensory perception.

32. The system of claim 31, wherein the applications are adapted for use in one or more of: sound processing, speech processing, vision processing, language processing, text processing, chemical signature processing, tactile sensor processing, accelerometer measurement processing, and topographically organized multi-modal sensor processing.

33. The system of claim 1, wherein the applications are adapted for use in behavioral action generation.

34. The system of claim 33, wherein the applications are adapted for use in one or more of speech generation, sound generation, image generation, text generation, language generation, language translation, information content management, healthcare decision generation, navigation, and data driven decision generation.

35. The system of claim 2, wherein the module configured to provide a functional interpretation of the diencephalon comprises functional interpretations of the thalamus, hypothalamus, and stn.

36. The system of claim 35, wherein the module configured to provide a functional interpretation of the thalamus comprises functional interpretations of the Ts, Ti, TL1, and TRN.

* * * * *